(12) United States Patent
Sharma et al.

(10) Patent No.: US 9,047,042 B2
(45) Date of Patent: Jun. 2, 2015

(54) MODIFYING ONE OR MORE SESSION PARAMETERS FOR A COORDINATED DISPLAY SESSION BETWEEN A PLURALITY OF PROXIMATE CLIENT DEVICES BASED UPON EYE MOVEMENTS OF A VIEWING POPULATION

(71) Applicant: QUALCOMM Incorporated, San Diego, CA (US)

(72) Inventors: Sandeep Sharma, San Diego, CA (US); Amit Goel, San Diego, CA (US); Mohammed Ataur Rahman Shuman, San Diego, CA (US); Raphael Ruben Freiwirth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/255,901

(22) Filed: Apr. 17, 2014

(65) Prior Publication Data

US 2014/0313408 A1    Oct. 23, 2014

Related U.S. Application Data

(60) Provisional application No. 61/813,891, filed on Apr. 19, 2013.

(51) Int. Cl.
*H04N 5/66* (2006.01)
*G06F 3/14* (2006.01)
(Continued)

(52) U.S. Cl.
CPC .............. *G06F 3/1454* (2013.01); *G06F 3/013* (2013.01); *G06F 3/1446* (2013.01); *G06F 3/165* (2013.01);

(Continued)

(58) Field of Classification Search
CPC ................................ G06F 3/1446; G06F 3/013
USPC ................. 348/383, 564, 588, 539, 540, 552; 345/1.3–3.4; 455/566, 3.06; 382/306, 382/307
See application file for complete search history.

(56) References Cited

U.S. PATENT DOCUMENTS

| 6,501,441 B1 | 12/2002 | Ludtke et al. |
| 6,583,771 B1 | 6/2003 | Furuhashi et al. |

(Continued)

FOREIGN PATENT DOCUMENTS

| EP | 2566281 A1 | 3/2013 |
| IN | 1463CHE2007 | 2/2009 |

(Continued)

OTHER PUBLICATIONS

Co-pending U.S. Appl. No. 14/255,869, filed Apr. 17, 2014.
(Continued)

*Primary Examiner* — Michael Lee
(74) *Attorney, Agent, or Firm* — Muncy, Geissler, Olds & Lowe, P.C.

(57) ABSTRACT

In an embodiment, a control device configures session parameters (e.g., related to an audio component, a video component, an eye tracking component, etc.) for a coordinated display session. The control devices maps, for proximate client devices registered as presentation devices for the coordinated display session, a different portion of visual data for the coordinated display session to respective display screens, and delivers the mapped portions of the visual data to the proximate client devices for presentation by the respective display screens during the coordinated display session. The control device obtains eye movement monitoring feedback from a set of eye tracking devices, the eye movement monitoring feedback characterizing eye movements of a viewing population of the coordinated display session. The control device modifies the session parameters associated with the coordinated display session based on the eye movement monitoring feedback.

38 Claims, 41 Drawing Sheets

(51) Int. Cl.
  *G06F 3/01* (2006.01)
  *G06F 3/16* (2006.01)
  *H04L 29/08* (2006.01)
  *G09G 5/14* (2006.01)

(52) U.S. Cl.
  CPC .......... *G09G 2300/026* (2013.01); *H04L 67/10* (2013.01); *G06F 3/1423* (2013.01); *G09G 5/14* (2013.01); *G09G 2320/106* (2013.01); *G09G 2340/0442* (2013.01); *G09G 2340/045* (2013.01); *G09G 2370/022* (2013.01); *G09G 2370/10* (2013.01); *G09G 2370/12* (2013.01)

(56) References Cited

U.S. PATENT DOCUMENTS

| | | | |
|---|---|---|---|
| 6,965,785 B2 * | 11/2005 | Mager et al. | 455/566 |
| 7,180,475 B2 | 2/2007 | Slobodin et al. | |
| 7,716,273 B2 | 5/2010 | Soin et al. | |
| 7,843,401 B2 | 11/2010 | Morikawa et al. | |
| 8,457,557 B2 | 6/2013 | Alden | |
| 2003/0179154 A1 | 9/2003 | Demsky et al. | |
| 2003/0236889 A1 | 12/2003 | Manion et al. | |
| 2005/0128958 A1 | 6/2005 | Hamdan | |
| 2005/0240680 A1 | 10/2005 | Costa-Requena et al. | |
| 2006/0028398 A1 * | 2/2006 | Willmore | 345/2.3 |
| 2006/0071947 A1 | 4/2006 | Ubillos et al. | |
| 2008/0036875 A1 | 2/2008 | Jones et al. | |
| 2008/0211825 A1 | 9/2008 | Sunakawa et al. | |
| 2008/0216125 A1 | 9/2008 | Li et al. | |
| 2008/0259093 A1 | 10/2008 | Tseng | |
| 2009/0160731 A1 | 6/2009 | Schuler et al. | |
| 2010/0141552 A1 | 6/2010 | Ferlitsch et al. | |
| 2010/0293264 A1 | 11/2010 | Ramsay | |
| 2010/0328447 A1 | 12/2010 | Watson | |
| 2011/0109526 A1 * | 5/2011 | Bauza et al. | 345/1.3 |
| 2011/0238751 A1 * | 9/2011 | Belimpasakis et al. | 709/204 |
| 2012/0062442 A1 | 3/2012 | Locker et al. | |
| 2012/0063603 A1 | 3/2012 | Evans et al. | |
| 2012/0133674 A1 | 5/2012 | Takishita et al. | |
| 2012/0146891 A1 * | 6/2012 | Kalinli | 345/156 |
| 2012/0184304 A1 | 7/2012 | Walsh et al. | |
| 2012/0269360 A1 * | 10/2012 | Burke | 381/77 |
| 2012/0326945 A1 | 12/2012 | Ellis et al. | |
| 2013/0083240 A1 | 4/2013 | Kerr et al. | |
| 2013/0093659 A1 | 4/2013 | Nomura et al. | |
| 2013/0109364 A1 | 5/2013 | Mercuri et al. | |
| 2013/0181901 A1 | 7/2013 | West | |
| 2013/0265487 A1 * | 10/2013 | YU et al. | 348/383 |
| 2014/0047487 A1 | 2/2014 | Guedalia | |

FOREIGN PATENT DOCUMENTS

| | | |
|---|---|---|
| WO | 2011057271 A1 | 5/2011 |
| WO | 2011134318 A1 | 11/2011 |
| WO | 2011135283 A2 | 11/2011 |
| WO | 2012153290 A1 | 11/2012 |
| WO | 2013036237 A1 | 3/2013 |

OTHER PUBLICATIONS

Co-pending U.S. Appl. No. 14/255,891, filed Apr. 17, 2014.
International Search Report and Written Opinion—PCT/US2014/034678—ISA/EPO—Jul. 1, 2014.
Kado Y., et al., "Digital scope on communication sheet for media interaction", Multimedia and Expo (ICME), 2010 IEEE International Conference on, IEEE, Piscataway, NJ, USA, Jul. 19, 2010, pp. 974-979, XP031760995, ISBN: 978-1-4244-7491-2.

* cited by examiner

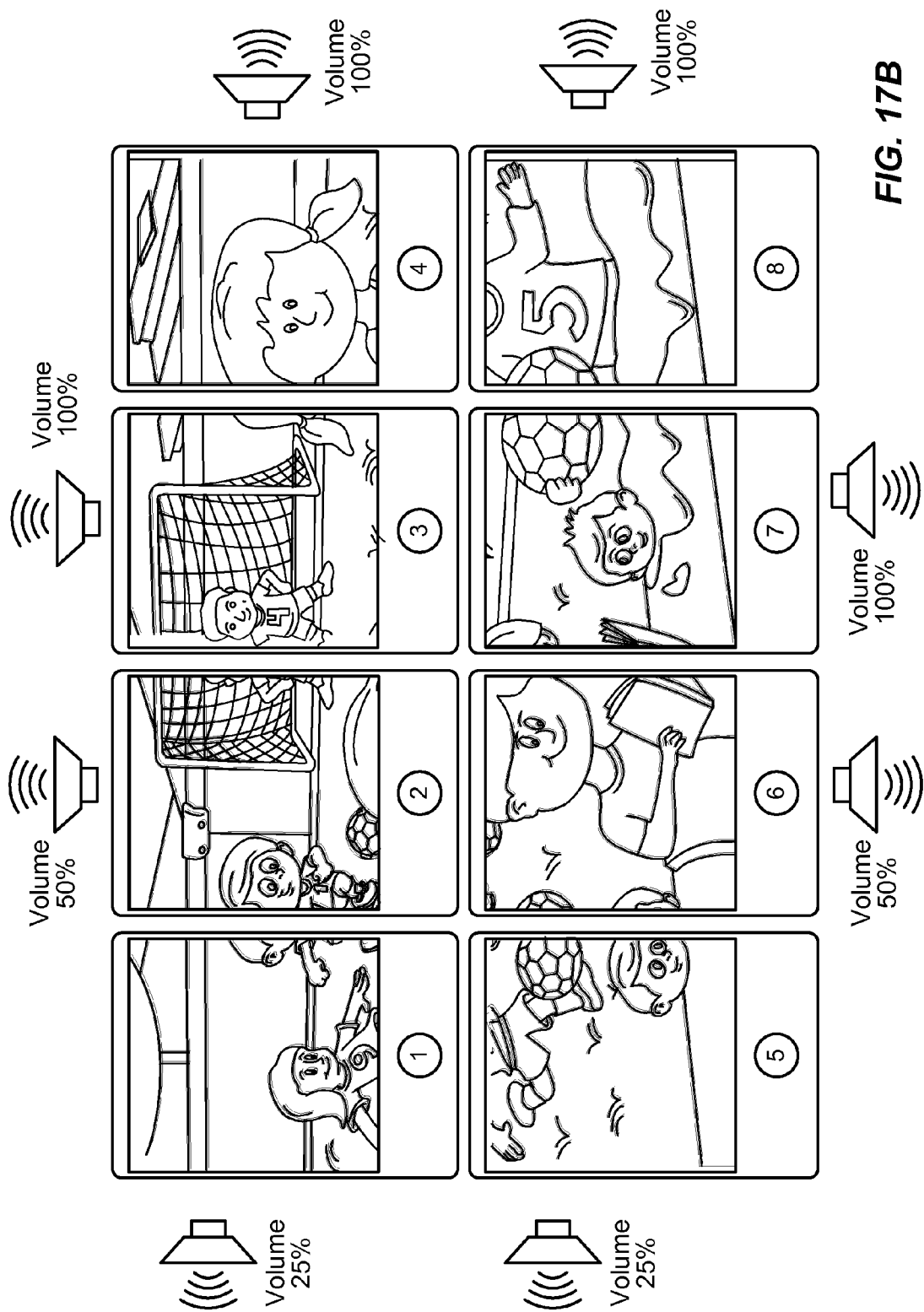

Viewer 1

Viewer 1

MODIFYING ONE OR MORE SESSION PARAMETERS FOR A COORDINATED DISPLAY SESSION BETWEEN A PLURALITY OF PROXIMATE CLIENT DEVICES BASED UPON EYE MOVEMENTS OF A VIEWING POPULATION

CLAIM OF PRIORITY UNDER 35 U.S.C. §119

The present application for patent claims priority to Provisional Application No. 61/813,891, entitled "COORDINATING A DISPLAY FUNCTION BETWEEN A PLURALITY OF PROXIMATE CLIENT DEVICES", filed Apr. 19, 2013, by the same inventors as the subject application, assigned to the assignee hereof and hereby expressly incorporated by reference herein in its entirety.

BACKGROUND OF THE INVENTION

1. Field of the Invention

Embodiments of the invention relate to modifying one or more session parameters for a coordinated display function between a plurality of proximate client devices based upon eye movements of a viewing population.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

It is typical for client devices (e.g., laptops, desktops, tablet computers, cell phones, etc.) to be provisioned with one or more display screens. However, during playback of visual data (e.g., image data, video data, etc.) each client device is usually limited to outputting the visual data via its own display screen(s). Even where one client device forwards the visual data to another client device, the output of the visual data is typically constrained to the set of display screens connected to one particular client device.

For example, if a group of users have access to multiple display devices (e.g., iPhones, Android phones, iPads, etc.) and the group of users wants to display a big image or video, the group of users is must typically use the display device with the biggest display screen. For example, if the group of users collectively has four (4) smart phones and three (3) tablet computers, the group of users will probably select one of the tablet computers for displaying the video or image. As will be appreciated, many of the available display screens go unused in this scenario.

SUMMARY

In an embodiment, a control device configures session parameters (e.g., related to an audio component, a video component, an eye tracking component, etc.) for a coordinated display session. The control devices maps, for proximate client devices registered as presentation devices for the coordinated display session, a different portion of visual data for the coordinated display session to respective display screens, and delivers the mapped portions of the visual data to the proximate client devices for presentation by the respective display screens during the coordinated display session. The control device obtains eye movement monitoring feedback from a set of eye tracking devices, the eye movement monitoring feedback characterizing eye movements of a viewing population of the coordinated display session. The control device modifies the session parameters associated with the coordinated display session based on the eye movement monitoring feedback.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 17B illustrates how the video frame is presented during execution of the process of FIG. 16 in accordance with an embodiment of the invention.

DETAILED DESCRIPTION

Figure 1:
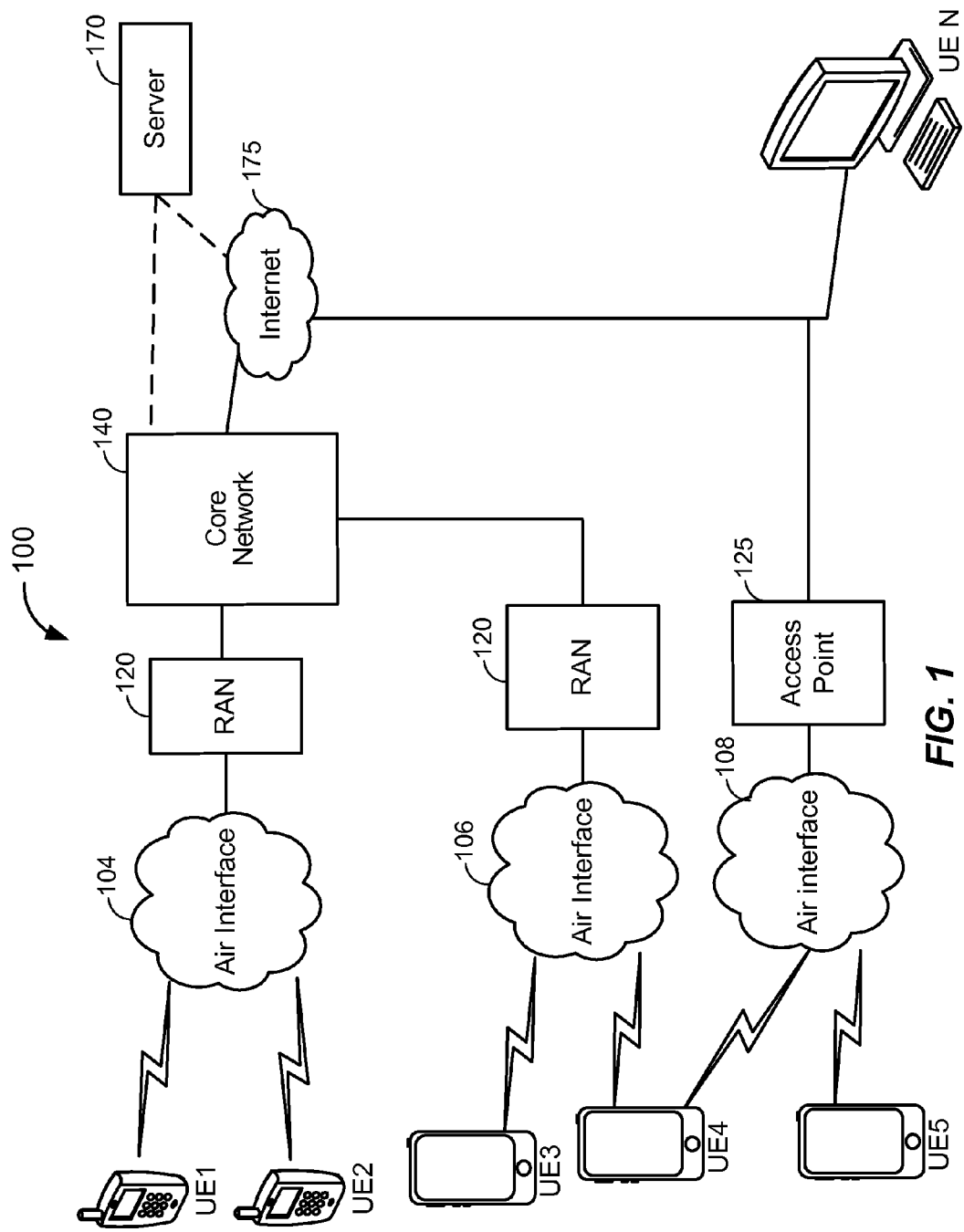
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
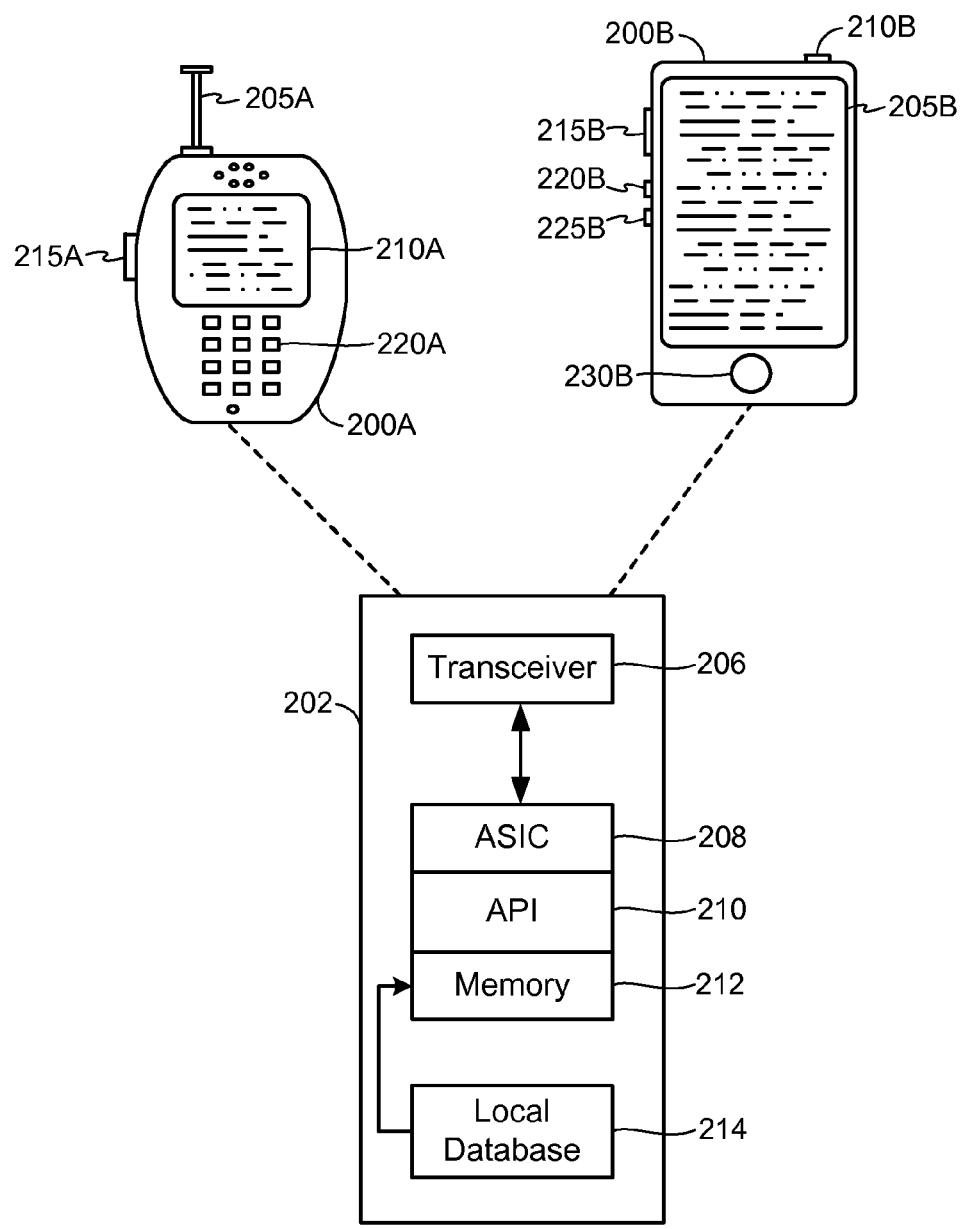
FIG. 2 illustrates examples of user equipments (UEs) in accordance with embodiments of the invention.

FIG. 2 illustrates examples of UEs (i.e., client devices) in accordance with embodiments of the invention. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
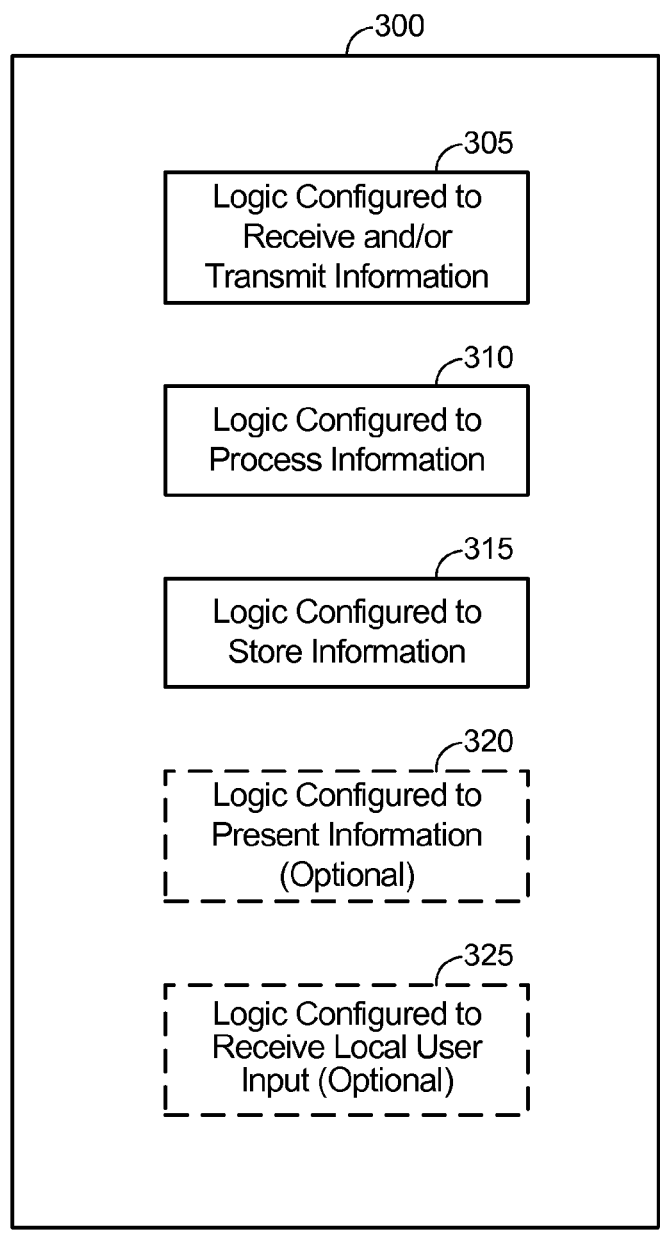
FIG. 3 illustrates a communication device that includes logic configured to perform functionality in accordance with an embodiment of the invention.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
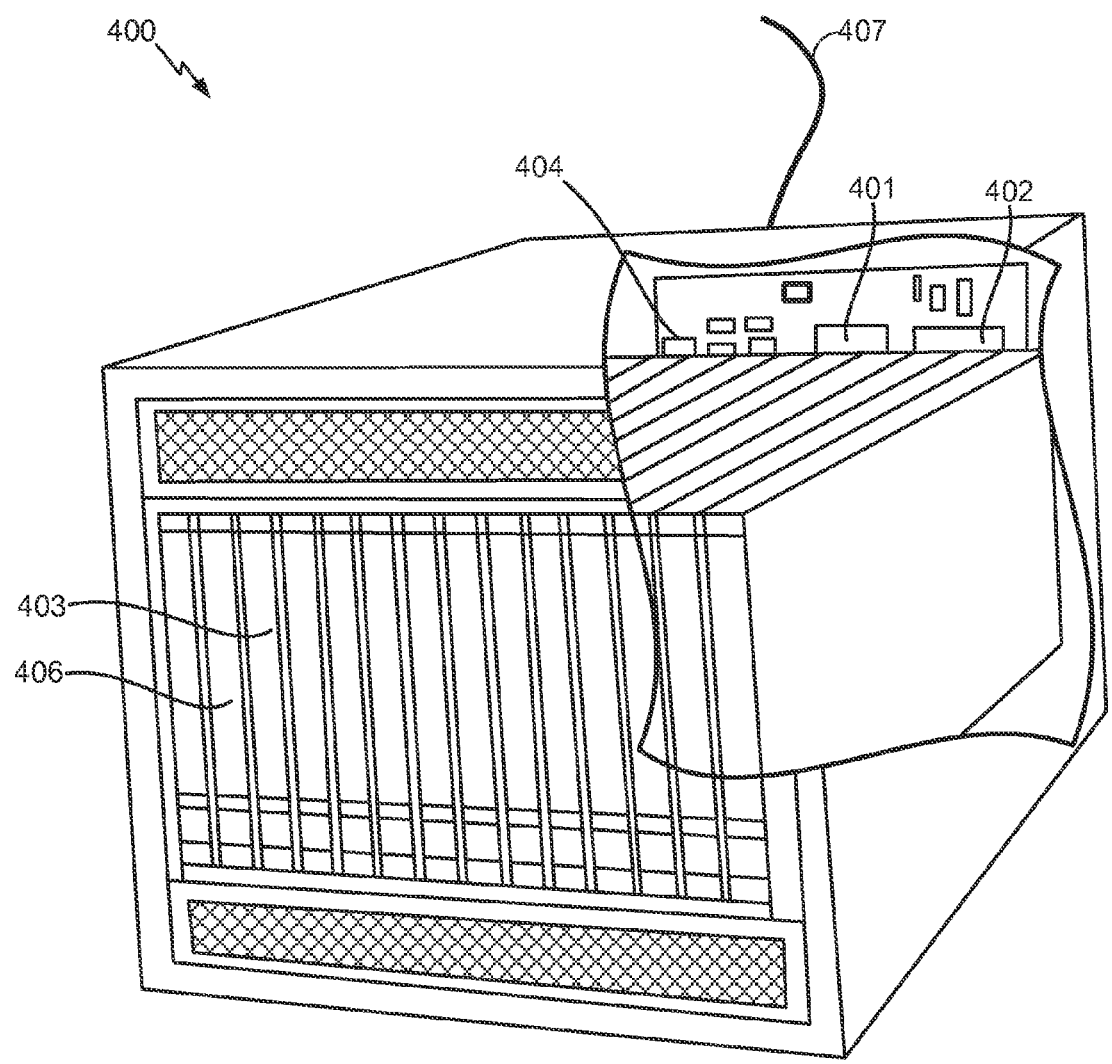
FIG. 4 illustrates a server in accordance with an embodiment of the invention.

The various embodiments may be implemented on any of a variety of commercially available server devices, such as server 400 illustrated in FIG. 4. In an example, the server 400 may correspond to one example configuration of the application server 170 described above. In FIG. 4, the server 400 includes a processor 400 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to a UE implementation as in FIG. 2.

It is typical for client devices (e.g., laptops, desktops, tablet computers, cell phones, etc.) to be provisioned with one or more display screens. However, during playback of visual data (e.g., image data, video data, etc.) each client device is usually limited to outputting the visual data via its own display screen(s). Even where one client device forwards the visual data to another client device, the output of the visual data is typically constrained to the set of display screens connected to one particular client device.

For example, if a group of users have access to multiple display devices (e.g., iPhones, Android phones, iPads, etc.) and the group of users wants to display a big image or video, the group of users is must typically use the display device with the biggest display screen. For example, if the group of users collectively has four (4) smart phones and three (3) tablet computers, the group of users will probably select one of the tablet computers for displaying the video or image due to their larger display screen area. As will be appreciated, many of the available display screens go unused in this scenario.

Embodiments of the invention are directed to methods for quick utilization of aggregate display technique for ad-hoc aggregated displays based upon dynamically discovering relative position and orientation information pertaining to individual displays in the ad-hoc created display group. More specifically, embodiments are directed to client applications configured for execution on a set of proximate client devices for implementing a coordinated display session, and a master application running on a "control device" for managing the coordinated display session (e.g., a central server, one of the proximate client devices that is engaged in the coordinated display session or another proximate client device that is not engaged in the coordinated display function). For example, modern mobile devices (e.g. large display smartphones, tablets, etc.) can be kept or held adjacent to each other to form a large aggregate display screen. The master application can utilize this large aggregate display screen to facilitate a group-render function where visual data spans across the large aggregate display screen as if it were a single display screen, as will be explained in more detail below.

Figure 5:
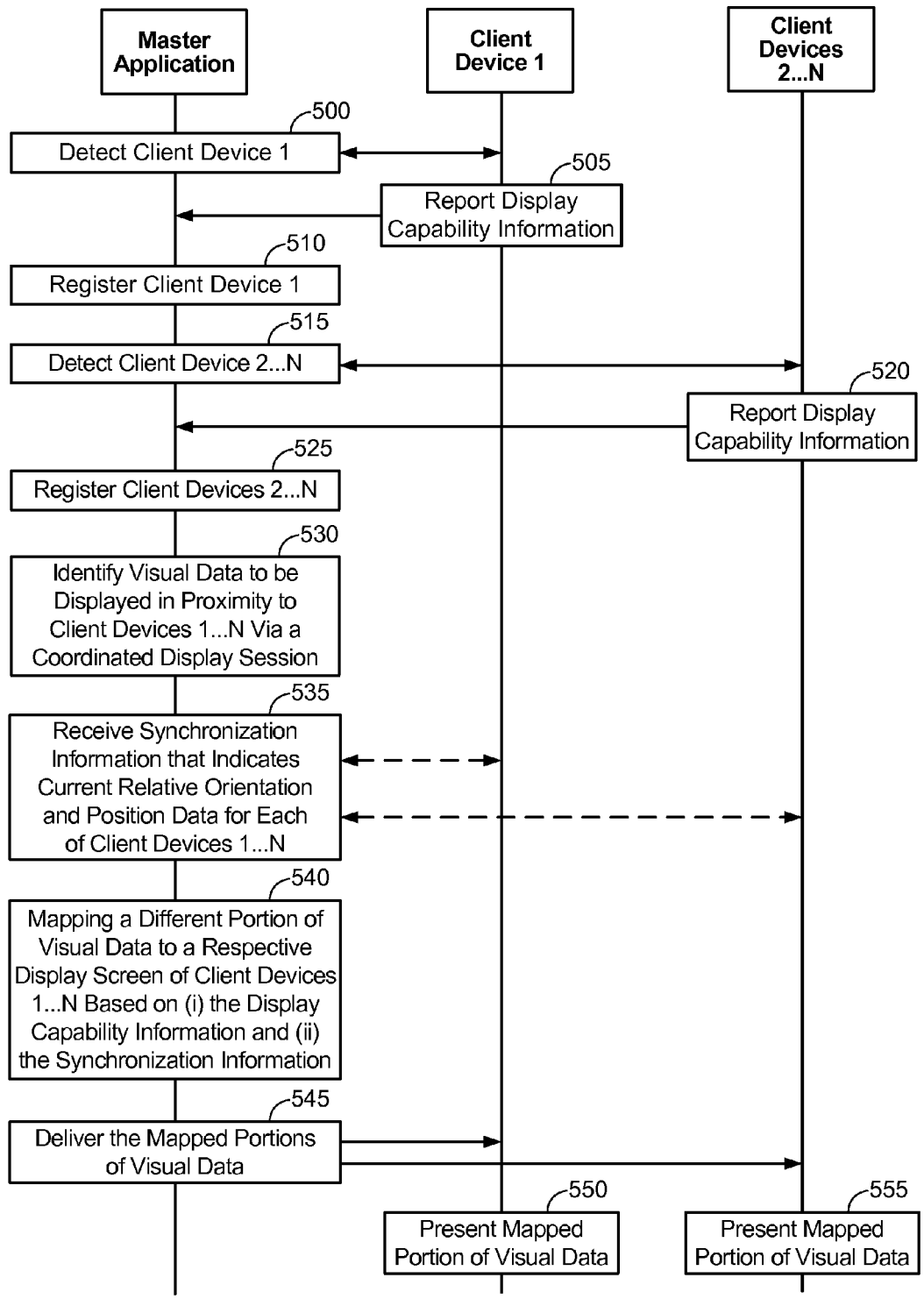
FIG. 5 illustrates a process of implementing a coordinated display session by a plurality of proximate client devices in conjunction with an embodiment of the present invention.

FIG. 5 illustrates a process of implementing a coordinated display session by a plurality of proximate client devices in conjunction with an embodiment of the present invention. In FIG. 5, reference is made to a master application that executes on a control device which manages the coordinated display session, and client applications that execute on client devices that are display participants to the coordinated display session. The master application and the various client applications on their respective devices communicate with a given communications protocol, which can correspond to either a local communications protocol (e.g., Bluetooth, WiFi, etc.) or a network communications protocol (e.g., TCP/IP, for when the control device is remote from the client devices in the coordinated display group). The control device can correspond to one of the plurality of proximate client devices that displays information as part of the coordinated display session, a proximate client device that does not display information as part of the coordinated display session (e.g., similar to a remote control for a television set) or a remote device (e.g., a server such as application server 170 from FIG. 1 or server 400 from FIG. 4). If the control device corresponds to one of the proximate client devices, the control device can be configured to execute both the master application and the associated client application. Also, as will be described below in more detail with respect to FIGS. 10A-10C, the identity of the control device that executes the master application can change during the coordinated display session (e.g., control may be passed from one client device to another, from a remote server to a local client device, from the local client device to the server, etc.).

Referring to FIG. 5, the master application on the control device detects and then connects to client device 1, 500, client device 1 reports its display capability information, 505, and the master application registers client device 1 to a coordinated display group, 510. The display capability information reported at 505 can include display screen-size information, display screen resolution information, display screen brightness capabilities, display screen frame-rate capabilities and/or any other device capability information relevant to the manner in which visual data is output by client device 1. The coordinated display group to which client device 1 is registered at 510 corresponds to a group of proximate client devices that have some degree of display capability. The coordinated display group can include mobile devices such as tablet computers or cell phones, but can also include one or more relatively "fixed" display devices such as TV sets or computer monitors. The master application on the control device also detects and then connects to client devices 2 . . . N (e.g., where N is greater than or equal to 2), 520, and client devices 2 . . . N each report their respective display capability information, 525. In an example, one or more proximity conditions for registration of a particular client device into the coordinated display group can be considered before the master application registers a new client device into the coordinated display group. For example, a proximity condition could be that the new client device be no more than a first proximity threshold (e.g., 5 feet, 10 feet, etc.) from any other client device in the coordinated display group, that the new client device be no more than a second proximity threshold (e.g., 8 inches, etc.) from at least one other client device in the coordinated display group, that the new client device be no more than a third proximity threshold (e.g., 3 feet, etc.) from an average distance between the new client device and each currently registered client device in the coordinated display group, and so on. If the master application determines that the one or more proximity conditions are not satisfied, the master application does not register the new client device into the coordinated display group and optionally forms a new coordinated display group including the new client device. Also, client devices in the new coordinated display group can overlap at least in part with a preexisting coordinated display group, although if both coordinated display groups are presenting visual data at the same time an "overlapping" client device would need to be aligned with only one of the coordinated display groups at any given time in at least one embodiment.

In the embodiment of FIG. 5, assume that client devices 1 . . . N are proximate to each other, and that the master application recognizes their relative proximity to each other. For example, client devices 1 . . . N may each be connected to the same wireless access point 125, client devices 1 . . . N may be in-range of each other via Bluetooth or WiFi, client devices 1 . . . N may have position determining systems (e.g., GPS, etc.) that indicate a close geographical relationship, and so on, and this information can be conveyed to the master application on the control device. For instance, if the control device is itself a proximate client device, the proximity of client devices 1 . . . N can be inferred by detection of the respective client devices via a local wireless protocol (e.g., WiFi, Bluetooth, etc.). In another example, if the control device is a remote server, client devices 1 . . . N may detect each other and report their detections to the remote server, or client devices 1 . . . N may simply report their individual locations from which the remote server compares to infer client device proximity. In any case, based on the recognition that client devices 1 . . . N are proximate at 525, the master application on the control device registers client devices 2 . . . N to the coordinated display group.

At some later point in time, the master application identifies visual data to be displayed in proximity to the client devices 1 . . . N by the coordinated display group via a coordinated display session, 530. For example, at 530, a user of one or more of the client devices 1 . . . N may desire to output a video via an aggregated display screen that leverages the display screens on two or more of the client devices 1 . . . N. In a further example, while not shown in FIG. 5, the identification of the visual data (e.g., a movie or other video, etc.) can be what triggers formation of the coordinated display group between 500-525.

In response to the determination to implement the coordinated display session via the coordinated display group at 530, the master application receives synchronization information that indicates current relative orientation and position data for each of client devices 1 . . . N, 535. Examples of how the master application can obtain the synchronization information at 535 are described below in more detail with respect to FIGS. 6A-8.

After obtaining the synchronization information at 535, the master application maps a different portion of the visual data to a respective display screen of client devices 1 . . . N based on (i) the display capability information of client devices 1 . . . N as reported at 505 and 520, and (ii) the synchronization information received at 535, 540. In an example, client devices 1 . . . N may correspond to less than all of the client devices that previously registered to the coordinated display group between 500-525. For example, one or more registered client devices may be out of position or have moved out of proximity so as to fail to satisfy a proximity condition (e.g., see FIG. 10B), one or more registered client devices may have improper or deficient orientation (e.g., see FIG. 10D) or one or more registered client devices may have lost the capacity to output visual data (e.g., see FIG. 10E), and in any of these cases those particular client devices can be omitted or excluded from the visual mapping of 535 despite having previously registered to the coordinated display group by virtue of proximity and display capability. For example, each mapped portion of visual data can correspond to a different non-overlapping portion of the visual data that, when concurrently output by the display screen on the corresponding client device, functions to substantially reconstruct the visual data across the display screens of client devices 1 . . . N. After generating the mapped portions of the visual data at 540, the master application delivers the mapped portions of the visual data to client devices 1 . . . N, 545, and client devices 1 . . . N each present their respective mapped portions of the visual data, 550 and 555.

As will be appreciated, if the control device corresponds to one of client devices 1 . . . N in the embodiment of FIG. 5, the detection of 500 or 515 can be omitted, and the delivery of 540 can correspond to the master application passing the mapped portion of visual data to the client application on the same client device (e.g., as opposed to an over-the-air transmission via Bluetooth or WiFi or an TCP/IP transmission). Also, the delivery of the visual data at 545 can be a direct transmission from the control device to client devices 1 . . . N, or alternatively the control device can direct some other device, such as one of the client devices 1 . . . N, to relay the visual data to the client devices (e.g., the control device can convey instructions for some other entity to stream the visual data instead of streaming the visual data itself). Further, it is possible that the visual data is already stored on one or more of client devices 1 . . . N (e.g., a video file or power point presentation may already be locally stored on one or more of the client devices). In this case, instead of streaming raw visual data from the control device to the client devices 1 . . . N, the control device can instead send control information to one or more client devices which asks the target client devices to render the mapped portion of the visual data thereon. For example, if the visual data is a video and client device 1 is mapped to an upper-left portion of the video at 540, the coordinates of the upper-left portion can be conveyed to client device 1, with client device 1 being expected to render the upper-left portion based on the conveyed coordinates in conjunction with its locally stored copy of the video.

Figure 6A:
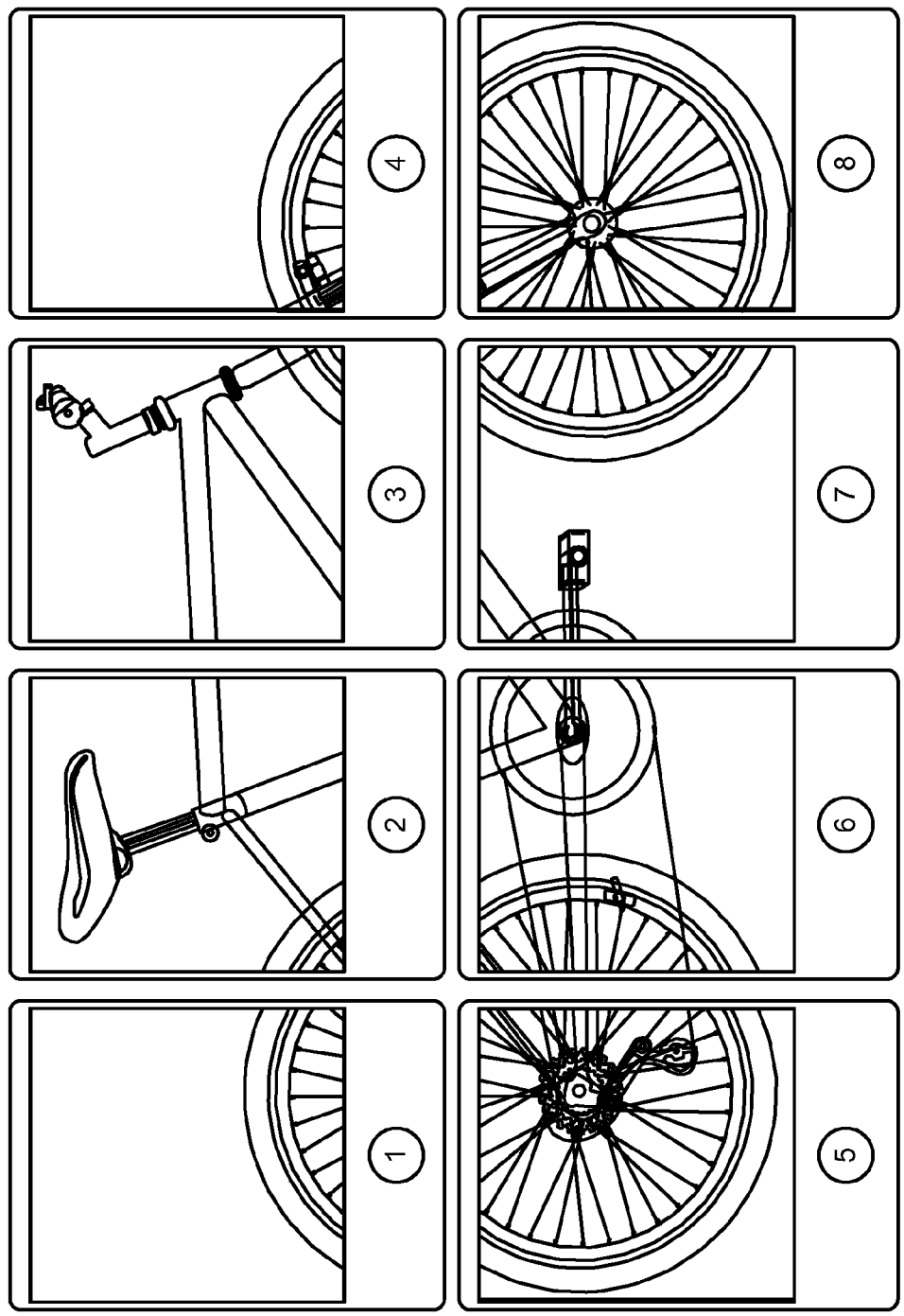
FIG. 6A illustrates an example arrangement of a coordinated display group in accordance with an embodiment of the invention.

FIG. 6A illustrates an example arrangement of the coordinated display group from FIG. 5. In FIG. 6A, the coordinated display group includes client devices 1 . . . 8 (i.e., N=8) whereby client devices 1 . . . 8 correspond to tablet computers 1 . . . 8 that are arranged in an approximation of a wide-screen format with a 16×9 aspect ratio. The tablet computers 1 . . . 8 are supported by some type of surface (e.g., the floor, an easel, Velcro-tape to a wall, etc.) so that their arrangement is relatively constant during the coordinated display session.

Figure 6B:
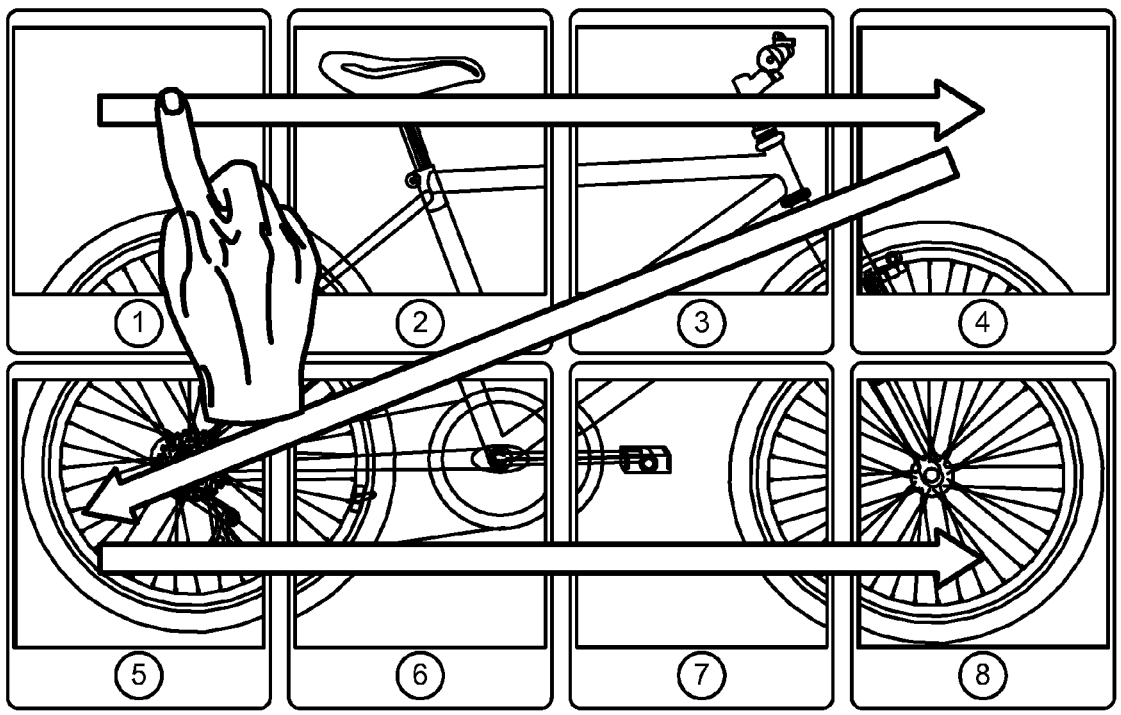
FIG. 6B illustrates a synchronization procedure for the coordinated display group of FIG. 6A that is based on user input in accordance with an embodiment of the invention.
Figure 6C:
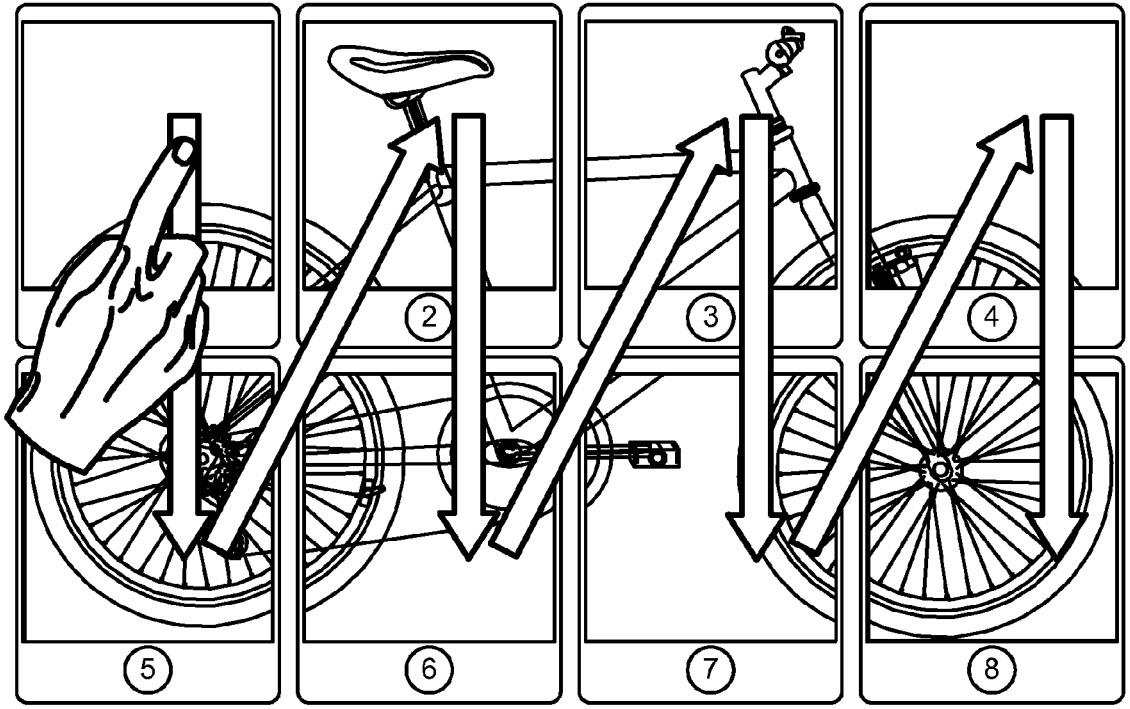
FIG. 6C illustrates a synchronization procedure for the coordinated display group of FIG. 6A that is based on user input in accordance with another embodiment of the invention.

In context with 535 of FIG. 5, the synchronization information that indicates the current relative orientation and position data for the tablet computers 1 . . . 8 in FIG. 6A can be obtained by the master application in a number of ways. In one embodiment of the invention, the tablet computers 1 . . . 8, which are assumed to be provisioned with touch-screen capability, are temporarily asked by the master application to enter into a synchronization learn mode. While in the synchronization learn mode, a user is prompted to swipe his/her finger over the aggregate display screen that is generated by tablet computers 1 . . . 8. For example, FIG. 6B illustrates an example whereby the user starts by swiping the top row of tablet computers in a left-to-right motion, and then returns to swipe the next row of tablet computers in another left-to-right motion. FIG. 6C illustrates another example where the user starts by swiping the left column of tablet computers in a top-to-bottom motion, and then returns to swipe the next column of tablet computers in another top-to-bottom motion, and so on. In FIG. 6B or FIG. 6C, timing characteristics such as the speed of the user's finger in conjunction with the arcs of movement can be used to estimate the relative distance and orientations of the respective tablet computers 1 . . . 8. For example, in FIG. 6B, if a 0.2 second gap occurs from when the user's finger leaves tablet computer 5 before it reaches tablet computer 6 and a 0.3 second gap occurs from when the user's finger leaves tablet computer 6 before it reaches tablet computer 7, assuming the user's swipe-speed is relatively constant, then tablet computers 5-6 are closer together than tablet computers 6-7. Thus, the left-to-right swipes (or horizontal swipes) from FIG. 6B can be used to estimate how far apart the tablet computers are from each other horizontally, while the top-to-bottom swipes (or vertical swipes) from FIG. 6C can be used similarly to estimate how far apart the tablet computers are from each other vertically. As will be appreciated, accurately synchronizing the tablet computers 1 . . . 8 using swipe detection as described above relies upon clock synchronization between tablet computers 1 . . . 8. Accordingly, to facilitate this function, each of tablet computers 1 . . . 8 can report their precise system time during registration with the master application at 510 or 525 of FIG. 5, in an example.

Further, the swipes from FIGS. 6B-6C are merely one manner by which the relative position and orientation data for tablet computers 1 . . . 8 from FIG. 6A can be ascertained. Another option is manual entry (e.g., a control screen displayed by the master application permits an operator to manually recreate the relative positions on tablet computers 1 . . . 8 via a virtual interface).

Figure 6D:
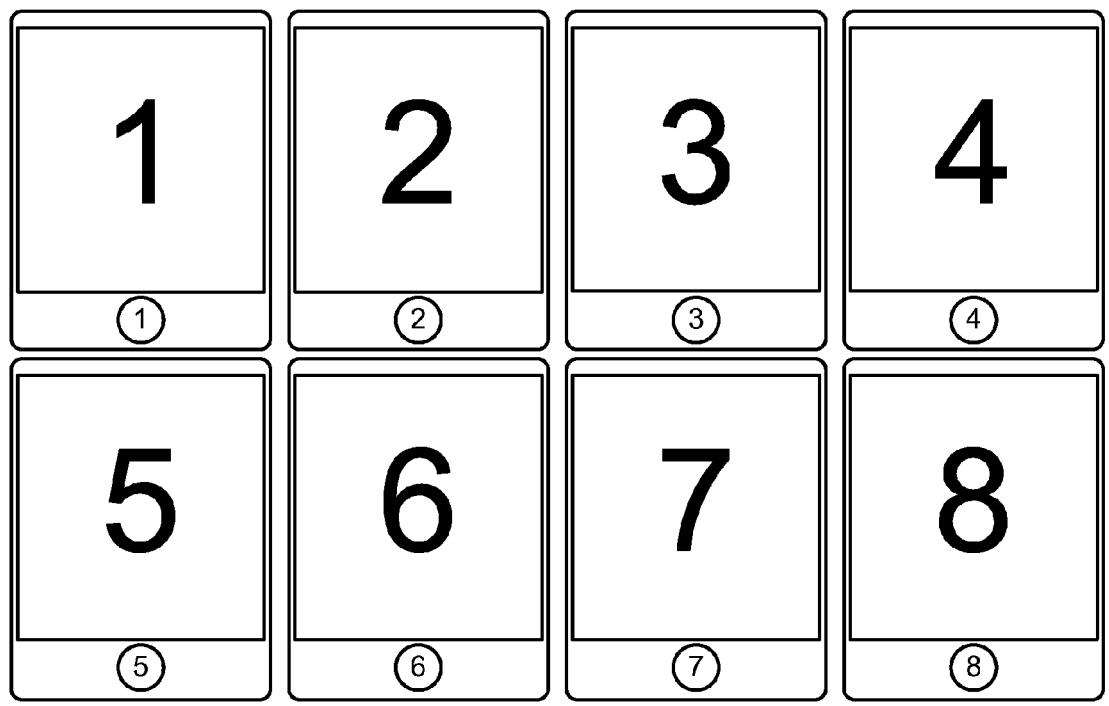
FIG. 6D illustrates a synchronization procedure for the coordinated display group of FIG. 6A that is based on images output by the coordinated display group in accordance with an embodiment of the invention.
Figure 6E:
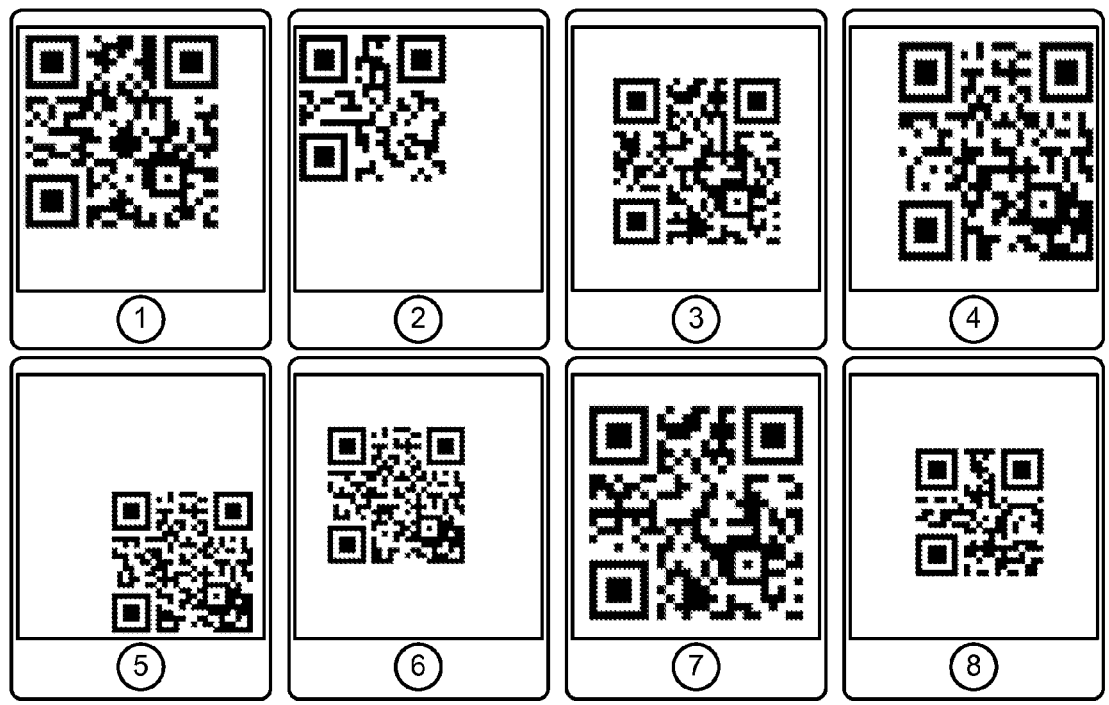
FIG. 6E illustrates a synchronization procedure for the coordinated display group of FIG. 6A that is based on images output by the coordinated display group in accordance with another embodiment of the invention.

Yet another option is that a picture of the coordinated display group can be snapped (by some other camera device), reported to the master application and then analyzed to identify where tablet computers 1 . . . 8 are relative to each other. In a further example, to facilitate the picture-based synchronization for the relative position and orientation of the coordinated display group, the master application can deliver a unique image (e.g., a number, a color, a QR Code, etc.) to display while the camera device snaps the picture of the coordinated display group. The master can then identify the relative position and orientation data based upon detection of the unique images in the snapped image. FIG. 6D illustrates an example whereby the unique images to facilitate the picture-based synchronization for the relative position and orientation of the coordinated display group correspond to numbers, and FIG. 6E illustrate an example whereby the unique images to facilitate the picture-based synchronization for the relative position and orientation of the coordinated display group correspond to QR codes (or barcodes). In either FIG. 6D or FIG. 6E, it will be appreciated that the mapping of 540 of FIG. 5 can include identifying each of the unique images in the picture, associating each unique identified image in the picture with a corresponding one of the plurality of proximate client devices and then determining the current relative orientation and position data for each of the plurality of proximate client devices based upon the association.

Figure 7:
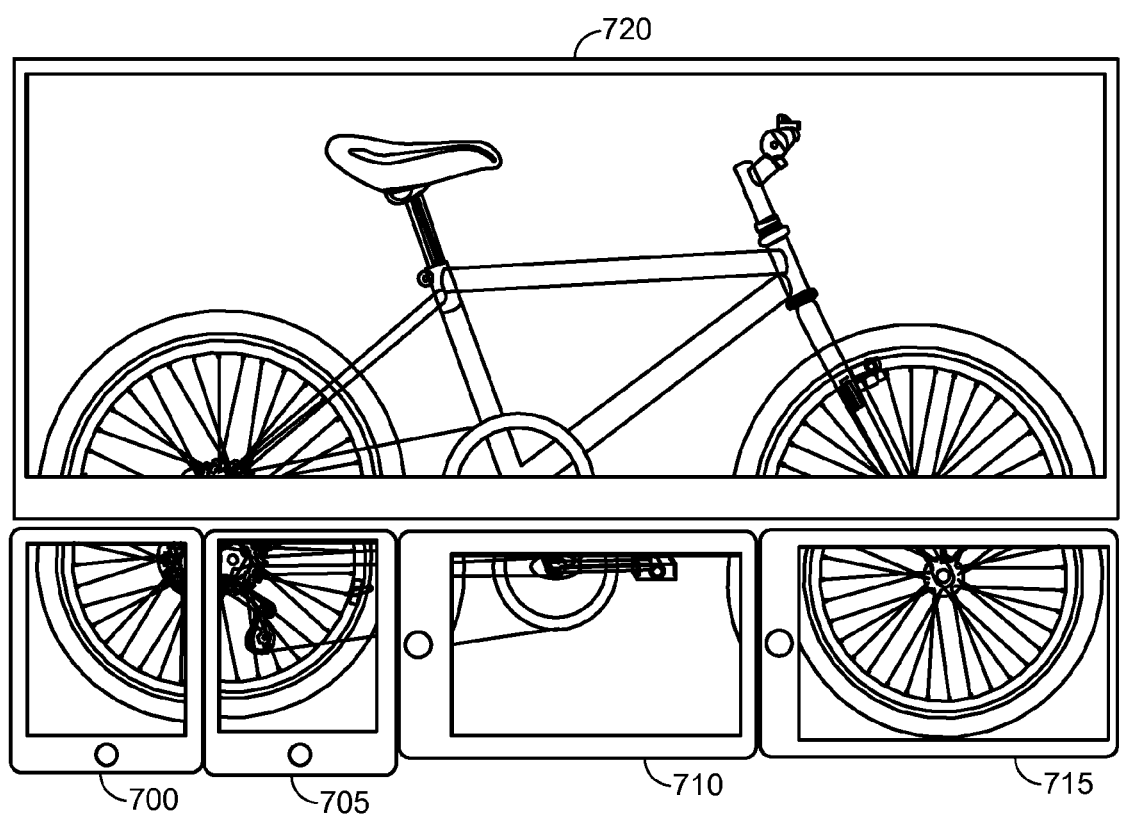
FIG. 7 illustrates an example arrangement of a coordinated display group in accordance with another embodiment of the invention.
Figure 8:
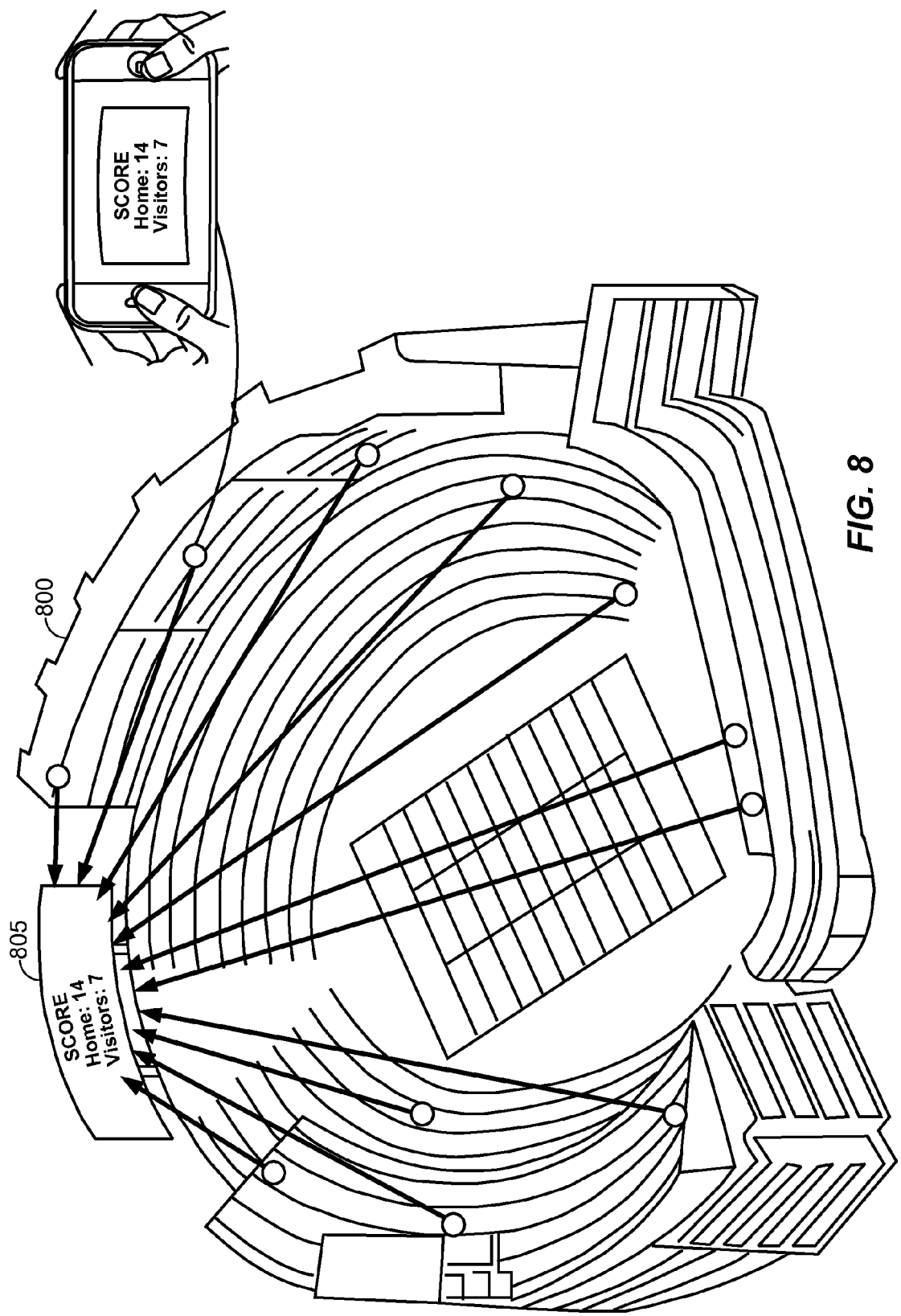
FIG. 8 illustrates a synchronization procedure for another coordinated display group that is based on images captured by the coordinated display group in accordance with another embodiment of the invention.

It will be appreciated that requiring a user to swipe his/her finger across the display screens of the coordinated display group can become impractical for medium or large aggregate screen sizes, or for coordinated display groups that include some client devices without touch-screen capability, as illustrated in FIG. 7 for example. In FIG. 7, two cell phones 700 and 705 and two tablet computers 710 and 715 are used in conjunction to extend the range of a television set 720. In this case, the television set 720 probably does not have access to touch-screen capability, and even if it did, it would be relatively difficult for the user to swipe his/her finger across the entire screen area of the television set 720.

In these cases, another option is to strobe a light beam or sound wave across the coordinated display group and then gauge the relative positions and orientations of its constituent client devices based on differences in timing and/or angle of detection relative to the strobe. In the sound wave example, for a medium size display (e.g., with an aggregate size of a few feet across, as shown in FIG. 7), a sound source (audible or ultrasound) can be used and moved in front of the coordinated display group in specified patterns. By capturing the time when each client device recorded the peak amplitude sound and knowing the pattern, the relative positions and orientations of the client devices can be derived by the master application. In the light beam example, for medium to large size aggregates, the devices can be pointed by a simple Laser pointer in an example. With front facing cameras on the target client devices of the coordinated display group, the time stamp when direct light beam was captured can be recorded by the respective devices and reported to the master application, and knowing the timing pattern of detections, the relative positions and orientations of the client devices can be derived. For a very large number of devices, the laser beam can be replaced by a strong directional light beam.

For a very large aggregate display (e.g., thousands of client devices held by users in a stadium), the users can be asked to take a picture of a fixed object (e.g., a three dimensional object) that is present in each user's view while being relatively close to the respective users. For example, in FIG. 8, a large number of users in a stadium 800 can fixate on an object 805 present in a central location of the stadium, such as a stage. Each user-to-object relationship has a unique combination of distance and/or orientation based on the different elevations and/or positions of the seats in the stadium 800. Accordingly, each user can snap a picture of the object 805 via his/her client device and then send the picture to the master application on the control device, which can identify the relative position of each device by image processing and then virtually reconstruct the effective aggregated display screen of the coordinated display group. For example, using the coordinated display group aspects described with respect to FIG. 8 above, thousands of client devices at the United States' seating section at the Olympics can be formed into a coordinated display group for collectively reconstructing an image of the U.S. Flag which becomes visible to Olympic participants in the stadium as they compete in their respective events.

Figure 9A:
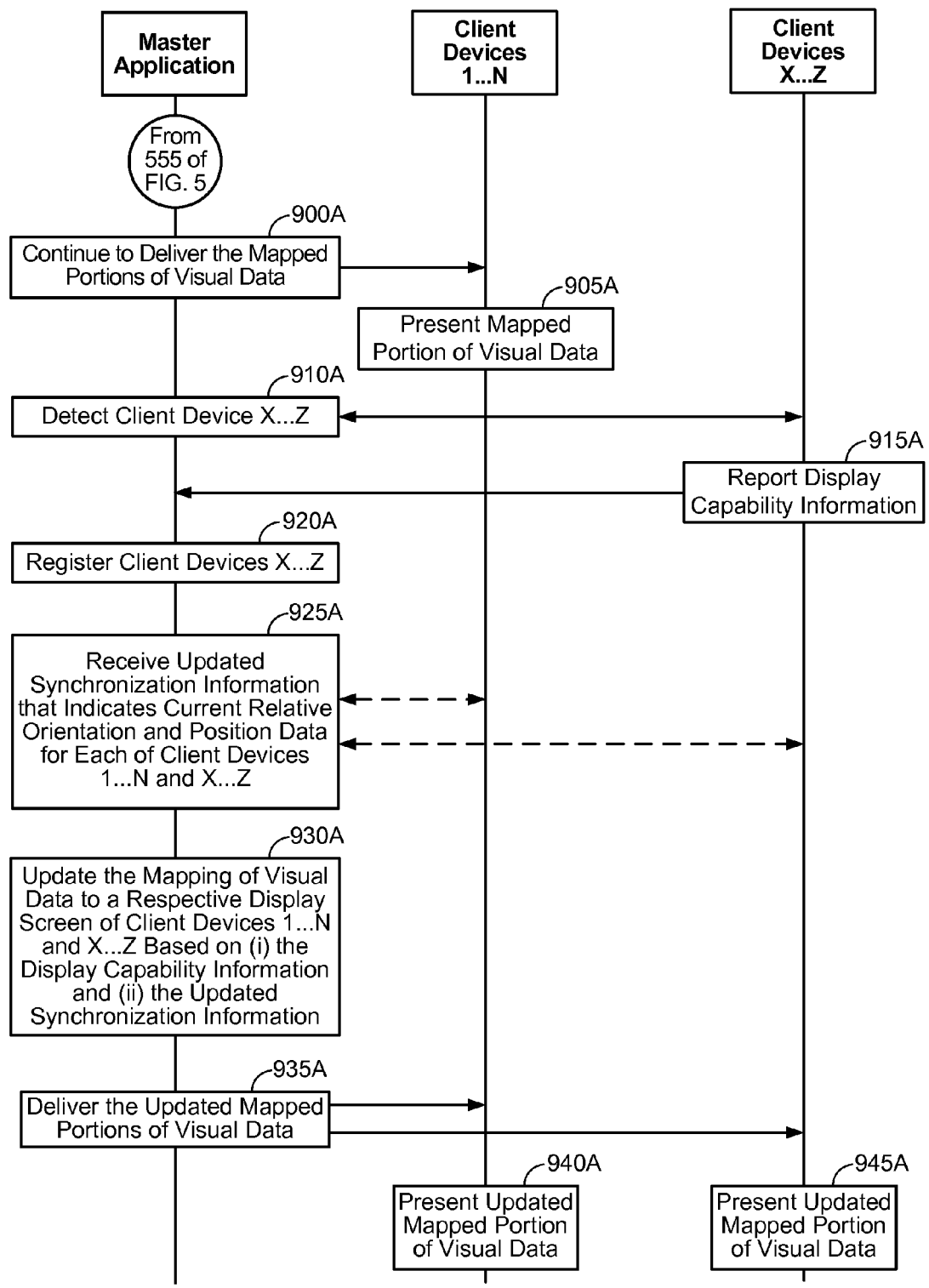
FIG. 9A illustrates a continuation of the process of FIG. 5 in accordance with an embodiment of the invention.
Figure 9B:
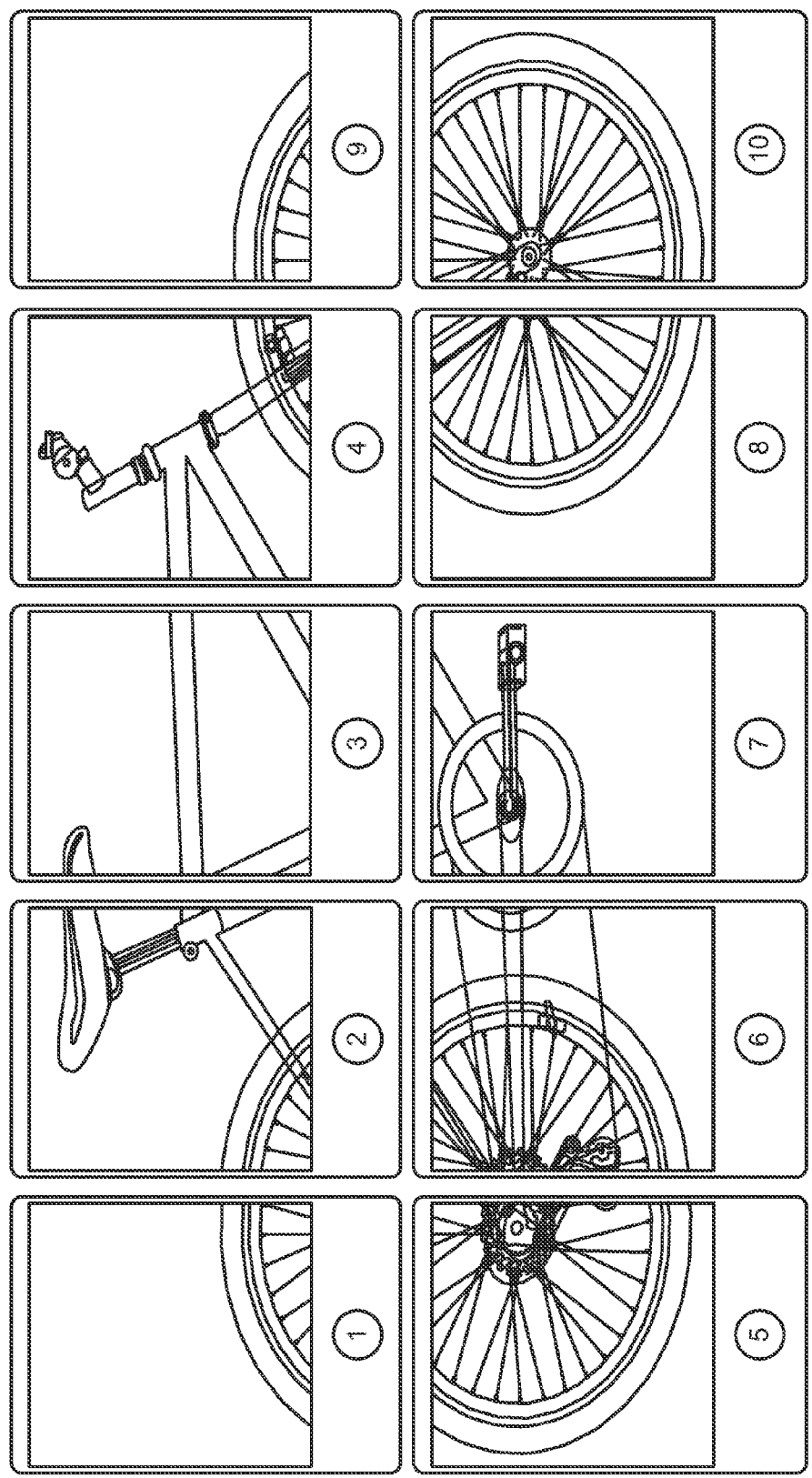
FIG. 9B illustrates an example arrangement of a coordinated display group during the process of FIG. 9A in accordance with an embodiment of the invention.

FIG. 9A illustrates a continuation of the process of FIG. 5 in accordance with an embodiment of the invention. Referring to FIG. 9A, after 555 of FIG. 5, assume that the master application on the control device continues to deliver the mapped portions of the visual data to client devices 1 . . . N, 900A, and that client devices 1 . . . N continue to present the respective mapped portions of the visual data, 905A. Later, during the coordinated display session, the master application detects one or more new client devices that are proximate to the coordinated display group and are denoted as client devices X . . . Z, 910A. Similar to 505-510 or 520-525, client devices X . . . Z report their respective display capability information 915A, client devices X . . . Z are recognized by the master application as being proximate to the coordinated display group and thereby the master application registers client devices X . . . Z to the coordinated display group, 920A. For convenience of explanation, assume that the client devices 1 . . . N correspond to tablet computers 1 . . . 8 as shown in FIG. 6A, and that client devices X . . . Z correspond to two new tablet computers 9 . . . 10 joining the coordinated display group, as shown in FIG. 9B.

In conjunction with registering client devices X . . . Z, the master application receives updated synchronization information that indicates current relative orientation and position data for each of client devices 1 . . . N with respect to client devices X . . . Z, 925A (e.g., similar to 535 of FIG. 5). For example, as shown in FIG. 9B, the updated synchronization information received at 925A can be configured to indicate that tablet computers 9 and 10 are positioned in top and bottom rows, respectively, on the right of the aggregated display screen area.

After obtaining the updated synchronization information at 925A, the master application updates the mapping of the visual data based on (i) the display capability information of client devices 1 . . . N and X . . . Z as reported at 505, 520 and 915A, and (ii) the updated synchronization information received at 925A, in order to incorporate the respective display screens of client devices X . . . Z into the aggregated display screen area, 930A. In context with FIG. 9B, because the incorporation of tablet computers 9 and 10 increases the horizontal-portion of the aspect ratio of the aggregated display screen area (i.e., the aggregated display screen area is essentially stretched wider), the updated mapping at 930A for the example shown in FIG. 9B would stretch the visual data across more horizontal distance, which causes each of tablet computers 1 . . . 8 to show a slightly different portion of the visual data as compared to before tablet computers 9 and 10 were taken into effect by via the mapping. After generating the updated mapped portions of the visual data at 930A, the master application delivers the updated mapped portions of the visual data to client devices 1 . . . N and X . . . Z, 935A, and client devices 1 . . . N and X . . . Z each present their respective updated mapped portions of the visual data, 940A and 945A.

Figure 10A:
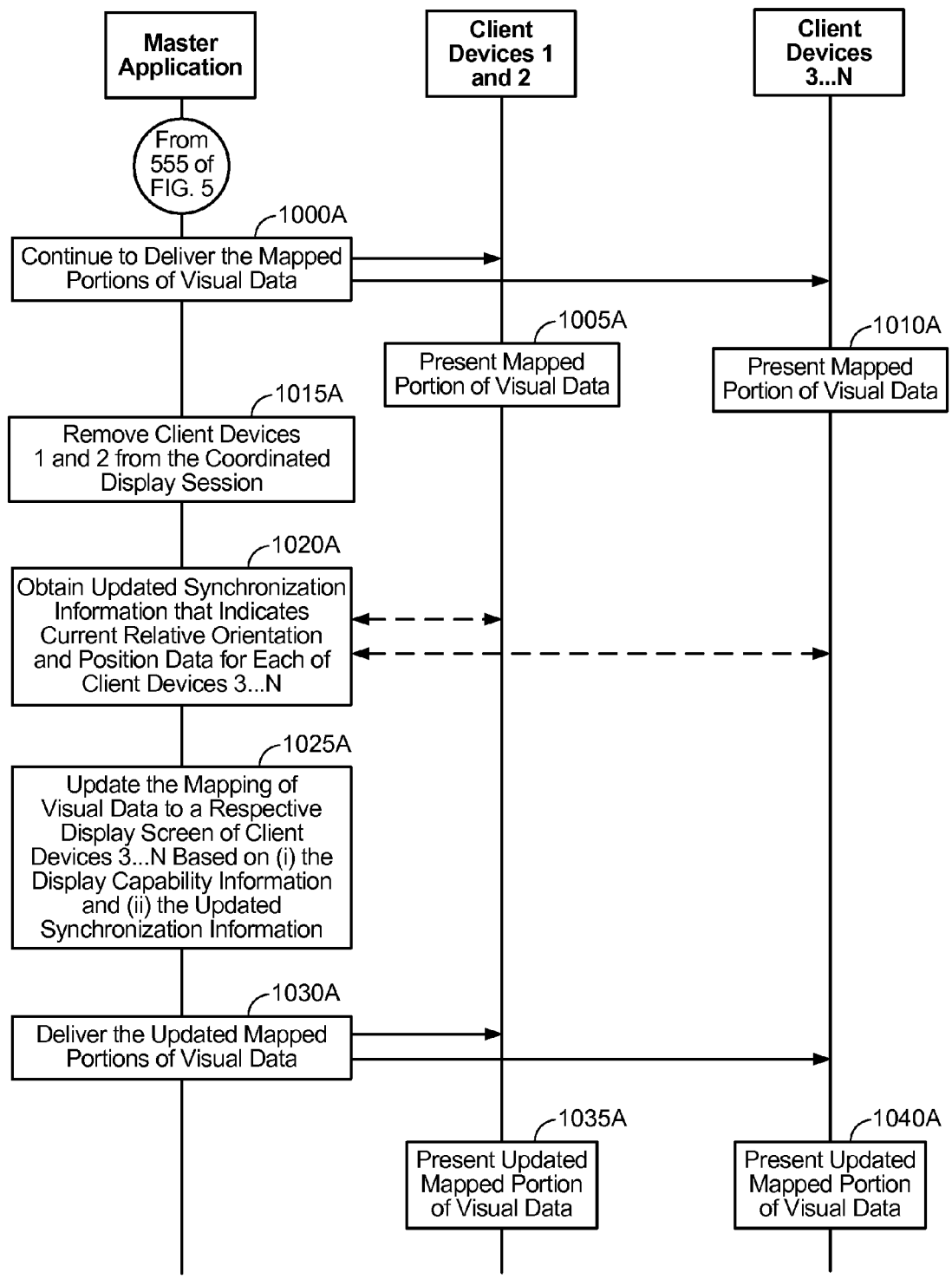
FIG. 10A illustrates a continuation of the process of FIG. 5 in accordance with another embodiment of the invention.

FIG. 10A illustrates a continuation of the process of FIG. 5 in accordance with another embodiment of the invention. In particular, while FIG. 9A is directed to an example whereby new client devices are added to the coordinated display group during the coordinated display session, FIG. 10A is directed to an example whereby one or more client devices depart or exit the coordinated display group during the coordinated display session. Referring to FIG. 10A, after 555 of FIG. 5, assume that the master application on the control device continues to deliver the mapped portions of the visual data to client devices 1 . . . N, 1000A, and that client devices 1 . . . N continue to present the respective mapped portions of the visual data, 1005A and 1010A.

Later, during the coordinated display session, the master application determines to remove one or more client devices from the coordinated display session, 1015A. For convenience of explanation, assume that the master application determines at 1015A to remove client devices 1 and 2 from the coordinated display group while permitting client devices 3 . . . N to remain in the coordinated display group. The determination of 1015A can be reached in a variety of different ways. For example, users of client devices 1 and 2 may physically move client devices 1 and 2 away from the aggregated display screen area, client devices 1 and 2 may experience a low battery condition (even if they are not moved) and so on.

Figure 10B:
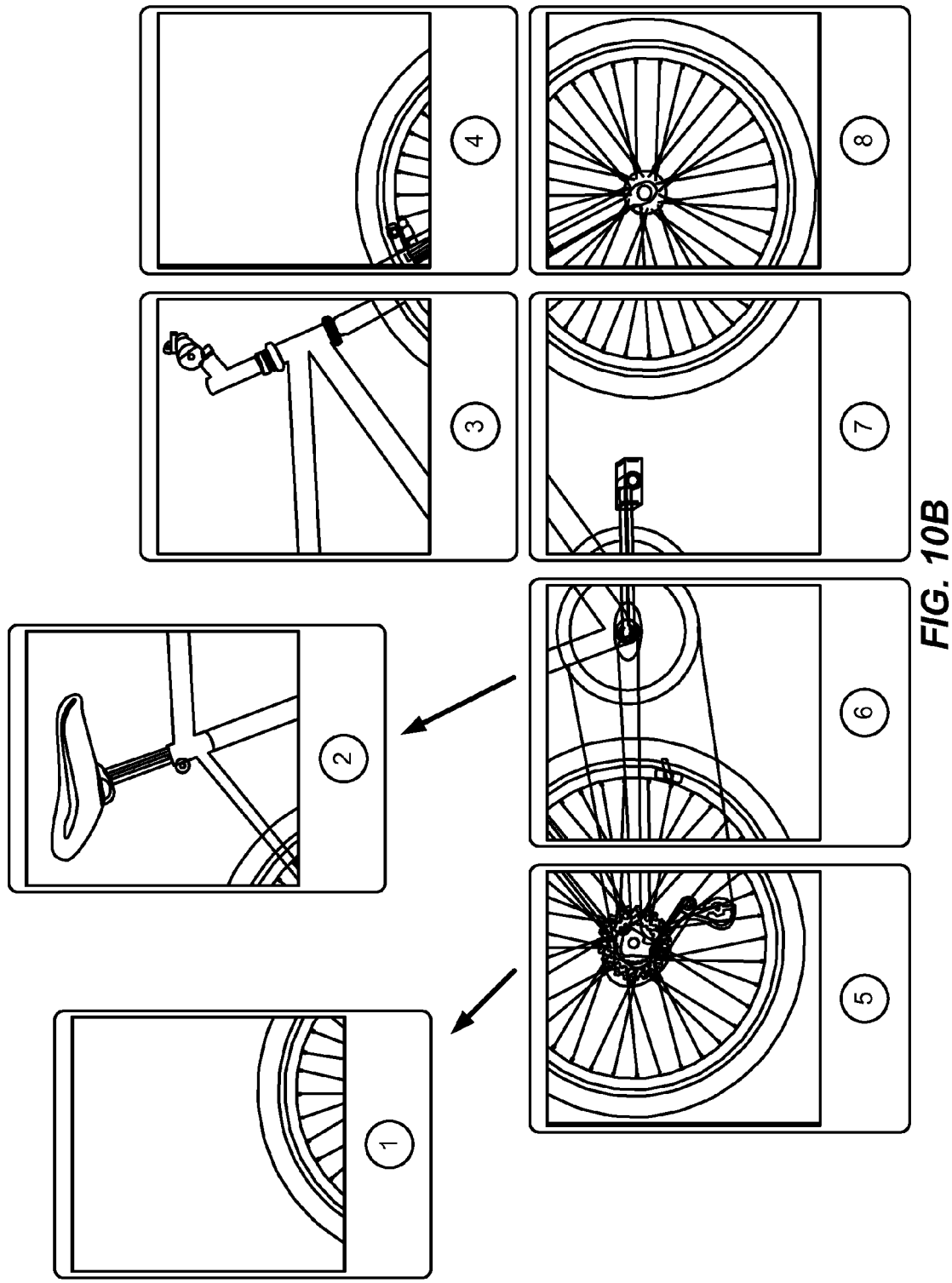
FIG. 10B illustrates an example arrangement of a coordinated display group during the process of FIG. 10A in accordance with another embodiment of the invention.
Figure 10C:
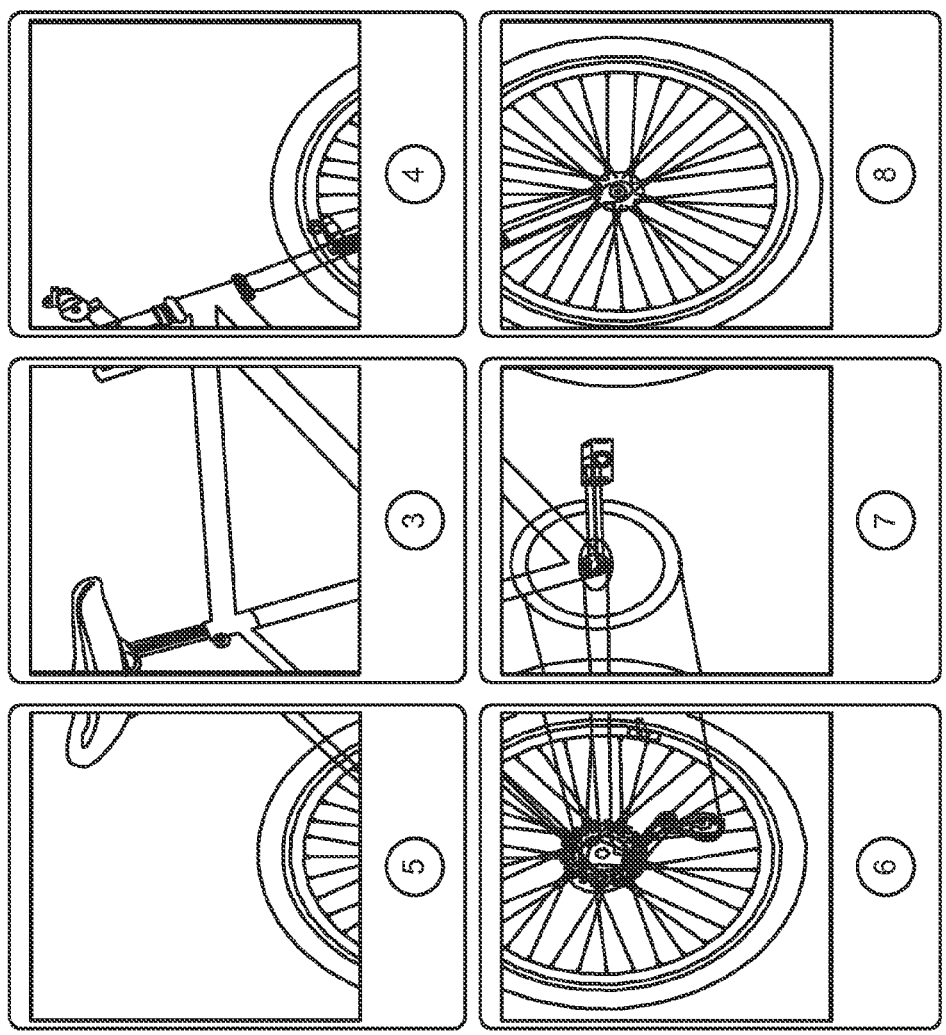
FIG. 10C illustrates another example arrangement of a coordinated display group during the process of FIG. 10A in accordance with an embodiment of the invention.
Figure 10D:
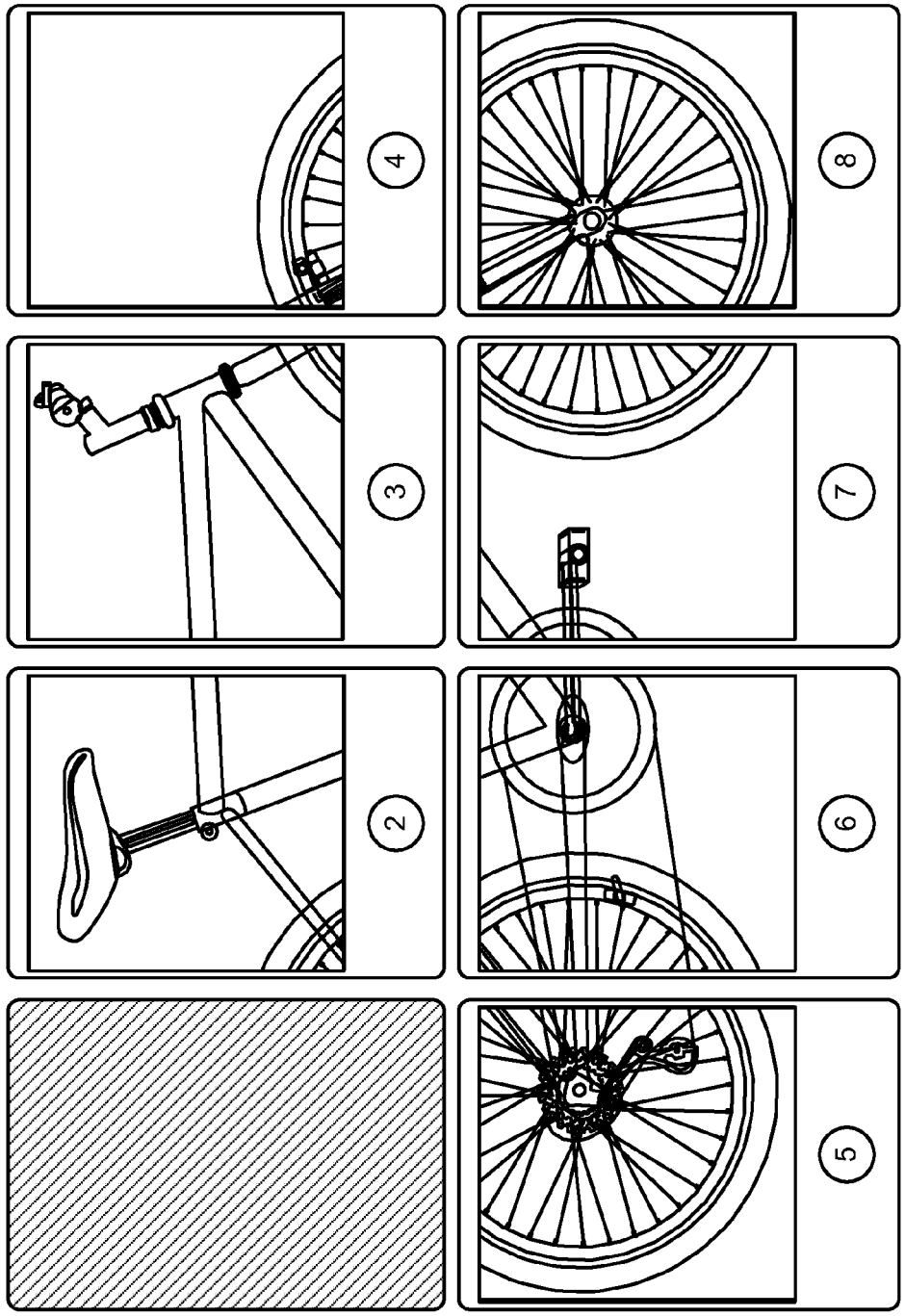
FIG. 10D illustrates another example arrangement of a coordinated display group during the process of FIG. 10A in accordance with an embodiment of the invention.
Figure 10E:
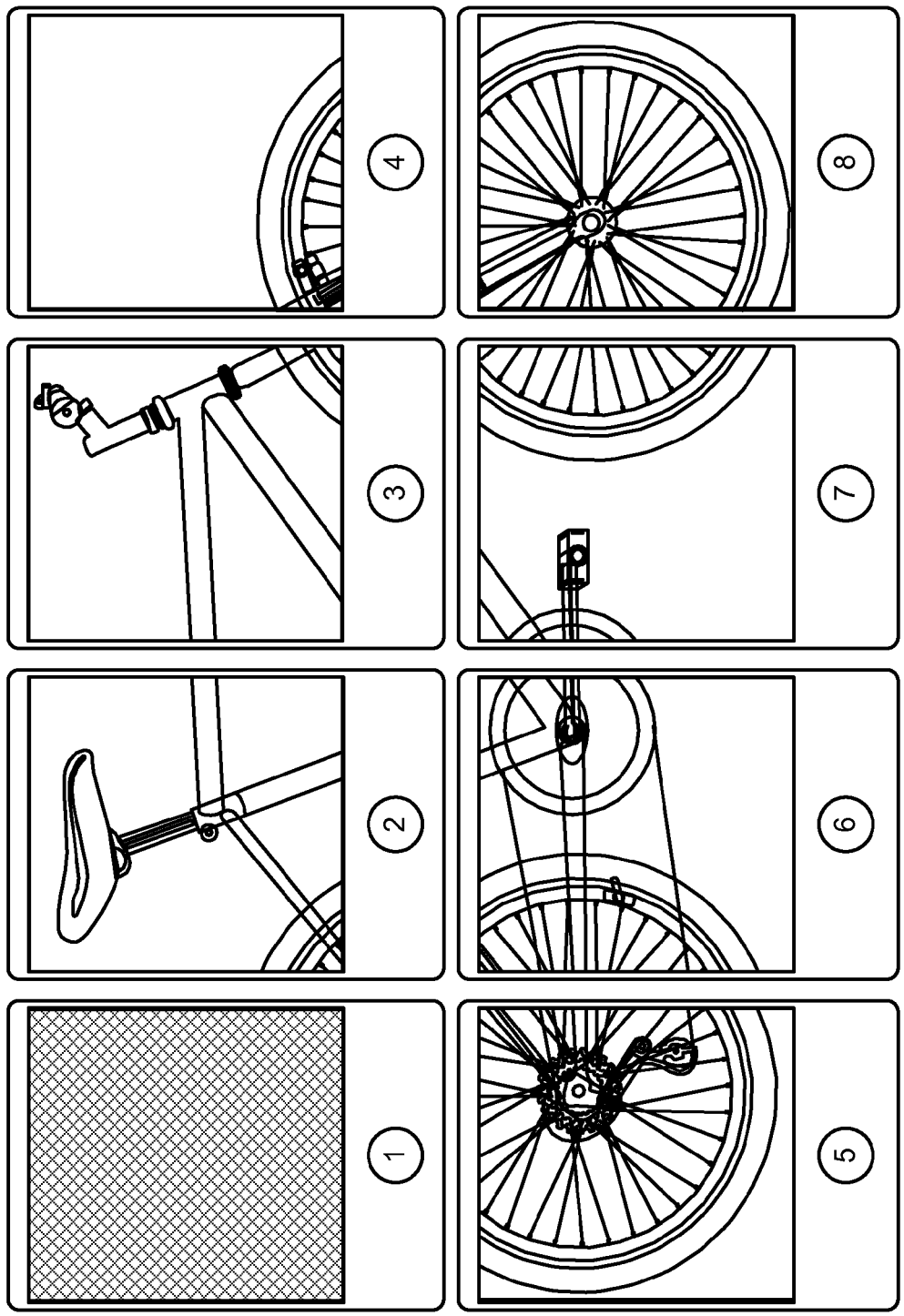
FIG. 10E illustrates another example arrangement of a coordinated display group during the process of FIG. 10A in accordance with an embodiment of the invention.

In conjunction with removing client devices 1 and 2 from the coordinated display group, the master application obtains updated synchronization information that indicates current relative orientation and position data for each of client devices 3 . . . N, 1020A (e.g., similar to 535 of FIG. 5). In FIG. 10A, the updated synchronization information obtained at 1015A can be obtained by actively checking the current relative orientation and position of client devices 3 . . . N, or alternatively the master application can simply update the previous synchronization information by removing client devices 1 and 2 from the aggregated display screen area without actively double-checking whether the positions or orientations of client devices 3 . . . N have changed. For example, as shown in FIGS. 10B and 10C, the updated synchronization information received at 1020A can be configured to indicate that tablet computers 1 and 2 are removed from the aggregated display screen area altogether and that tablet computer 5 has been moved to tablet computer 2's old position in the aggregated display screen area, such that tablet computers 1 and 2 no longer satisfy a proximity condition for the coordinated display session. In another example, as shown in FIG. 10D, the updated synchronization information received at 1020A can be configured to indicate that tablet computer 1 no longer satisfies an orientation condition for the coordinated display session (e.g., a user may flip tablet 1 over so the display screen of tablet computer 1 is no longer oriented in alignment with the other tablet computers). In another example, as shown in FIG. 10E, the updated synchronization information received at 1020A can be configured to indicate that tablet computer 1 has lost its display capability and thereby no longer satisfies a display capability condition for the coordinated display session (e.g., tablet computer 1 may go into low-power mode and cut off power to its display screen).

After obtaining the updated synchronization information at 1020A, the master application updates the mapping of the visual data based on (i) the display capability information of client devices 3 . . . N as reported at 520, and (ii) the updated synchronization information obtained at 1020A, in order to adapt the aggregated display screen area based on the departure of client devices 1 and 2, 1025A. In context with FIG. 10B, because the exit of tablet computers 1 and 2 and the re-shuffling of tablet computer 5 to tablet computer 2's old position decreases the horizontal-portion of the aspect ratio of the aggregated display screen area (i.e., the aggregated display screen area is essentially crunched together), the updated mapping at 1025A for the example shown in FIG. 10B would crunch or condense the visual data within less horizontal distance, which causes each of tablet computers 3 . . . 8 to show a slightly different portion of the visual data as compared to before tablet computers 1 and 2 were removed. In context with FIG. 10D or 10E, because tablet computer 1 can no longer be relied upon to present its mapped portion of the visual data, the master application can update the mapping so as to exclude tablet computer 1 from the coordinated display session (although tablet computer 1 could remain registered to the coordinated display group itself for re-entry into the coordinated display session once its orientation and/or display capability recovers). At this point, the master application can either also remove tablet computer 2 from the coordinated display session and "crunch" the visual data for presentation by tablet computers 2 . . . 4 and 6 . . . 8 as shown in FIG. 10C. Alternatively the master application can omit tablet computer 1 from the coordinated display session while retaining tablet computer 2, in which case the resultant presentation simply omits an upper-left portion of the visual data as shown in FIGS. 10D and 10E. After generating the updated mapped portions of the visual data at 1025A, the master application delivers the updated mapped portions of the visual data to client devices 3 . . . N, 1030A, and client devices 3 . . . N each present their respective updated mapped portions of the visual data, 1035A and 1040A.

In the embodiments described above with respect to FIGS. 5-10E, the control device that runs the master application which manages or arbitrates the coordinated display session is described under the assumption that the identity of the control device does not change during the coordinated display session. In another embodiment, the master application function can be transferred between devices during the coordinated display session. For example, in the embodiment of FIGS. 11A-11B described below, the transfer of the master application function is described as occurring from client device 1 to client device 2, where both client devices 1 and 2 are display participants coupled to display screens that form part of the aggregate display screen area for the coordinated display session. However, in other embodiments, the master application function does not need to be transferred between two client devices that are display participants in the coordinated display session, and instead could be transferred between a remote server to a local client device, between local client devices that are not coupled to display screens that form part of the aggregate display screen area for the coordinated display session and so on.

Figure 11A:
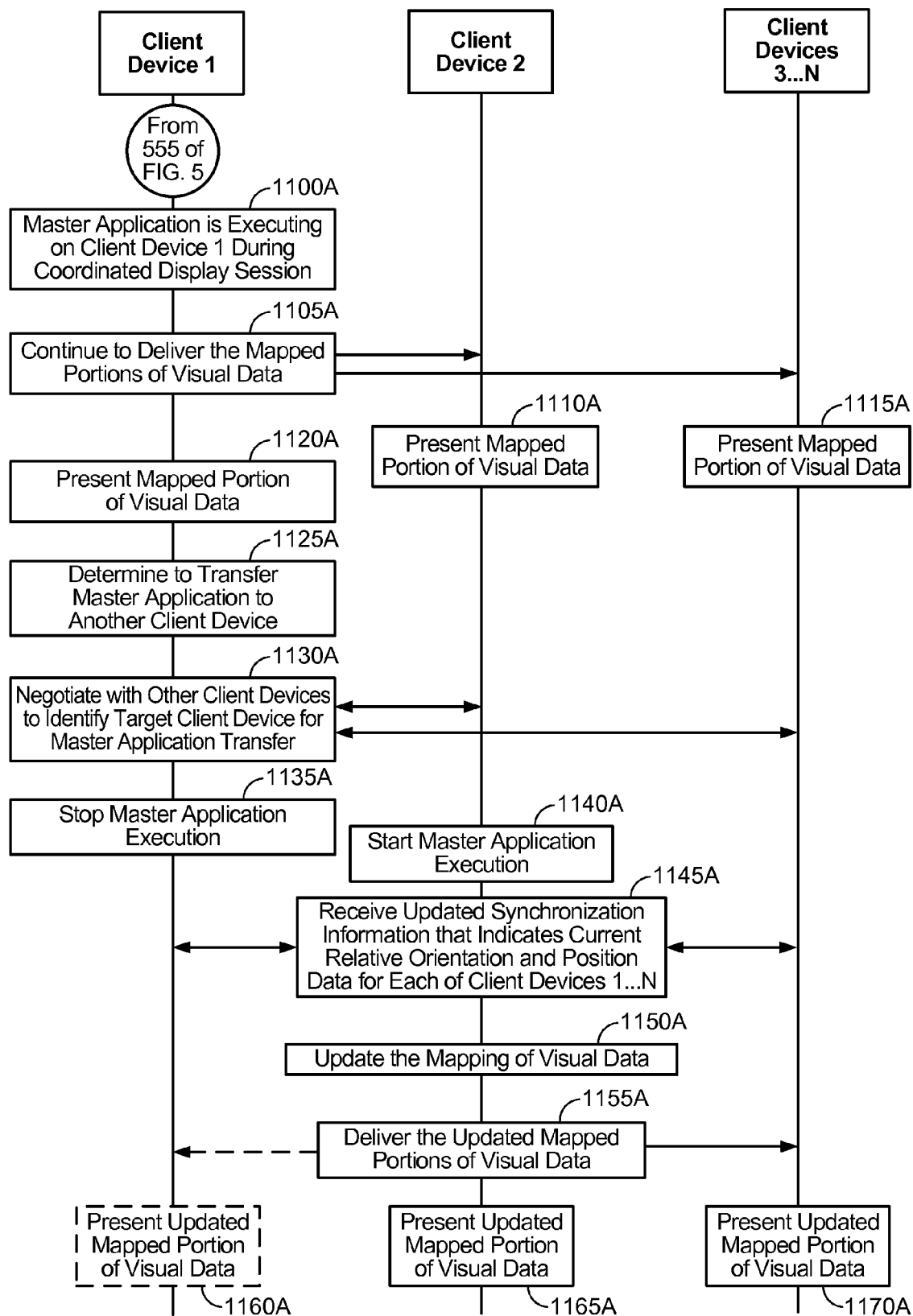
FIG. 11A is directed to a continuation of the process of FIG. 5 in accordance with another embodiment of the invention.

FIG. 11A is directed to a continuation of the process of FIG. 5 in accordance with another embodiment of the invention. Referring to FIG. 11A, after 555 of FIG. 5, assume that the master application on the current control device is executing on client device 1 during the coordinated display session, 1100A, and client device 1 (i.e., the current control device) continues to deliver the mapped portions of the visual data to client devices 2 . . . N, 1105A, and that client devices 1 . . . N continue to present the respective mapped portions of the visual data, 1110A, 1115A and 1120A. As will be appreciated, because client device 1 is the current control device during 1100A-1120A, client device 1 is effectively delivering the mapped portion of the visual data to itself at 1105A.

Later, during the coordinated display session, the master application determines to transition the master application function from client device to a different device, 1125A. In the embodiment of FIG. 11A, the master application specifically determines to transfer the master application function to another client device that is outputting part of the visual data during the coordinated display session, but in other embodiments the master application function could be transferred to a remote server or to a client device that is not outputting the visual data. The determination of 1125A can be reached in a variety of different ways. For example, a user of client device 1 may physically move client device 1 away from the aggregated display screen area to trigger the management (or master application) transfer decision (e.g., as in FIG. 11B, where tablet computer 1 moves away from the aggregate display screen area which triggers a transition of the master application function to tablet computer 2). Alternatively, the master application function transition determination of 1125A can be reached based on other triggering conditions, such as client device 1 experiencing a low battery condition.

After determining to transition the master application function away from client device 1 at 1125A, client device 1 negotiates with client devices 2 . . . N in order to identify a target client device for the master application function transfer, 1130A. For convenience of explanation, in the embodiment of FIG. 11A, assume that the negotiation of 1130A results in the master application determining to transition the master application function from client device 1 to client device 2, such that client device 2 will become the new control device running the master application. Under this assumption, client device 1 stops running the master application at 1135A, and client device 2 starts running the master application at 1140A. In an example, if client device 1 remains part of the coordinated display session after 1135A, the client device 1 can begin or continue execution of a client application which handles client device 1's display function for the coordinated display session and interacts with the master application that is now running on client device 2. Client device 2, on the other hand, does not necessarily stop running its corresponding client application in conjunction with its ascension to control device status, because it is possible that the master application on client device 2 will handle the visual data mapping and distribution aspects while the client application on client device 2 will separately handle the display function for the coordinated display session (i.e., client device 2 runs both the master application and client application for the coordinated display session because client device 2 is both the control device and an active display participant of the aggregate display screen area after 1140A).

Figure 11B:
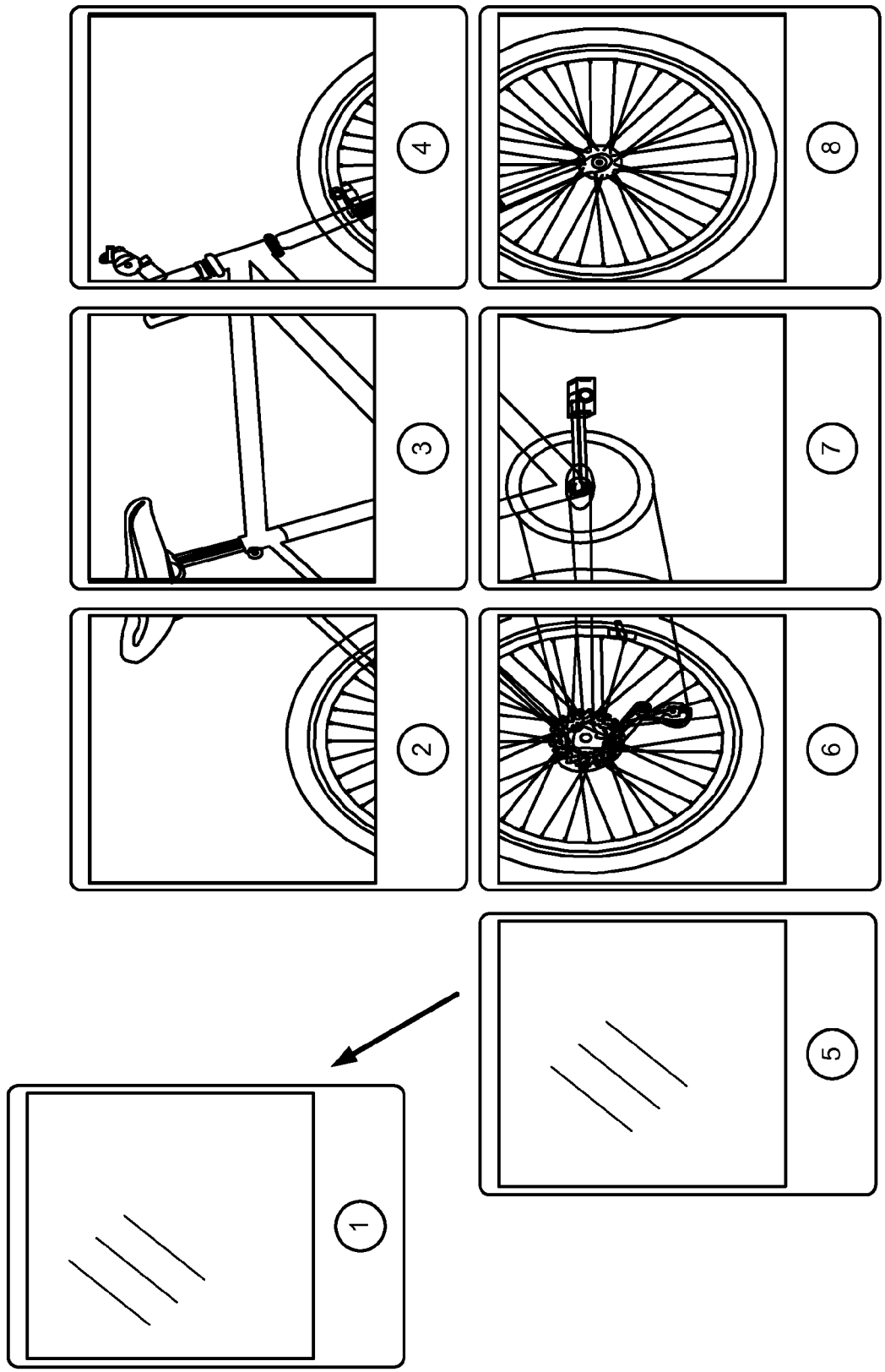
FIG. 11B illustrates an example arrangement of a coordinated display group during the process of FIG. 11A in accordance with another embodiment of the invention.

In conjunction with transitioning the master application function from client device 1 to client device 2, the master application (now on client device 2) obtains updated synchronization information that indicates current relative orientation and position data for each of client devices 1 . . . N, 1145A (e.g., similar to 535 of FIG. 5). In FIG. 11A, the updated synchronization information obtained at 1145A can be obtained by actively checking the current relative orientation and position of client devices 1 . . . N. For example, as shown in FIG. 11B, the updated synchronization information received at 1145A can be configured to indicate that tablet computer 1 is removed from the aggregated display screen area.

After obtaining the updated synchronization information at 1145A, the master application updates the mapping of the visual data based on (i) the display capability information of client devices 1 . . . N as reported at 520, and (ii) the updated synchronization information obtained at 1145A, in order to adapt to any changes to the aggregated display screen area, 1150A. In context with FIG. 11B, because the exit of tablet computer 1 skews the aspect ratio of the aggregated display screen area (i.e., the aggregated display screen area is no longer an approximate rectangle), the updated mapping at 1150A for the example shown in FIG. 11B could omit tablet computer 5 from the aggregate display screen area (while keeping tablet computer 5 in the coordinated display group) so that the 'rectangle' of tablet computers 2-4 and 6-8 could be used to output a modified version of the visual data or the mapping could be updated in some other way. After generating the updated mapped portions of the visual data at 1150A, the master application delivers the updated mapped portions of the visual data to client devices 1 and 3 . . . N, 1155A, and client devices 1 . . . N each present their respective updated mapped portions of the visual data, 1160A, 1165A and 1170A. In the embodiment of FIG. 11A, 1160A is optional because the transition of the master application function away from client device 1 may have been triggered by client device 1 being removed from proximity to the coordinated display session (e.g., see FIG. 11B), although it is possible that the client device 1 could have maintained its status as control device even if it were removed as a display participant of the coordinated display session.

Figure 12A:
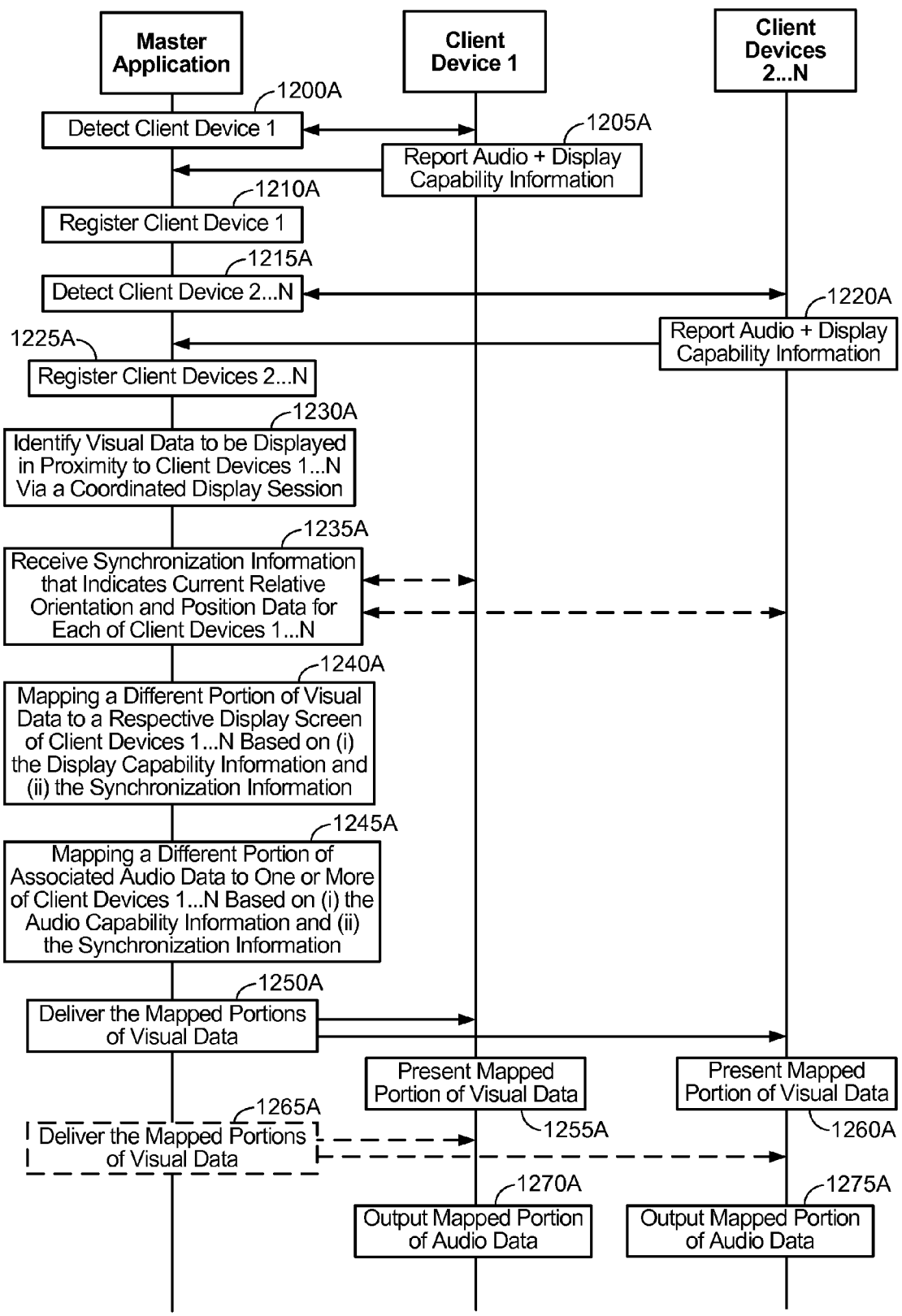
FIG. 12A corresponds to a modified implementation of the process of FIG. 5 that incorporates audio data as part of the coordinated display session in addition to the visual data in accordance with an embodiment of the invention.

FIG. 12A corresponds to a modified implementation of the process of FIG. 5 in accordance with an embodiment of the invention. In particular, FIG. 12A is modified to incorporate audio data being part of the coordinated display session in addition to the visual data.

Referring to FIG. 12A, 1200A through 1240A substantially correspond to 500 through 540 of FIG. 5, except that client devices 1 . . . N report their respective audio output capability information in addition to their display capability information at 1205A and 1220A. For example, client device 1 may report the amount of decibels that its speakers are capable of outputting, client device 2 may report that it is incapable of outputting audio data (e.g., no speakers, it is currently muted, etc.) and so on. Then, in addition to mapping the visual data to different client devices in 1240A, the master application can also map different portions of associated audio data to one or more of the client devices 1 . . . N based on (i) the audio output capability information reported at 1205A and/or 1220A, and (ii) the synchronization information from 1235A. The master application then delivers the mapped portions of the visual data to client devices 1 . . . N at 1250A which are presented at 1255A-1260A, and the master application also delivers the mapped portions of the audio data to one or more of client devices 1 . . . N at 1265A which are output at 1270A-1275A.

Figure 12B:
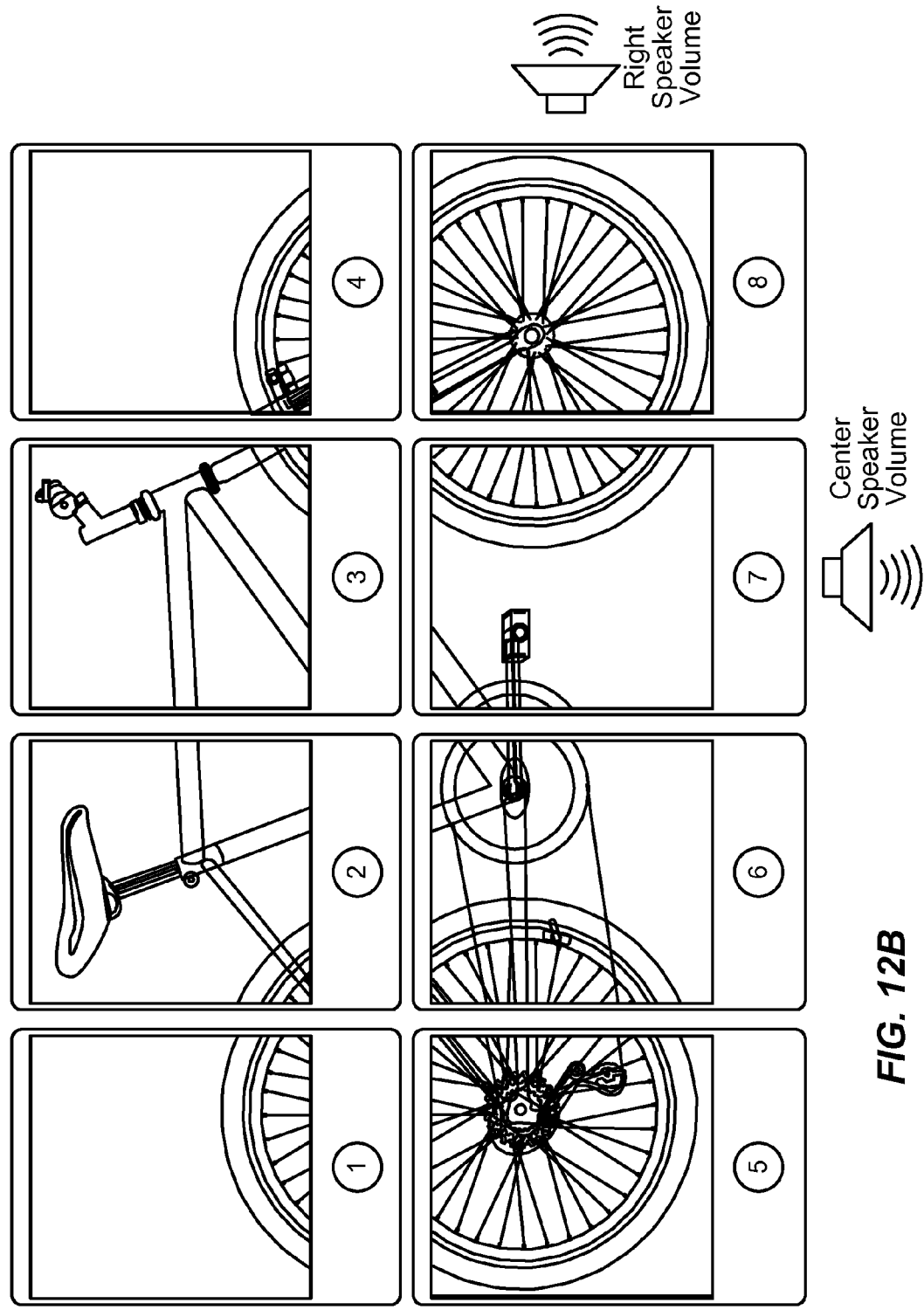
FIG. 12B illustrates an example arrangement of a coordinated display group during the process of FIG. 12A in accordance with another embodiment of the invention.

FIG. 12B illustrates a modified example of FIG. 6A that shows one manner audio can be mapped to the tablet computers 1 . . . 8. In the embodiment of FIG. 12B, tablet computer 1 is located at the top-right of the aggregate display screen area and is mapped to a left speaker volume portion of the audio data, tablet computer 8 is located at the bottom-right of the aggregate display screen area and is mapped to a right speaker volume portion of the audio data and tablet computer 7 is located at the bottom-center of the aggregate display screen area and is mapped to a center speaker volume portion of the audio data. While not shown in FIG. 12B, client devices that are not part of the coordinated display session for a display function purpose can be made part of the coordinated display session for the purpose of outputting audio (e.g., a dedicated audio receiver system, UEs that are located out of view of the aggregate display screen area but are positioned to produce a surround-sound effect, etc.).

In a further example, the target client devices to which the audio data is mapped can be based in part upon the content of the visual data that is being presented. For example, the aggregate display screen area in FIG. 12B is presenting an image or video of a bicycle. If the visual data is accompanied by a honking sound, the master application can determine that the bicycle's horn is being presented by tablet computer 3, so the sound of the bike horn should emanate from tablet computer 3 (if possible). In other examples, during a sportsthemed video, a ball may be moving across the aggregate display screen area, and the motion of the ball may be accompanied with some type of sound. The audio data for the sound can be tracked with the ball (e.g., based on analysis of motion vectors between successive I-frames, etc.) so that whichever client devices are currently displaying the ball are the target client devices for the associated audio output of the sound. In this example, viewers of the aggregate display screen area would be able to hear the ball whizzing past as it moves between the display screens.

Figure 13:
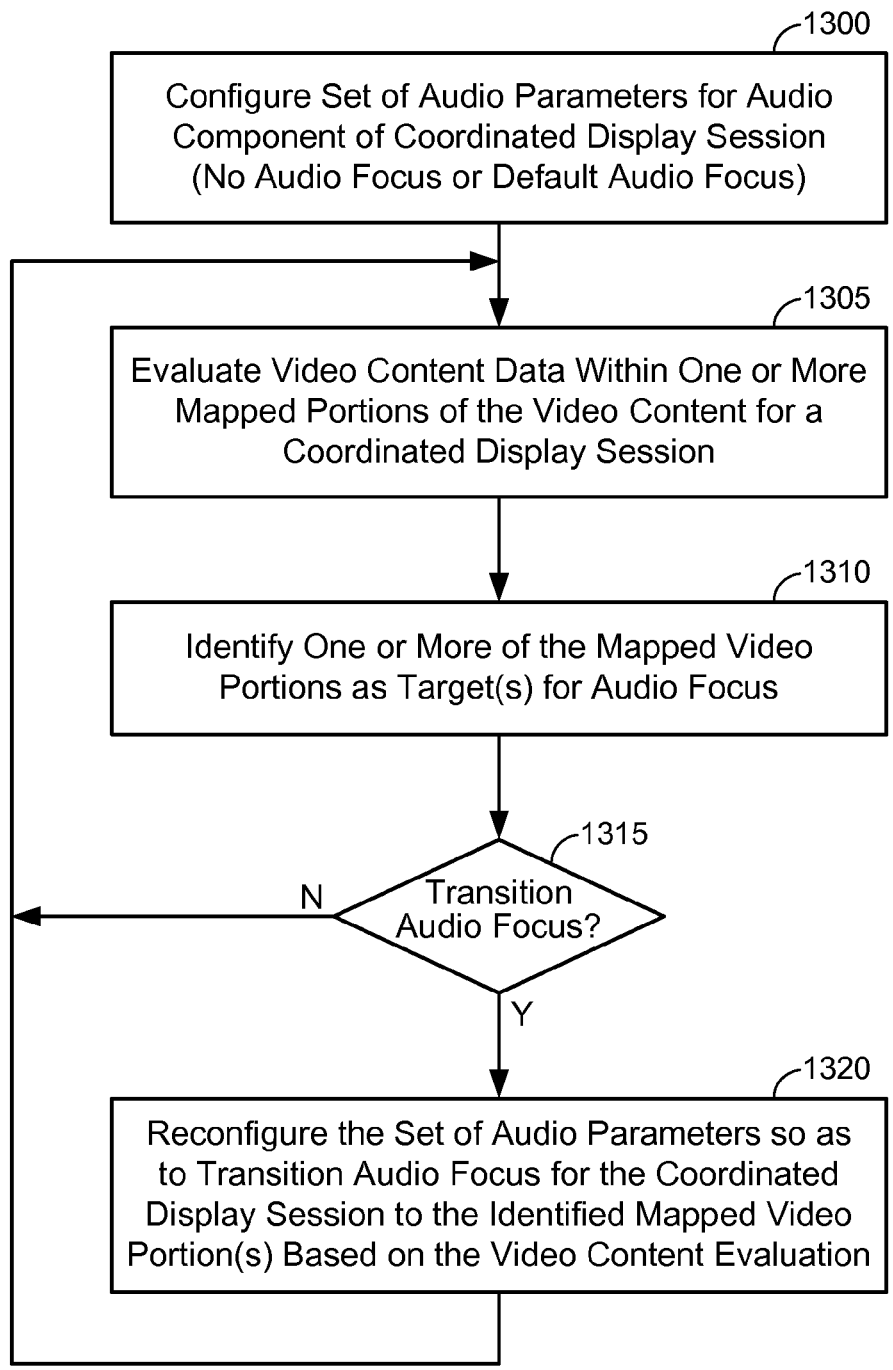
FIG. 13 illustrates a process of selectively transitioning an audio focus for a coordinated display session in accordance with an embodiment of the invention.

FIG. 13 illustrates a process of selectively transitioning an audio focus for a coordinated display session in accordance with an embodiment of the invention. As used herein, the "audio focus" refers to how a set of audio parameters for the coordinated display session is configured so as to emphasize a particular set of the mapped portions of visual data being presented by a corresponding set of client devices in the coordinated display session. The process of FIG. 13 can execute in conjunction with any of the coordinated display sessions described above, so long as the associated coordinated display session includes an audio component. In particular, the process of FIG. 13 can execute in conjunction with FIG. 12A by showing how the audio focus (or how the audio data is mapped at 1245A) can change during the coordinated display session based upon an evaluation of the video content for the coordinated display session.

Referring to FIG. 13, the master application configures a set of audio parameters for an audio component of the coordinated display session to accommodate either a default audio focus or no audio focus, 1300. For example, at 1300, each client device in the coordinated display session that is capable of outputting audio may be asked to output the same respective audio component at the same volume level without any audio focus being oriented upon any particular subset of the client devices. In another example, at 1300, the set of audio parameters can include audio orientation whereby client devices in the coordinated display session may have their respective mapped audio portions configured based on their relative location in the coordinated display session. An example of this type of scenario is discussed above and shown in FIG. 12B, whereby a right-most client device is configured as the "Right" speaker, a left-most client device is configured as the "Left" speaker, and a client device in the middle is configured as the "Center" speaker.

The set of audio parameters configured at 1300 can relate to any audio characteristic associated with the coordinated display session (e.g., which client devices are asked to output audio for the session, the volume level or amplitude at which one or more of the client devices are asked to output audio for the session, settings such as bass, treble and/or fidelity associated with audio to be output by one or more of the client devices, an audio orientation for the session such as 2.1 surround sound or 5.1 surround sound, etc.). In another example, the set of audio parameters can include how an equalizer function is applied to audio to be output for the coordinated display session (e.g., how the audio is processed through an enhancing or attenuation/de-emphasizing equalizer function). In the equalizer function example, if motion vectors (e.g., see FIGS. 14-15B) or object focus (e.g., see FIGS. 16-17B) trigger an audio focus transition, an enhancing equalizer function can be used to enhance the sound on the device(s) that are targets for the audio focus, whereas one or more non-target devices (e.g., devices depicting frame-portions with low motion or low focus) can have inverse functions viz. inverse equalizer processing applied to their respective audio portions. Accordingly, while the examples below primarily relate to the set of audio parameters being volume level or audio orientation, this is primarily to simplify the disclosure and other embodiments can relate to parameters for any type of audio characteristic being included among the set of audio parameters configured at 1300 (and/or reconfigured at 1320).

The configuration of the set of audio parameters can occur at the beginning of the coordinated display session in an example, and/or at the start-point of audio for the coordinated display session. While not shown explicitly in FIG. 13, the set of audio parameters configured at 1300 can change without the audio focus being changed based on video content analysis. For example, assume that the set of audio parameters is configured as shown in FIG. 12B, and that two additional tablet computers are added to the right of tablet computers 4 and 8, respectively. At this point, the two new tablet computers become the right-most client devices in the coordinated display session, which can trigger a transfer of the "Right" speaker function to one (or both) of the new tablet computers (and also a modification to how the video portions are being mapped so that the video being presented is stretched over the wider display area).

After the set of audio parameters is configured at 1300, assume that the coordinated display session continues for a period of time with the audio component being output in accordance with the configured set of audio parameters. During the coordinated display session, the master application evaluates video content data within one or more mapped portions of the video content, 1305. For example, the evaluated video content data can include one or more motion vectors (e.g., see FIGS. 14-15B) and/or object focus data (e.g., see FIGS. 16-17B). Based on the evaluation of the video content data from 1305, the master application identifies one or more of the mapped video portions as target(s) for the audio focus of the coordinated display session, 1310. For example, a first subset of two high-motion mapped video portions can be targeted for the audio focus, or a second subset of mapped video portions including a block of high-focus objects can be targeted for the audio focus, and so on. After identifying the target(s) for the audio focus in 1310, the master application determines whether to transition the audio focus for the coordinated display session, 1315. For example, if a current configuration of the set of the audio parameters is not focused upon the mapped video portion(s) identified as target(s) for the audio focus, the master application may determine to transition the audio focus at 1315. Of course, if the current configuration of the set of the audio parameters is already focused upon the mapped video portion(s) identified as target(s) for the audio focus, then no change to the audio focus may be necessary. If the master application determines not to transition the audio focus at 1315, the coordinated display session continues using the current set of audio parameters and the process returns to 1305 where the master application continues to evaluate the video content data within one or more mapped portions of the video content for the coordinated display session. Otherwise, if the master application determines to transition the audio focus at 1315, the process advances to 1320. At 1320, the master application reconfigures the set of audio parameters so as to transition the audio focus for the coordinated display session to the identified mapped video portion(s) from 1310 based on the video content evaluation (e.g., by adjusting volume levels being output by one or more of the client devices in the session, changing an audio configuration for the session, e.g., 2.1 to 5.1 surround sound or vice versa, modifying how enhancing or de-emphasizing equalizer functions are applied to audio being mapped to one or more client devices in the session, etc.). After reconfiguring the set of audio parameters at 1320, the coordinated display session continues using the reconfigured set of audio parameters and the process returns to 1305 where the master application continues to evaluate the video content data within one or more mapped portions of the video content for the coordinated display session. So, to put FIG. 13 into context with FIG. 12A, the set of audio parameters reconfigured at 1320 can be used to update the mapped portions of the audio data from 1245A-1260A during the coordinated display session.

Figure 14:
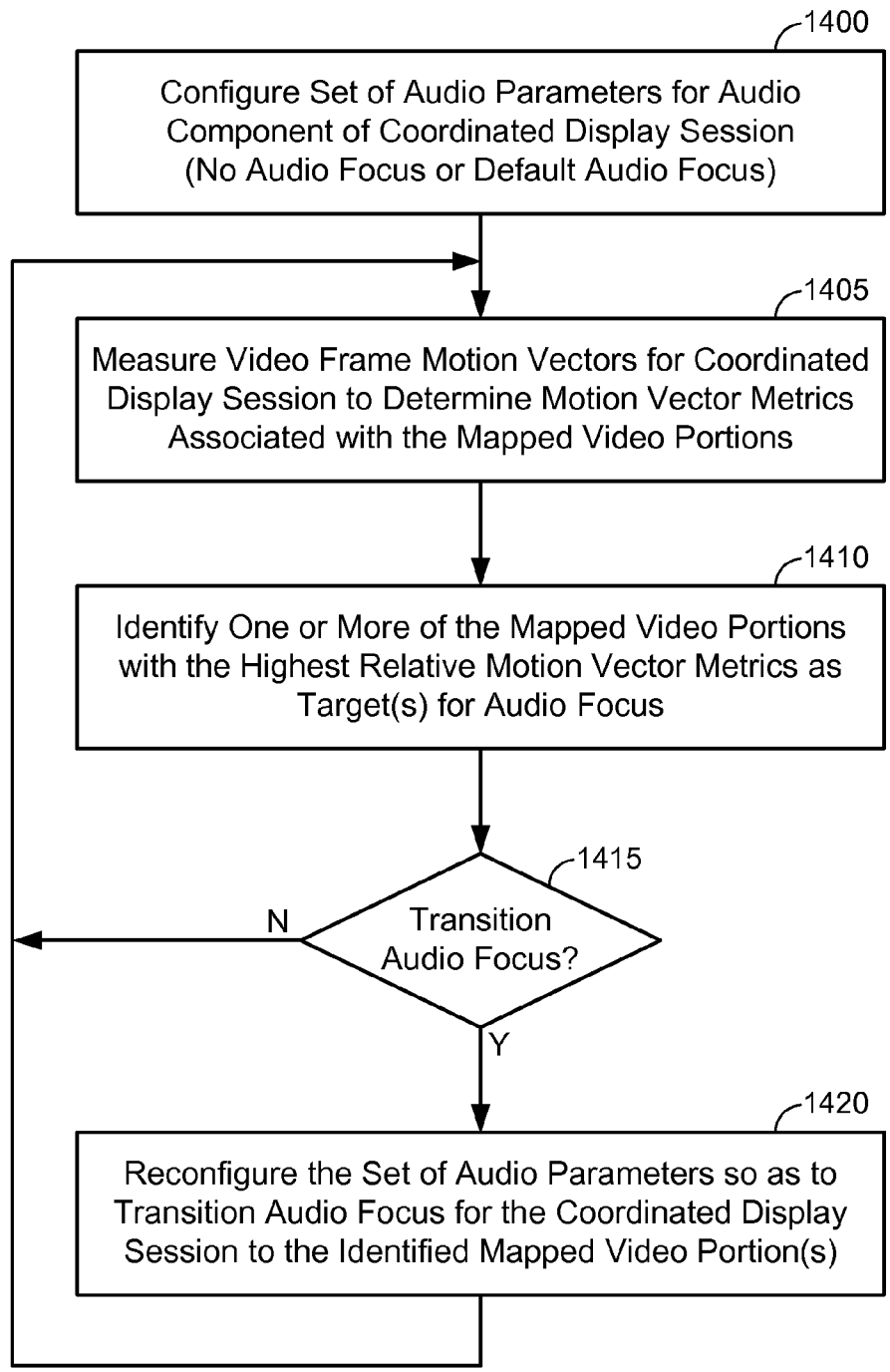
FIG. 14 illustrates an example implementation of the process of FIG. 13 in accordance with an embodiment of the invention.

FIG. 14 illustrates an example implementation of the process of FIG. 13 in accordance with an embodiment of the invention. Referring to FIG. 14, 1400 corresponds to 1300 of FIG. 13 and will not be described further for the sake of brevity. At 1405, the master application evaluates the video content data by measuring, within a given video frame being divided into the mapped video portions and streamed for presentation during the coordinated display session, video frame motion vectors of the coordinated display session in order to determine motion vector metrics for each of the mapped portions of the video data, 1405. Based on the measured video frame motion vectors, the master application identifies one or more of the mapped video portions with the highest relative motion vector metrics as target(s) for the audio focus of the coordinated display session, 1410. Next, 1415 and 1420 correspond to 1315 and 1320 of FIG. 13, respectively, and will not be described further for the sake of brevity. As will be appreciated, the video frame motion vector measurements from 1405 can vary from frame to frame, and the audio focus can shift accordingly. Further, multiple objects in different mapped video portions can be associated with the same or similar degree of motion, in which case the audio focus can include separate audio focus components that focus on each respective mapped video portion that contains a high (or highest) motion object (e.g., any object with a motion above a motion threshold).

For example, at 1405, video frame motion vectors that correspond to the video being collectively output by the client devices participating in the coordinated display session are measured in real-time by the master application. The video frame motion vectors can then be analyzed to detect an object (or objects) with the highest relative motion vector (1410). Then, the audio focus can shift (1415-1420) to focus on the identified high-motion object (or objects) by reconfiguring the set of audio parameters so that a client device outputting the mapped video portion with the detected object(s) outputs audio at a higher relative volume and/or amplification, by temporarily muting or lowering the volume output by other client devices, and so on. In a specific example, a given client device outputting the mapped video portion with the detected object(s) can have its volume raised 50%, each adjacent client device to the given client device can have their respective volume raised 25%, each client device that is two-screens (or two-positions) away from the given client device can play at a normal or default volume level, and each other client device can have their respective volume temporarily muted or lowered by some percentage.

Figure 15A:
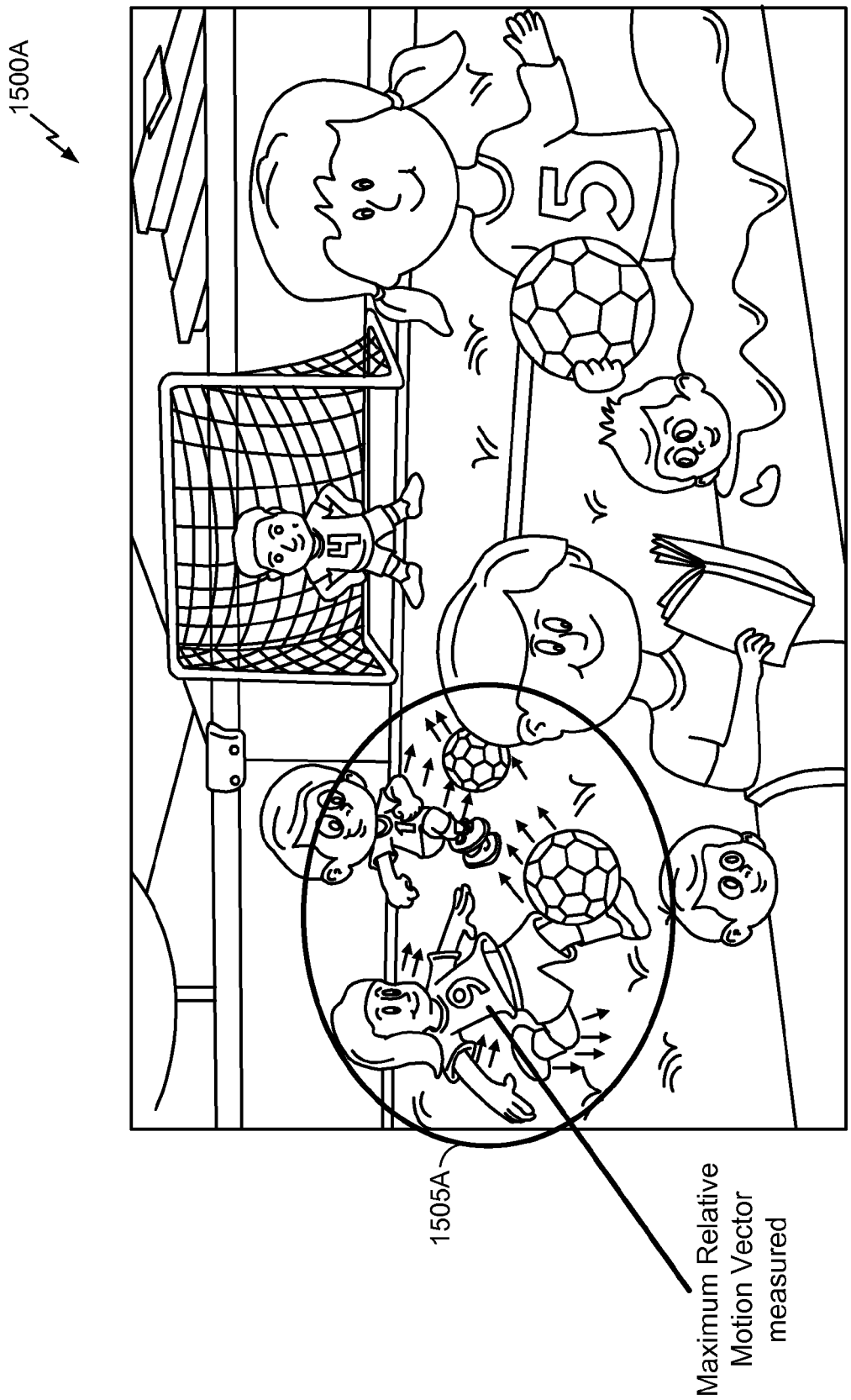
FIG. 15A illustrates an example of a motion vector for a video frame.
Figure 15B:
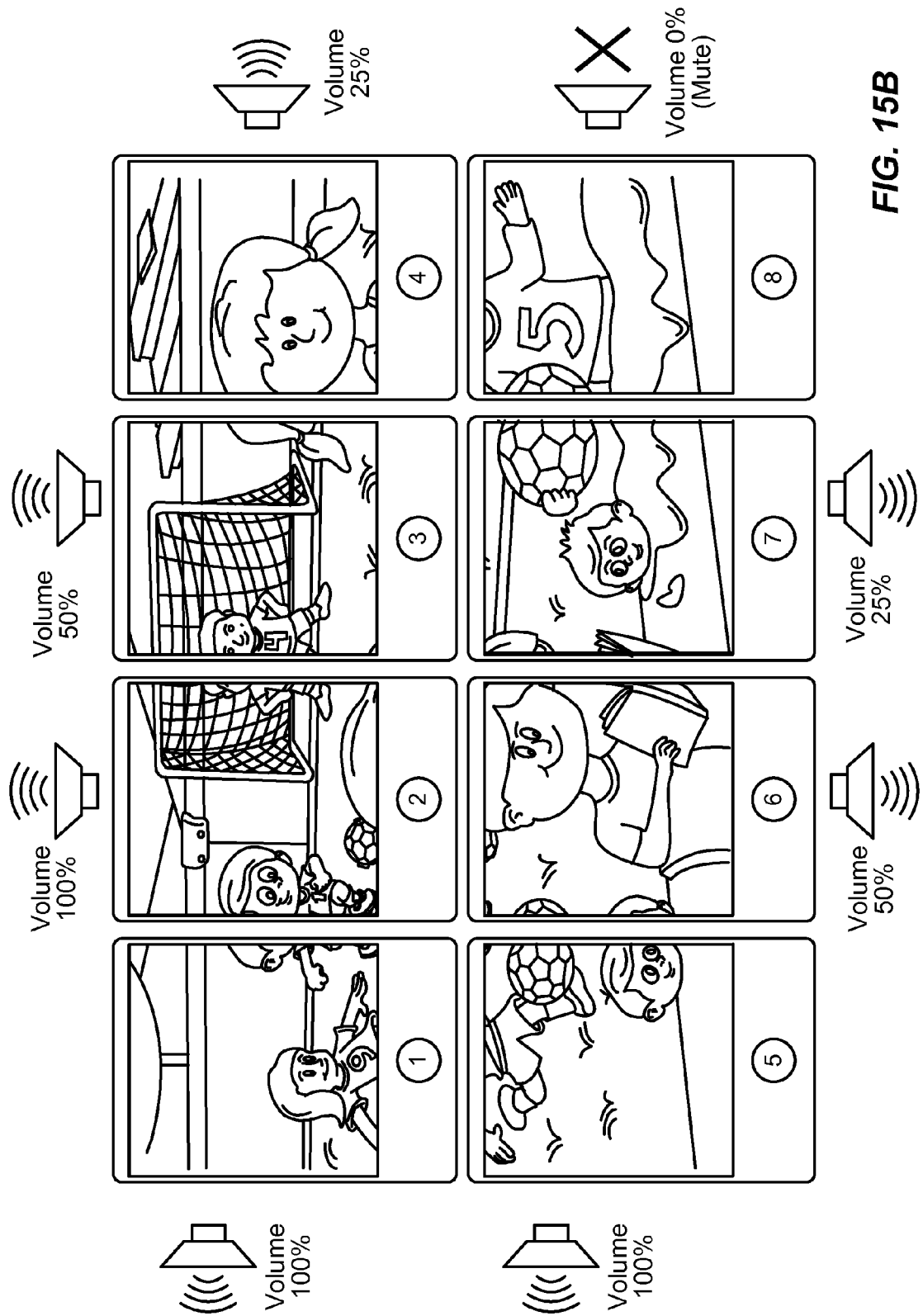
FIG. 15B illustrates how the video frame is presented during execution of the process of FIG. 14 in accordance with an embodiment of the invention.

FIG. 15A illustrates an example of a motion vector for a video frame, and FIG. 15B illustrates how the video frame is presented during execution of the process of FIG. 14 in accordance with an embodiment of the invention. Referring to FIG. 15A, a video frame 1500A is illustrated, whereby the video frame 1500A includes a set of high-motion objects in a particular region 1505A of the video frame 1500A. In particular, the high-motion objects include a person's leg that is in the act of kicking a soccer ball. Other parts of the video frame 1500A may also be associated with motion, but not as much as the set of high-motion objects in the region 1505A. Next, assume that the video frame 1500A is mapped to tablet computers 1 . . . 8 as shown in FIG. 15B using the tablet computer arrangement example introduced above. As will be appreciated, the set of high-motion objects from the region 1505A is being displayed primarily within the mapped video portions output by tablet computers 1, 2 and 5. So, the audio focus from 1415-1420 is transitioned so as to focus upon tablet computers 1, 2 and 5. In an example, as shown in FIG. 15B, the audio focus can shift to tablet computers 1, 2 and 5 by outputting audio at tablet computers 1, 2 and 5 at 100% speaker volume while outputting audio at the other tablet computers at a relatively attenuated volume level (e.g., some lower volume level or even muting entirely, e.g., 50%, 25% and 0%, respectively, based on how far the respective client devices are from the high-motion mapped video portions). While not shown in FIGS. 15A-15B, it is possible that other high-motion objects could exist concurrently with the set of high-motion objects in the region 1505A. If so, the audio focus could include multiple audio focus regions or concentrations, although this alternative scenario is not explicitly illustrated in FIG. 15B. While FIGS. 15A-15B illustrate an example whereby the reconfigured set of audio parameters corresponds to speaker volume levels, it will be appreciated that other example implementations of FIG. 14 can be directed to using motion vector metrics to manipulate other types of audio parameters (e.g., bass, treble and/or fidelity of the associated audio, equalizer functions, an audio configuration such as 2.1 or 5.1 pseudo surround sound, etc.).

Figure 16:
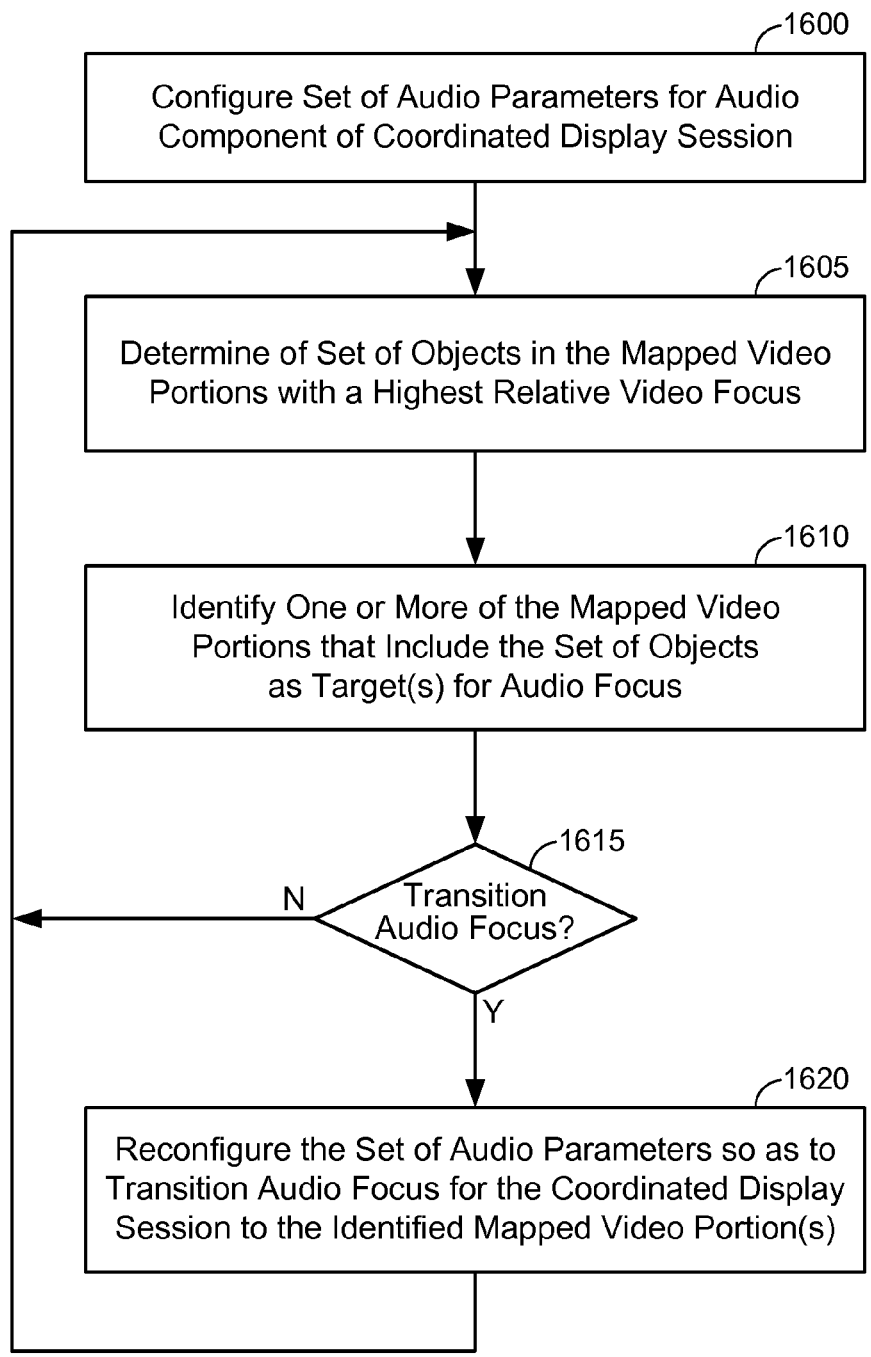
FIG. 16 illustrates an example implementation of the process of FIG. 13 in accordance with another embodiment of the invention.

FIG. 16 illustrates an example implementation of the process of FIG. 13 in accordance with another embodiment of the invention. Referring to FIG. 16, 1600 corresponds to 1300 of FIG. 13 and will not be described further for the sake of brevity. At 1605, the master application evaluates the video content data to determine, within a given video frame being divided into the mapped video portions and streamed for presentation during the coordinated display session, a set of objects with the highest or "crispest" level of video focus relative to other objects or subjects in the given video frame, 1605. The master application identifies one or more of the mapped video portions that include the determined set of objects as target(s) for the audio focus of the coordinated display session, 1610. Next, 1615 and 1620 correspond to 1315 and 1320 of FIG. 13, respectively, and will not be described further for the sake of brevity. As will be appreciated, the object-specific video focus measurements from 1605 can vary from frame to frame, and the audio focus can shift accordingly. Further, multiple objects in different mapped video portions can be associated with the same or similar degree of object focus, in which case the audio focus can include separate audio focus components that focus on each respective mapped video portion that contains a high (or highest) in-focus object (e.g., any object with a level of object focus that is above a focus threshold).

For example, at 1605, video frames from the video being collectively output by the client devices participating in the coordinated display session are measured in real-time by the master application. The video frames can then be analyzed to detect an object (or objects) with the highest relative object focus (1610). Then, the audio focus can shift (1615-1620) to focus on the identified in-focus object (or objects) by reconfiguring the set of audio parameters so that a client device outputting the mapped video portion with the detected object(s) outputs audio at a higher relative volume and/or amplification, by temporarily muting or lowering the volume output by other client devices, and so on. In a specific example, a given client device outputting the mapped video portion with the detected object(s) can have its volume raised 50%, each adjacent client device to the given client device can have their respective volume raised 25%, each client device that is two-screens (or two-positions) away from the given client device can play at a normal or default volume level, and each other client device can have their respective volume temporarily muted or lowered by some percentage.

Figure 17A:
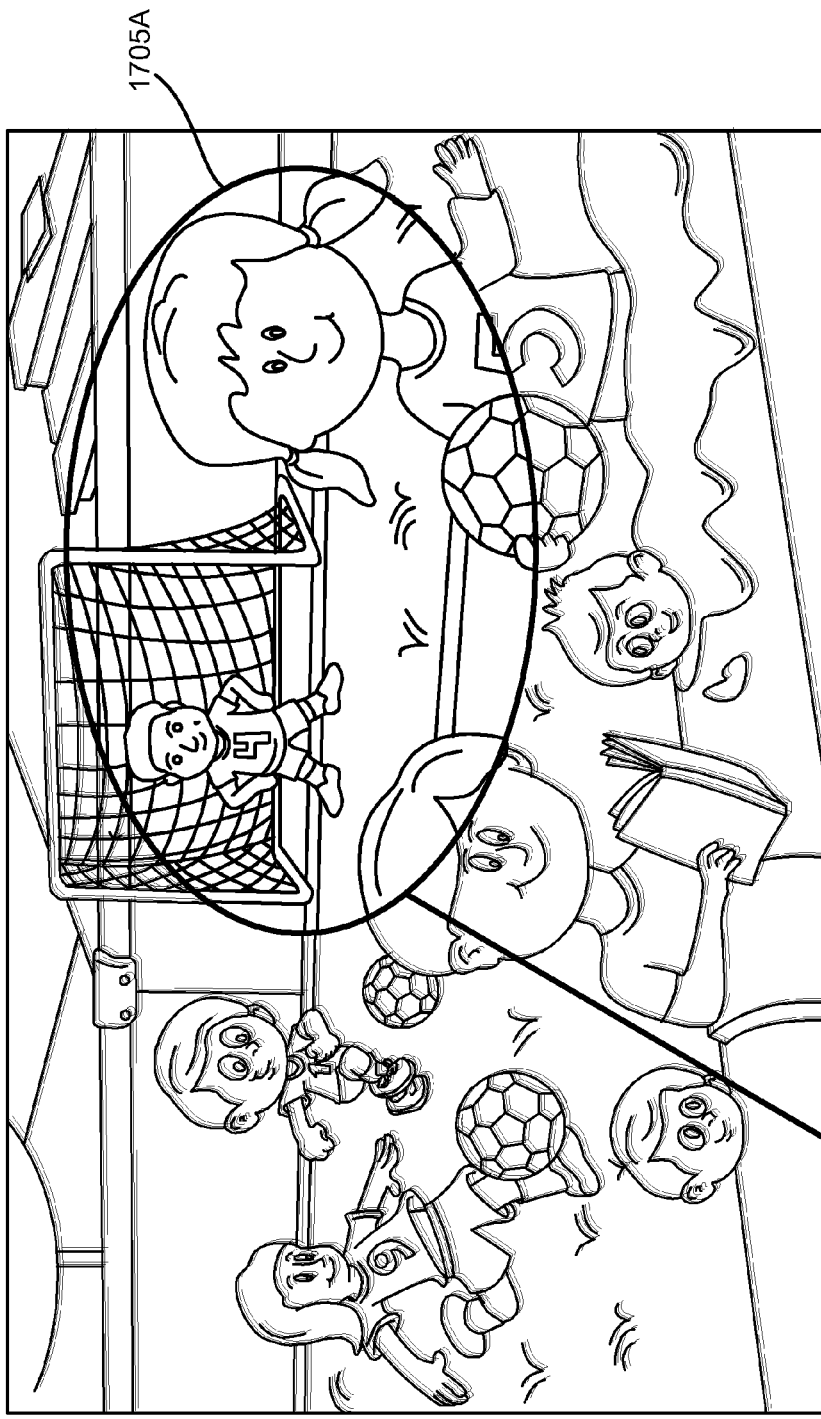
FIG. 17A illustrates an example of how different objects can have different levels of focus in a video frame.

FIG. 17A illustrates an example of how different objects can have different levels of focus in a video frame, and FIG. 17B illustrates how the video frame is presented during execution of the process of FIG. 16 in accordance with an embodiment of the invention. Referring to FIG. 17A, a video frame 1700A is illustrated, whereby the video frame 1700A includes a set of high focus (or in-focus) objects in a particular region 1705A of the video frame 1700A. In particular, the in-focus objects include a soccer goalie, a soccer goal and a girl holding a soccer ball on the sidelines. Other parts of the video frame 1700A may also be associated with various degrees of focus, but not as much as the set of in-focus objects in the region 1705A. Next, assume that the video frame 1700A is mapped to tablet computers 1 . . . 8 as shown in FIG. 17B using the tablet computer arrangement example introduced above. As will be appreciated, the set of in-focus objects from the region 1705A is being displayed primarily within the mapped video portions by tablet computers 3, 4, 7 and 8. So, the audio focus from 1615-1620 is transitioned so as to focus upon tablet computers 3, 4, 7 and 8. In an example, as shown in FIG. 17B, the audio focus can shift to tablet computers 3, 4, 7 and 8 by outputting audio at tablet computers 3, 4, 7 and 8 at 100% speaker volume while outputting audio at the other tablet computers at a relatively attenuated volume level (e.g., some lower volume level or even muting entirely, e.g., 50%, 25% and 0%, respectively, based on how far the respective client devices are from the high-motion mapped video portions). While not shown in FIGS. 17A-17B, it is possible that other high-focus objects could exist concurrently with the set of high-focus objects in the region 1505A. If so, the audio focus could include multiple audio focus regions or concentrations, although this alternative scenario is not explicitly illustrated in FIG. 17B. While FIGS. 17A-17B illustrate an example whereby the reconfigured set of audio parameters corresponds to speaker volume levels, it will be appreciated that other example implementations of FIG. 16 can be directed to using object focus to manipulate other types of audio parameters (e.g., bass, treble and/or fidelity of the associated audio, equalizer functions, an audio configuration such as 2.1 or 5.1 pseudo surround sound, etc.).

Further, while FIGS. 14 and 16 are described as separate implementations of the process of FIG. 13, in another example the processes of FIGS. 14 and 16 can be executed in parallel. For example, consider a series of video frames with multiple objects (e.g., subjects) playing soccer wherein the soccer ball is moving from one subject to another. In accordance with FIG. 14, the master application can evaluate the series of video frames to detect high-motion in the mapped video portions that depict the soccer ball as it shifts from one player to another, and thereby determine these mapped video portions as targets for the audio focus. However, further consider that the object focus can also shift as the soccer ball is passed around because the soccer ball is probably the most relevant object in the series of video frames and a camera is likely to attempt to focus on the soccer ball and its immediate vicinity. In accordance with FIG. 16, the master application can evaluate the series of video frames to detect one or more in-focus objects (e.g., the soccer ball and one or more nearby objects to it, such as one of the soccer players, a soccer goal, etc.) in the mapped video portions, and thereby determine these mapped video portions as targets for the audio focus. So, the combination of mapped video portions that qualify for audio focus targets in accordance with parallel execution of both FIG. 14 and FIG. 16 can be used as an expanded or enhanced audio focus in at least one example, with the expanded or enhanced audio focus being yet another example of execution of FIG. 13.

Further, as the coordinated display session is implemented, the process of FIG. 13 (e.g., or the parallel processes of FIGS. 14 and 16) can be execute on a frame-by-frame basis (e.g., for each video frame presented during the coordinated display session), or alternatively can be implemented more selectively for specific video frames. For example, the granularity of executing a frame-specific audio focus procedure as in FIG. 13, 14 or 16 can range from every video frame to every Nth video frame. Generally, executing a frame-specific audio focus procedure as in FIG. 13, 14 or 16 more frequently will result in a more immersive audio experience, whereas executing the frame-specific audio focus procedure as in FIG. 13, 14 or 16 less frequently will conserve resources (e.g., power resources, memory resources, processing resources, etc.).

Further, while the client devices shown in FIGS. 15B and 17B as participating in the audio output component for the coordinated display session are also video output participants that are each receiving and outputting a video component of the coordinated display session, the audio presentation devices for the coordinated display session do not necessarily need to double as video presentation devices for the coordinated display session. For example, a first proximity threshold to qualify as a video presentation device for the coordinated display session may be less than a second proximity threshold to qualify as an audio presentation device for the coordinated display session (e.g., because proximally disparate video sources lose their relevance to the coordinated display session more quickly than proximally disparate audio sources). So, tablet computers 1 and 2 could remain audio presentation devices in the coordinated display session in FIG. 10B for a period of time after tablet computers 1 and 2 are removed as video presentation devices in the coordinated display session. In another example, an orientation requirement for video presentation is less relevant for audio presentation. So, tablet computer 1 could remain an audio presentation device in the coordinated display session in FIG. 10D after it is flipped over because improper screen orientation does not obviate an audio function.

While FIGS. 13-18 are directed to selectively transitioning an audio focus for the coordinated display session based on a video content analysis of the respective mapped video portions being delivered and output by the proximate client devices participating in the coordinated display session, FIGS. 18-22B are directed to selectively modifying one or more session parameters (e.g., audio and/or non-audio parameters) based upon eye movement monitoring feedback related to a viewing population of the coordinated display session in accordance with embodiments of the invention. The process of FIG. 18 can execute in conjunction with any of the coordinated display sessions described above.

Figure 18:
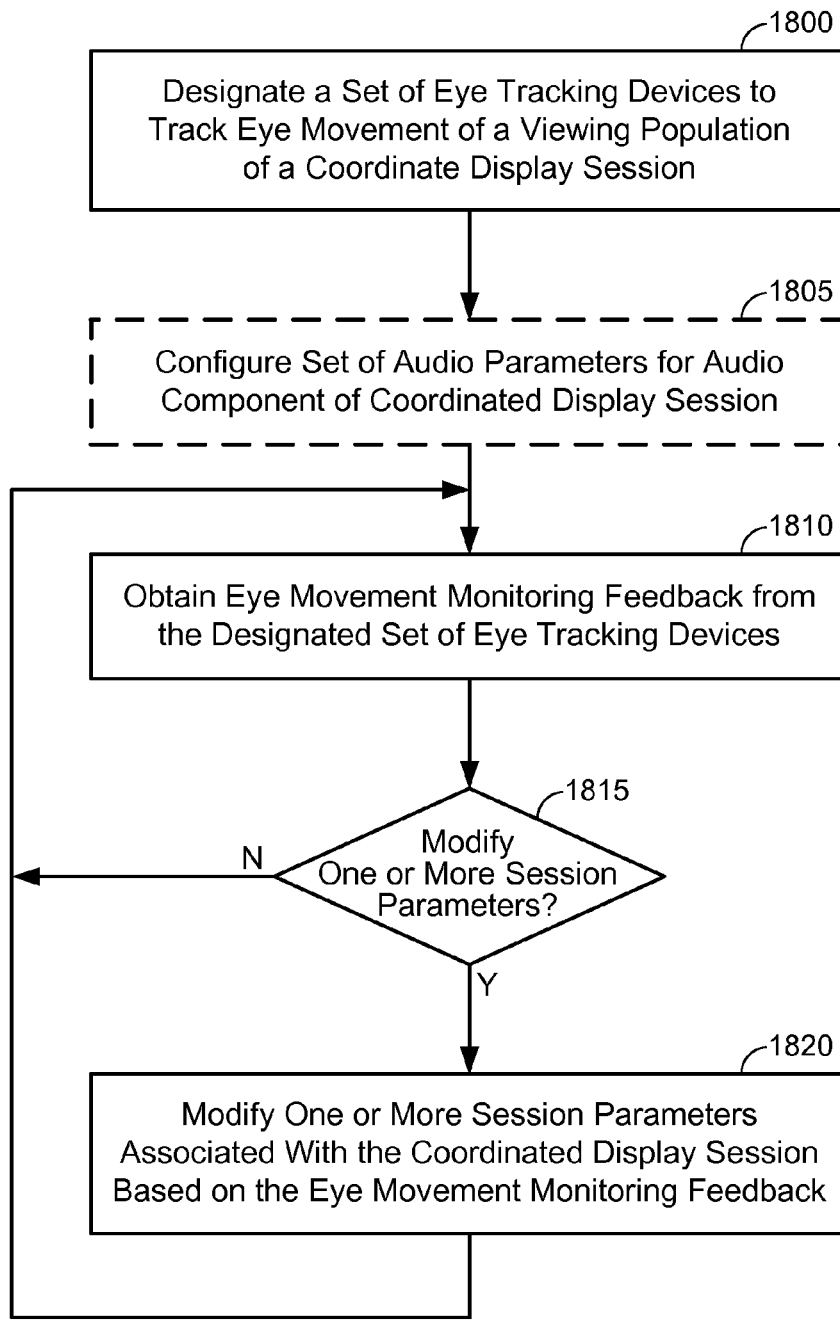
FIG. 18 illustrates a process of selectively modifying one or more session parameters based upon eye movement monitoring feedback related to a viewing population of the coordinated display session in accordance with an embodiment of the invention.

FIG. 18 illustrates a process of selectively modifying one or more session parameters based upon eye movement monitoring feedback related to a viewing population of the coordinated display session in accordance with an embodiment of the invention.

Referring to FIG. 18, a set of eye tracking devices is designated for tracking eye movement of a viewing population (e.g., one or more proximate viewers) of a coordinated display session, 1800. The set of eye tracking devices (e.g., a set of front-mounted cameras provisioned on at least one of the proximate client devices participating in the coordinated display session) can be designated by the master application (e.g., in response proximity detection of one or more viewers), or alternatively the set of eye tracking devices can be independently selected (or self-selecting) (e.g., each proximate client device participating as a video presentation device for the coordinated display session independently detects whether any viewers are proximate, and if so, attempts to track the eye movements of the proximate viewers). At 1805, the master application optionally configures a set of audio parameters (e.g., volume levels, an audio configuration for the session, e.g., 2.1 to 5.1 surround sound, how an enhancing or de-emphasizing equalizer functions are applied to the audio being mapped to different client devices in the session, etc.) for an audio component of the coordinated display session, 1805 (e.g., similar to 1300 of FIG. 13). In FIG. 18, 1805 is optional because the coordinated display session may not have an audio component (e.g., video-only). After 1810, assume that the coordinated display session continues for a period of time, during which the master application obtains eye movement monitoring feedback from the designated set of eye tracking devices, 1810.

At 1810, in a first embodiment, assume that the set of eye tracking devices corresponds to a single master eye tracking device that is responsible for tracking the eye movements of each viewer in the viewing population. In this case, the master eye tracking device can execute a "baselining" operation which establishes the central eye position on the horizontal axis and vertical axis. The "baselining" operation could be triggered as a dedicated "calibration step/moment/time window" during setup of the coordinated display session, irrespective of where the viewing population is expected to be looking at that particular time. Alternatively, the baselining operation can be triggered in association with a prompt that is expected to draw the gazes of the viewing population. For example, a "play/start" touch-screen option may be output by one of the video presentation devices in the viewing population, such as the device designated as the master eye tracking device. In this case, when a viewer presses the play/start button being displayed on the master eye tracking device, the viewer can reasonably be expected to be looking at the play/start button, which can assist in eye tracking calibration. Eye movement along the horizontal axis (up/down) and vertical axis (left/right) can thereafter be measured by the master eye tracking device and conveyed back to the master application as the eye movement monitoring feedback at 1810. In a further example, a max threshold of eye movement can be established beyond which the eye tracking deviations would be ignored (e.g., either omitted from the eye movement monitoring feedback by the master eye tracking device, or included in the eye movement monitoring feedback by the master eye tracking device and then discarded by the master application). For example, the max threshold can include max values for horizontal and vertical movement "delta" from the baseline, whereby the delta is the angular deviation for the stare relative to the baseline.

At 1810, in a second embodiment, instead of designing at single master eye tracking device, a distributed eye tracking solution can be implemented. In this case, two or more client devices (e.g., potentially all of the video presentation devices participating in the coordinated display session) are designated to perform eye tracking and the two or more designated eye tracking devices establish the horizontal and vertical deviation of the viewer's stare/gaze from the principal and perpendicular axis. Each of the two or more designated eye tracking devices independently acts on the deviation measures therein and attenuates or amplifies the audio stream. In an example, in the distributed eye tracking mode, if there is a 3×3 array (not shown) of video presentation devices and the viewer is looking at the top-right device, other devices would measure horizontal and vertical axis stare/gaze deviation increasing from right to left as well as from top to bottom. In another example, in the distributed eye tracking mode, if there is a 2×4 array of video presentation devices and the viewer is looking at the top-right device (e.g., see Viewer 5 in FIG. 20C), other devices would measure horizontal and vertical axis stare/gaze deviation increasing from right to left as well as from top to bottom.

After obtaining the eye movement monitoring feedback from the designated set of eye tracking devices at 1810, the master application determines whether to modify one or more session parameters associated with the coordinated display session, 1815. If the master application determines not to modify the one or more session parameters at 1815, the coordinated display session continues using the current session parameter configuration and the process returns to 1810 where the master application continues to obtain eye movement monitoring feedback from the designated set of eye tracking devices. Otherwise, if the master application determines to modify the one or more session parameters at 1815, the process advances to 1820. At 1820, the master application modifies the one or more session parameters associated with the coordinated display session based on the eye movement monitoring feedback, after which the coordinated display session continues using the modified session parameters and the process returns to 1810 where the master application continues to obtain eye movement monitoring feedback from the designated set of eye tracking devices.

Figure 19:
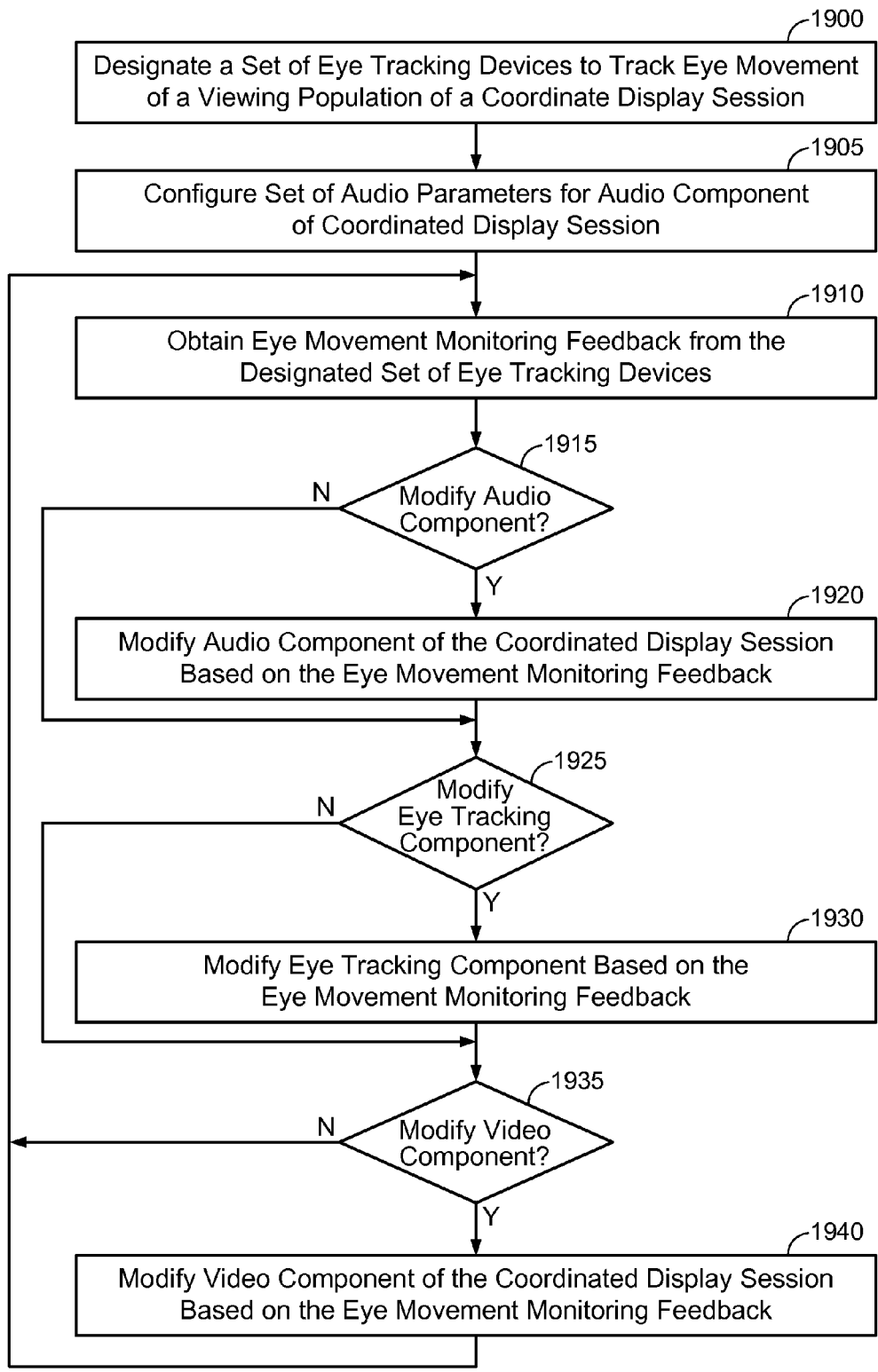
FIG. 19 illustrates an example implementation of the process of FIG. 18 in accordance with an embodiment of the invention.

FIG. 19 illustrates an example implementation of the process of FIG. 18 in accordance with an embodiment of the invention. Referring to FIG. 19, 1900-1910 substantially correspond to 1800 through 1810 of FIG. 18, respectively (except that optional 1805 is actually performed at 1905 in FIG. 19), and will not be described further for the sake of brevity.

After obtaining the eye movement monitoring feedback from the designated set of eye tracking devices at 1910, the master application determines whether to modify an audio component (e.g., the set of audio parameters previously configured at 1910) of the coordinated display session based on the eye movement monitoring feedback, 1915. If the master application determines not to modify the audio component of the coordinated display session at 1915, the coordinated display session does not modify the audio component and instead continues using the current set of audio parameters and then advances to 1925. Otherwise, if the master application determines to modify the audio component at 1915, the master application modifies the audio component by reconfiguring the set of audio parameters based on the eye movement monitoring feedback from 1910 (e.g., by adjusting volume levels being output by one or more of the client devices in the session, changing an audio orientation for the session, modifying how enhancing or de-emphasizing equalizer functions are applied to audio being mapped to one or more client devices in the session, etc.) and then advances to 1925. Examples of how the audio component can be modified based on the eye movement monitoring feedback are provided below in more detail.

At 1925, the master application determines whether to modify an eye tracking component of the coordinated display session based on the eye movement monitoring feedback from 1910. The eye tracking component relates to any parameter associated with how the eye movement monitoring feedback is obtained. For example, at 1925, the master application can determine whether to modify how client devices are allocated to the set of eye tracking devices, the master application may determine whether to ask the set of eye tracking devices to initiate a calibration (or baselining) procedure, the master application may determine whether to toggle eye tracking off or on for the coordinated display session, the master application can determine whether a priority viewer has been detected in the viewing population and, if so, order the set of eye tracking devices to focus on the priority viewer, and so on. If the master application determines not to modify the eye tracking component of the coordinated display session at 1925, the coordinated display session continues without modifying the eye tracking component and then advances to 1935. Otherwise, if the master application determines to modify the eye tracking component at 1925, the master application modifies the eye tracking component based on the eye movement monitoring feedback from 1910, 1930, and then advances to 1935. Examples of how the eye tracking component can be modified based on the eye movement monitoring feedback are provided below in more detail.

At 1935, the master application determines whether to modify a video component associated with the coordinated display session based on the eye movement monitoring feedback from 1910. For example, at 1935, the master application can determine whether to expand a particular mapped video portion so that a bigger version of the particular mapped version is displayed across multiple (or even all) of the video presentation devices participating in the coordinated display session (e.g., a full-screen mode or zoomed-in mode). In another example, at 1935, the master application can determine whether to duplicate a particular mapped video portion so that a same-sized version of the particular mapped version is displayed across multiple (or even all) of the video presentation devices participating in the coordinated display session (e.g., a screen-copy or multi-view mode). If the master application determines not to modify the video component for the coordinated display session at 1935, the coordinated display session continues without modifying the video component and the process returns to 1910 where the master application continues to obtain eye movement monitoring feedback (e.g., potentially in a modified form if the eye tracking component is modified at 1930, or even stopped altogether if the eye tracking component modification toggles eye tracking to an off mode or disabled mode). Otherwise, if the master application determines to modify the video component for the coordinated display session at 1935, the master application modifies the video component based on the eye movement monitoring feedback from 1910, 1940. After 1940, the process returns to 1910 where the master application continues to obtain eye movement monitoring feedback (e.g., potentially in a modified form if the eye tracking component is modified at 1930, or even stopped altogether if the eye tracking component modification toggles eye tracking to an off mode or disabled mode). Additional examples of how the video component can be modified based on the eye movement monitoring feedback are provided below in more detail.

In the embodiment of FIG. 19, the master application evaluates whether the session parameters in a particular order (e.g., audio, then eye tracking, then video). However, it will be appreciated that this order is merely exemplary, and alternative implementations of the process of FIG. 19 can be implemented in any order or in parallel with each other. Also, while FIG. 19 focuses on a particular implementation whereby the session parameter types being evaluated for potential modification based on the eye movement monitoring feedback include audio, eye tracking and video components, it will be appreciated that other embodiments can be directed to fewer session parameter types (e.g., only the audio component, or the video component and the eye tracking component but not the audio component, etc.) and/or additional session parameter types. Further, it will be appreciated that 1915-1940 collectively corresponds to an example implementation of 1815-1820 of FIG. 18.

Table 1 (below) illustrates a variety of implementation examples whereby different session parameters (e.g., the audio component, the eye tracking component, the video component, etc.) are modified at 1820 of FIG. 18 in different ways based on different types of eye movement monitoring feedback. In particular, Table 1 is configured under the assumption that the coordinated display session is being displayed by a grid or array of video presentation devices in a 2×4 arrangement with four (4) columns and two (2) rows, as shown in FIGS. 6A, 6B, 6C, 6D, etc. For the sake of simplicity, Table 1 refers to the video presentation device grid-positions by the numbers from these FIGS, with a top-right presentation device corresponding to Screen 1 (or mapped video portion 1), the bottom-right presentation device corresponding to Screen 8 (or mapped video portion 8), and so on. It will be appreciated that the embodiments of FIGS. 18-19 are compatible with any grid-arrangement, and the example 2×4 grid-arrangement is used herein primarily for convenience of explanation in view of its familiarity from the description of other embodiments of the invention.

TABLE 1

Example of Session Parameter Modifications in Response to Eye Movement Monitoring Feedback

| Ex. | Eye Movement Monitoring Feedback | Session Parameter Modification | Relevant FIG. |
|---|---|---|---|
| 1A | Viewing Population: Viewer 1 only<br>Eye Activity: Viewer 1 looks at Screen 2<br>Session State: Single Video + Audio Source | Audio Component: Increase relative volume output by (and/or in proximity to) Screen 2 | FIG. 20A |
| 1B | Viewing Population: Viewer 1 only<br>Eye Activity: After Ex. 1A, Viewer 2 looks away from Screen 1 or moves out of range of the set of eye tracking devices<br>Session State: Single Video + Audio Source | Audio Component: Return volume to previous levels and/or a previous audio configuration (e.g., 2.1 or 5.1 pseudo-surround sound, etc.) | N/A |

TABLE 1-continued

Example of Session Parameter Modifications in Response to Eye Movement Monitoring Feedback

| Ex. | Eye Movement Monitoring Feedback | Session Parameter Modification | Relevant FIG. |
|---|---|---|---|
| 1C | Viewing Population: Viewer 1 only<br>Eye Activity: Viewer 1 looks at Screen 2<br>Session State: Single Video + Audio Source | Audio Component: Apply enhancing equalizer function to audio mapped (and/or in proximity) to Screen 2<br>Audio Component (Optional): Apply de-emphasizing or inverse equalizer function to audio mapped to Screens not in proximity to Screen to (e.g., Screens 4 and 8). | N/A |
| 2A | Viewing Population: Viewers 1 . . . 5<br>Eye Activity: Viewers 1 . . . 3 look at Screen 2, Viewer 4 looks at Screen 7 and Viewer 5 looks at Screen 4<br>Session State: Single Video + Audio Source | Audio Component: Transition audio configuration to a default configuration (e.g., 2.1 or 5.1 pseudo-surround sound, a "vanilla audio mode", etc.) | N/A |
| 2B | Viewing Population: Viewers 1 . . . 5<br>Eye Activity: Viewers 1 . . . 3 look at Screen 2, Viewer 4 looks at Screen 7 and Viewer 5 looks at Screen 4<br>Session State: Single Video + Audio Source | Eye Tracking Component: Each eye tracking device tracks all users in their range;<br>Audio Component: Increase relative volume output by (and/or in proximity to) any screen with a threshold number of current viewers (Screens 1, 4 and 7) | FIG. 20B |
| 2C | Viewing Population: Viewers 1 . . . 5<br>Eye Activity: Viewers 1 . . . 3 look at Screen 2, Viewer 4 looks at Screen 7 and Viewer 5 looks at Screen 4<br>Session State: Single Video + Audio Source | Eye Tracking Component: Each eye tracking device tracks all users in their range;<br>Audio Component: Allocate weighted scores to the different screens based on screen-specific viewing metrics, and configure volume levels output by (and/or in proximity to) screens based on the weighted scores | FIG. 20C |
| 3A | Viewing Population: Viewer 1<br>Eye Activity: Viewer 1 looks at Screen 3 for more than a time threshold ($t_1$)<br>Session State: Single Video Source (Audio Optional) | Video Component: Zoom-in (or blow-up) the mapped video portion being displayed by Screen 3 for wide-format display across entire grid<br>Audio Component (Optional): If Screen 3 had any unique audio component characteristics, Screen 3's audio can also expand for collective grid output | FIGS. 21A-21B |
| 3B | Viewing Population: Viewers 1 . . . 3<br>Eye Activity: Viewer 1 looks at Screen 1 (Feed 1), Viewer 2 looks at Screen 7 for more than a time threshold ($t_2$) and Viewer 3 looks at Screen 4.<br>Session State: Different Video Source (Feeds 1 . . . 8) for Each Mapped Video Portion in the Coordinated Display Session (e.g., a grid of security cameras, etc.) (Audio Optional) | Video Component: Duplicate Feed 7 on each of Screens 1 . . . 8<br>Audio Component (Optional): Audio for Feed 7 is also mapped to each of Screens 1 . . . 8 (e.g., each screen can independently output audio for Feed 7 or a surround-sound type effect for Feed 7 can be achieved by the collective grid) | FIGS. 22A-22B |
| 4A | Viewing Population: Viewers 1 . . . 3<br>Eye Activity: Viewer 1 looks at Screen 1 (Feed 1), Viewer 2 looks at Screen 6 (Feed 6) and Viewer 3 looks at Screens 3-4 and 7-8 for more than a time threshold ($t_3$)<br>Session State: Different Video Source (Feeds 1 . . . 8) for Each Mapped Video Portion in the Coordinated Display Session (e.g., a grid of security cameras, etc.) (Audio Optional) | Video Component: Merge Feeds 3-4 and 7-8 on at least one of Screens 3-4 and 7-8.<br>Audio Component (Optional): Merge Audio for Feeds 3-4 and 7-8 on the merged-video screens, or else just mute audio. | FIGS. 23A-23B |
| 4B | Viewing Population: Viewer 1<br>Eye Activity: Viewer 1 looks at Screens 3-4 and 7-8 for more than a time threshold ($t_3$) | Video Component: Merge the mapped video portions from Screens 3-4 and 7-8 on at least one of Screens 3-4 and 7-8. | FIGS. 23A-23B |

TABLE 1-continued

Example of Session Parameter Modifications in Response to Eye Movement Monitoring Feedback

| Ex. | Eye Movement Monitoring Feedback | Session Parameter Modification | Relevant FIG. |
|---|---|---|---|
| | Session State: Single Video Source (Audio Optional) | Audio Component (Optional): If Screens 3, 4, 7 or 8 have any unique audio component characteristics, merge the respective screen-specific audio, or else just leave audio unchanged | |

As will be appreciated from a review of examples provided in Table 1 (above), different types of monitoring feedback can trigger different session parameter changes.

Referring to Example 1A from Table 1, a viewing population with a single viewer ("Viewer 1") being actively eye-tracked (or monitored) by the set of eye tracking devices is detected as looking at Screen 2 (e.g., for more than a nominal threshold period of time, etc.) for a coordinated display session with a session state that is characterized by a single video+audio source (or feed) being collectively output by the coordinated display group by Screens 1 ... 8. In Example 1A, an example session parameter modification that can be triggered by the eye movement monitoring feedback is to increase the relative speaker volume being output by Screen 2 (more specifically, by an audio output device coupled to the video presentation device with Screen 2) and/or by other screens in proximity to Screen 2 (more specifically, by other audio output devices coupled to the video presentation devices with the other screens in proximity to Screen 2). As used herein, referring to a "screen" in context with audio output will be recognized as referring to an audio output device that is coupled to or associated with that particular screen. For example, in FIG. 20A, assume that an initial audio configuration state for the coordinated display session is that Screens 1 ... 8 each output 25% speaker volume. Under this assumption, an example audio configuration state after the audio component modification can increase the speaker volume for Screen 2 to 100%, can increase the speaker volume for each adjacent screen of Screen 2 (i.e., Screens 1, 3 and 5 ... 7) to 50% and to mute (or reduce speaker volume to 0%) to each other screen (i.e., Screens 4 and 8).

Referring to Example 1B from Table 1, assume that the session modification from Example 1A has already occurred and the audio component for the coordinated display session has been updated based on Viewer 1 being detected as looking at Screen 2. Now in Example 1B, at some later point in time, assume that Viewer 1 is detected by the set of eye tracking devices as either looking away from Screen 2 (e.g., for more than a threshold period of time, so that minor eye deviations such as blinking by Viewer 1 will not trigger an audio component modification for the coordinated display session) or physically moving out of range of the set of eye tracking devices. In this case, the session parameter modification is to revert the audio configuration to previous settings and/or a previous audio configuration state. For example, the speaker volume for each of Screens 1 ... 8 can be returned to 25%. In another example, the previous audio configuration state could be configured different, for example, as 2.1 pseudo-surround sound, 5.1 pseudo-surround sound, or some other static-playout mode that is not dictated by eye tracking.

Referring to Example 1C from Table 1, similar to Example 1A, a viewing population with a single viewer ("Viewer 1") being actively eye-tracked (or monitored) by the set of eye tracking devices is detected as looking at Screen 2 (e.g., for more than a nominal threshold period of time, etc.) for a coordinated display session with a session state that is characterized by a single video+audio source (or feed) being collectively output by the coordinated display group by Screens 1 ... 8. In Example 1C, an example session parameter modification that can be triggered by the eye movement monitoring feedback is to apply an enhancing equalizer function to audio being output by Screen 2 (more specifically, by an audio output device coupled to the video presentation device with Screen 2) and/or by other screens in proximity to Screen 2 (more specifically, by other audio output devices coupled to the video presentation devices with the other screens in proximity to Screen 2, such as adjacent Screens 1, 3, 5, 6 and 7). Also, a de-emphasizing (or inverse) equalizer function can be applied to audio being output by one or more screens that are not in proximity to Screen 2 (e.g., Screens 4 and 8 which are not adjacent to Screen 2, or even the adjacent Screens 1, 3, 5, 6 and 7). In one example, the enhancing equalizer function is applied to Screen 2, while Screens 1 and 3-8 do not have their audio modified. In another example, the enhancing equalizer function is applied to Screens 1 ... 3 and 5 ... 7 (e.g., Screen 2 plus adjacent screens), while Screens 4 and 8 do not have their audio modified. In another example, the enhancing equalizer function is applied to Screen 2 only, Screens 1, 3 and 5 ... 7 do not have their audio modified and a de-emphasizing (or inverse) equalizer function is applied to Screens 4 and 8. It will be appreciated that while the audio component modifications in other examples from Table 1 pertain primarily to volume levels and/or audio configuration, any of these examples could be implemented with respect to modifications to other audio parameter types (e.g., equalizer functions, treble, bass and/or fidelity modifications, etc.) in other scenarios based on similar feedback.

Referring to Example 2A from Table 1, a viewing population with multiple viewers ("Viewers 1 ... 5") being actively eye-tracked (or monitored) by the set of eye tracking devices is detected with Viewers 1 ... 3 looking at Screen 2, Viewer 4 looking at Screen 7 and Viewer 5 looking at Screen 4, for a coordinated display session with a session state that is characterized by a single video+audio source (or feed) being collectively output by the coordinated display group by Screens 1 ... 8. In each case, some nominal threshold of time of eye-to-screen contact can be required before any particular viewer qualifies as "looking" at that particular screen. In Example 2A, an example session parameter modification that can be triggered by the eye movement monitoring feedback is to stop eye tracking so long as multiple viewers are present and to transition the audio configuration state to a default audio configuration state (e.g., the all-25% speaker volume state, 2.1 pseud-surround sound, 5.1 pseudo-surround sound). Example 2A from Table 1 is not expressly illustrated in the FIGS. Basically, in Example 2A from Table 1, the master application assumes that it will be difficult to track eye movement from a large viewing population so as to provide relevant eye movement-based audio to the entire viewing population, and thereby decides to supply the viewing population with basic or default audio.

Referring to Example 2B from Table 1, a viewing population with multiple viewers ("Viewers 1 . . . 5") being actively eye-tracked (or monitored) by the set of eye tracking devices is detected with Viewers 1 . . . 3 looking at Screen 2, Viewer 4 looking at Screen 7 and Viewer 5 looking at Screen 4, for a coordinated display session with a session state that is characterized by a single video+audio source (or feed) being collectively output by the coordinated display group by Screens 1 . . . 8. In each case, some nominal threshold of time of eye-to-screen contact can be required before any particular viewer qualifies as "looking" at that particular screen. In Example 2B, an example session parameter modification that can be triggered by the eye movement monitoring feedback is to have each eye tracking device in the set of eye tracking devices monitor eye movements for each viewer in its respective range, and to selectively increase the relative speaker volume being output by each screen being watched by a threshold number of viewers (e.g., 1, 3, etc.) and screens in proximity to one of the "watched" screens. For example, in FIG. 20B, assume that the threshold number of viewers is 1, and that an initial audio configuration state for the coordinated display session is that Screens 1 . . . 8 each output 25% speaker volume. Under this assumption, an example audio configuration state after the audio component modification can increase the speaker volume for each watched screen (i.e., Screens 2, 4 and 7) to 100%, to increase the speaker volume for each adjacent screen (i.e., Screens 1, 3, 5, 6 and 8) of any watched screen to 50%, and to mute (or reduce speaker volume to 0%) to each other screen (i.e., in this case, there are no muted screens).

Referring to Example 2C from Table 1, a viewing population with multiple viewers ("Viewers 1 . . . 5") being actively eye-tracked (or monitored) by the set of eye tracking devices is detected with Viewers 1 . . . 3 looking at Screen 2, Viewer 4 looking at Screen 7 and Viewer 5 looking at Screen 4, for a coordinated display session with a session state that is characterized by a single video+audio source (or feed) being collectively output by the coordinated display group by Screens 1 . . . 8. In each case, some nominal threshold of time of eye-to-screen contact can be required before any particular viewer qualifies as "looking" at that particular screen. In Example 2C, an example session parameter modification that can be triggered by the eye movement monitoring feedback is to calculate a weighted score for each screen based on screen-specific viewing metrics, and then to configure a target audio configuration state for the coordinated display session based on the screen-specific viewing metrics. For example, the screen-specific viewing metrics can include (i) a number of viewers watching each screen, (ii) a proximity of a "non-watched" screen from a "watched" screen, (iii) a number of "watched" screens to which a "non-watched" screen is adjacent, (iv) a duration that one or more viewers have been watching a particular screen (e.g., an average duration that viewers historically watch a particular screen compared with other screens, etc.) and/or (v) any combination thereof.

Figure 20A:
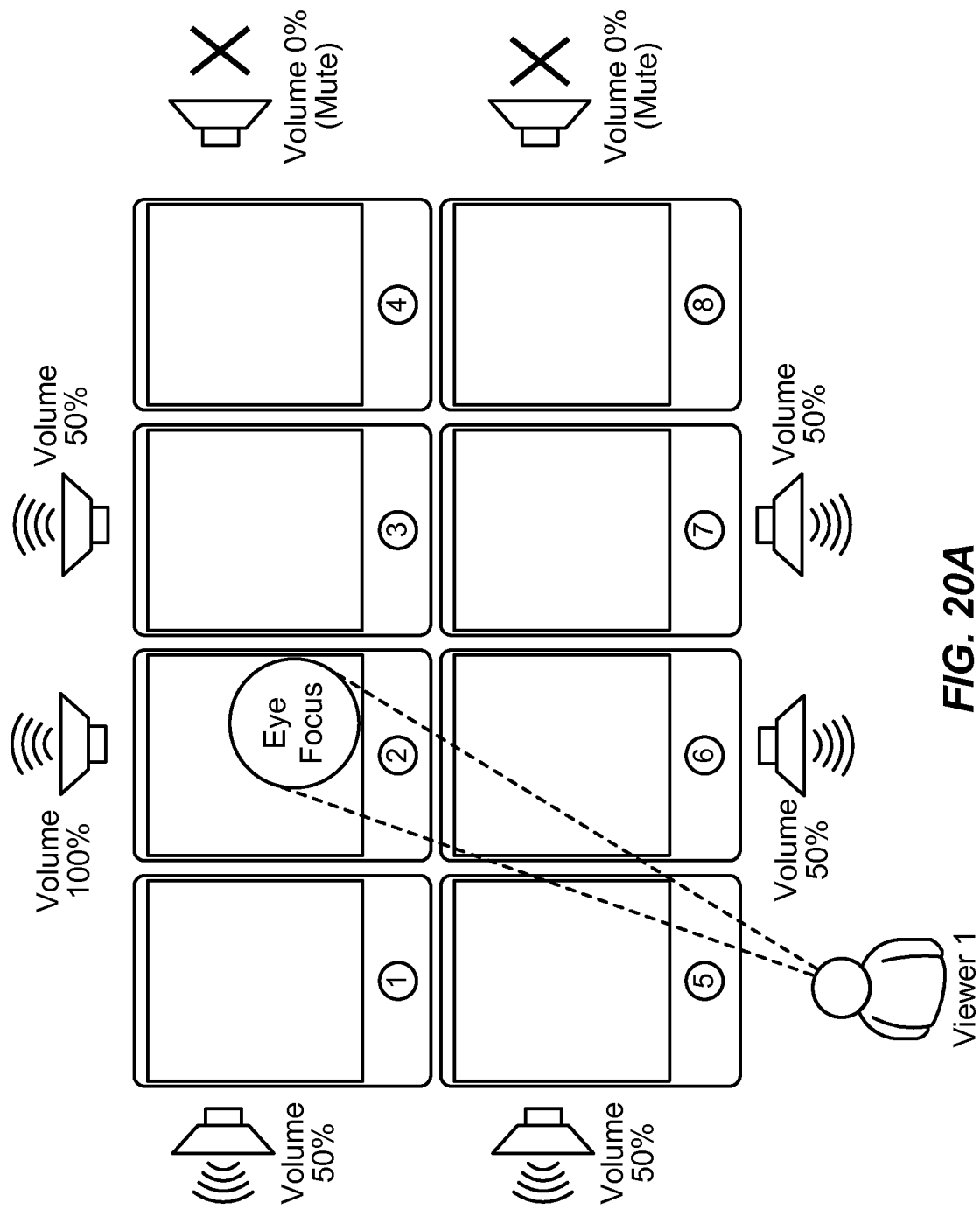
FIG. 20A illustrates a session state whereby a viewing population is detected as looking upon a particular display screen during execution of the process of FIG. 18 or 19 in accordance with an embodiment of the invention.
Figure 20B:
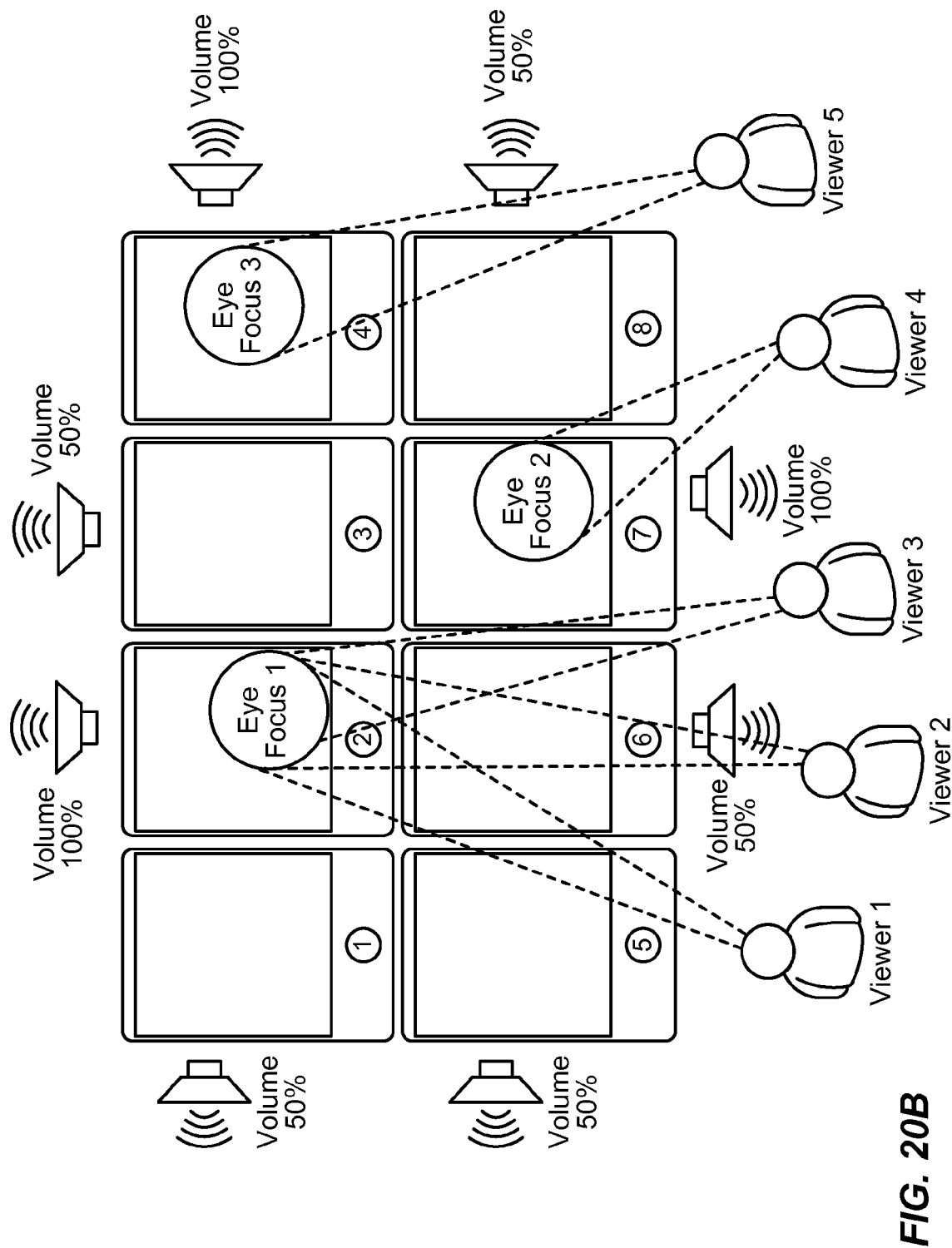
FIG. 20B illustrates a session state whereby a viewing population is detected as looking upon multiple display screens during execution of the process of FIG. 18 or 19 in accordance with an embodiment of the invention.
Figure 20C:
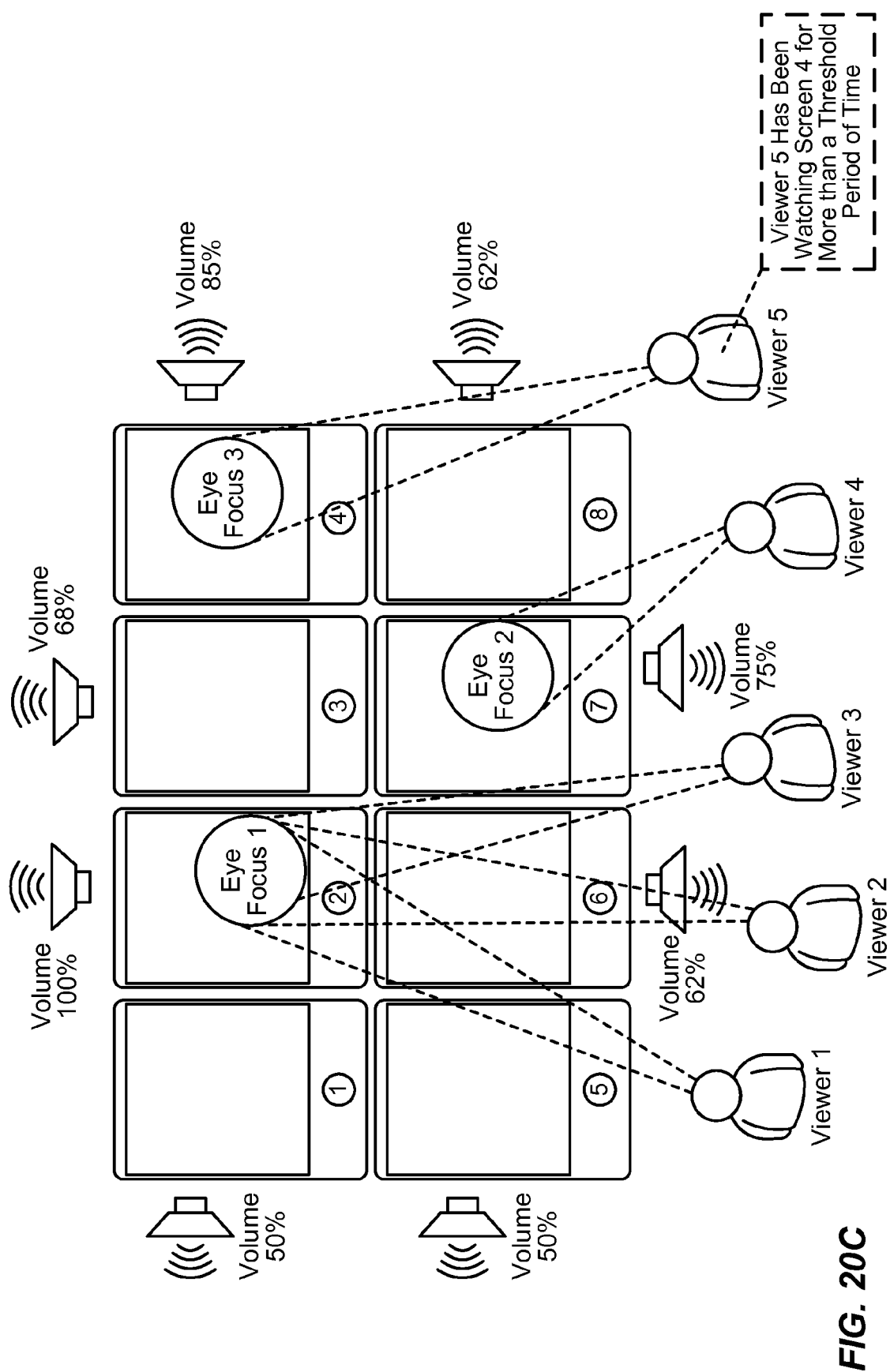
FIG. 20C illustrates another session state whereby a viewing population is detected as looking upon multiple display screens during execution of the process of FIG. 18 or 19 in accordance with an embodiment of the invention.

For example, in FIG. 20C, Screen 2 has the highest number of viewers (i.e., 3) compared with Screens 4 and 7, which each have a single viewer. So, a viewer quantity weighting component favors Screen 2 over Screens 4 and 7, and the viewing quantity weighting component favors any of Screens 2, 4 or 7 over the non-watched screens (i.e., Screens 1, 3, 5, 6 and 8). Further, assume that Viewer 5 has been watching Screen 4 for the longest time, so that an average viewing duration weighting component favors Screen 4. Next, for the non-watched screens, Screens 1 and 5 are adjacent to a single watched screen (i.e., Screen 2), Screens 6 and 8 are adjacent to two watched screens (i.e., Screens 2 and 7 and Screens 4 and 7, respectively), and Screen 3 is adjacent to three watched screens (i.e., Screens 2, 4 and 7). So, an adjacent watched screen weighting component favors Screens 6 and 8 over Screens 1 and 5, and further favors Screen 3 over Screens 1, 5, 6 or 8. The various weighting components can be allocated different weight factors based upon the implementation so the various eye movement monitoring feedback can be used to produce a weighted score for each screen which can then be mapped to a corresponding audio configuration state for the coordinated display session. Using the assumptions from above, one example of a resultant audio configuration state based on the weighted scores is shown in FIG. 20C, whereby Screens 1 and 5 output at 50% (e.g., because Screens 1 and 5 are only adjacent to a single watched screen and have no other contribution to their weighting score), Screens 6 and 8 output at 62% (e.g., because Screens 6 and 8 are adjacent to two watched screens, which is more than Screens 1 and 5), Screen 3 outputs at 68% (e.g., because Screen 3 is adjacent to three watched screens, which is more than any other non-watched screen), Screen 7 outputs at 75% (e.g., because Screen 7 has a single viewer), Screen 4 outputs at 85% (e.g., because Screen 4 has a single viewer, but the single viewer has been watching for a relatively long time) and Screen 2 outputs at 100% (e.g., due to its high number of viewers).

Figure 21A:
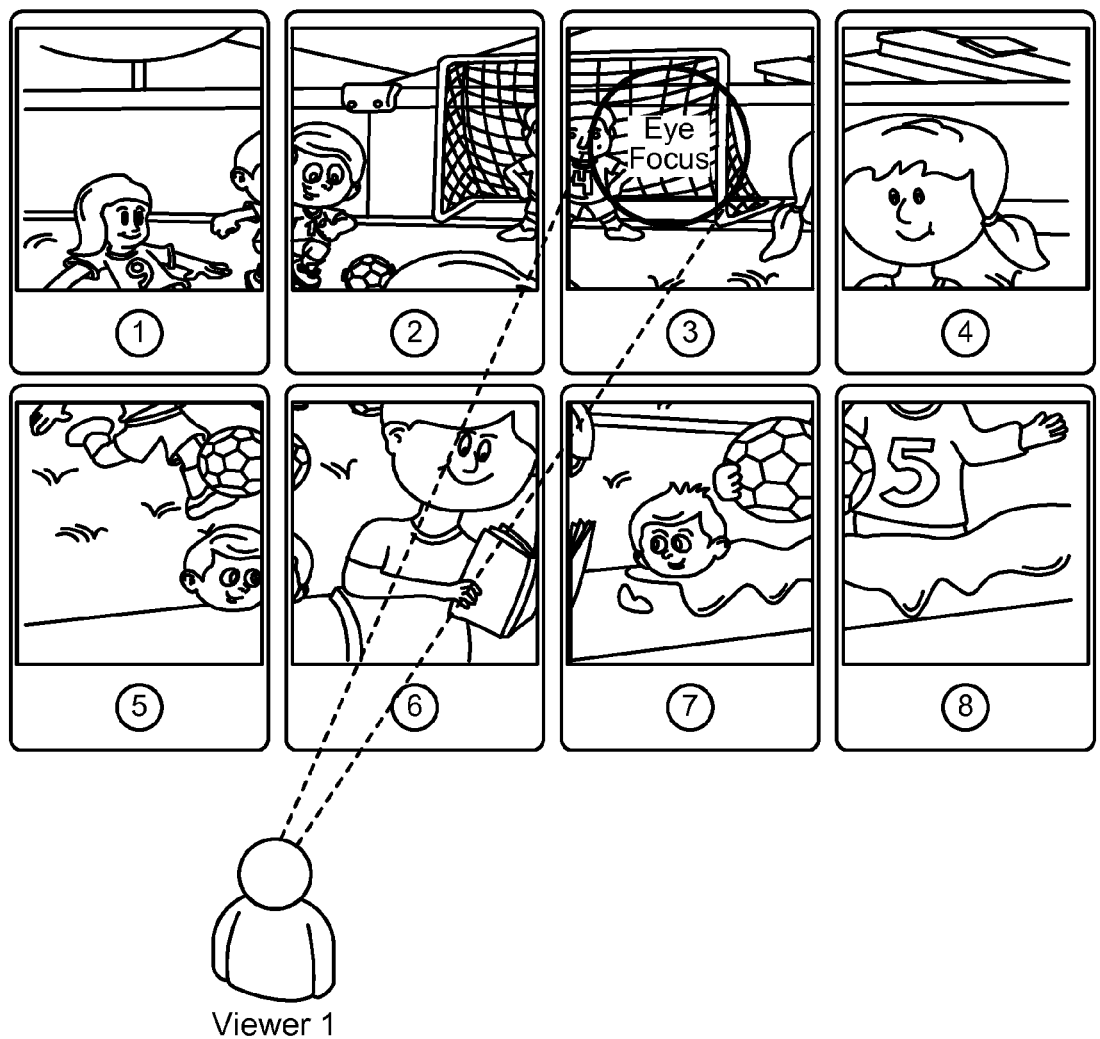
FIG. 21A illustrates a first session state whereby a viewing population is detected as looking upon a particular display screen during execution of the process of FIG. 18 or 19 in accordance with an embodiment of the invention.
Figure 21B:
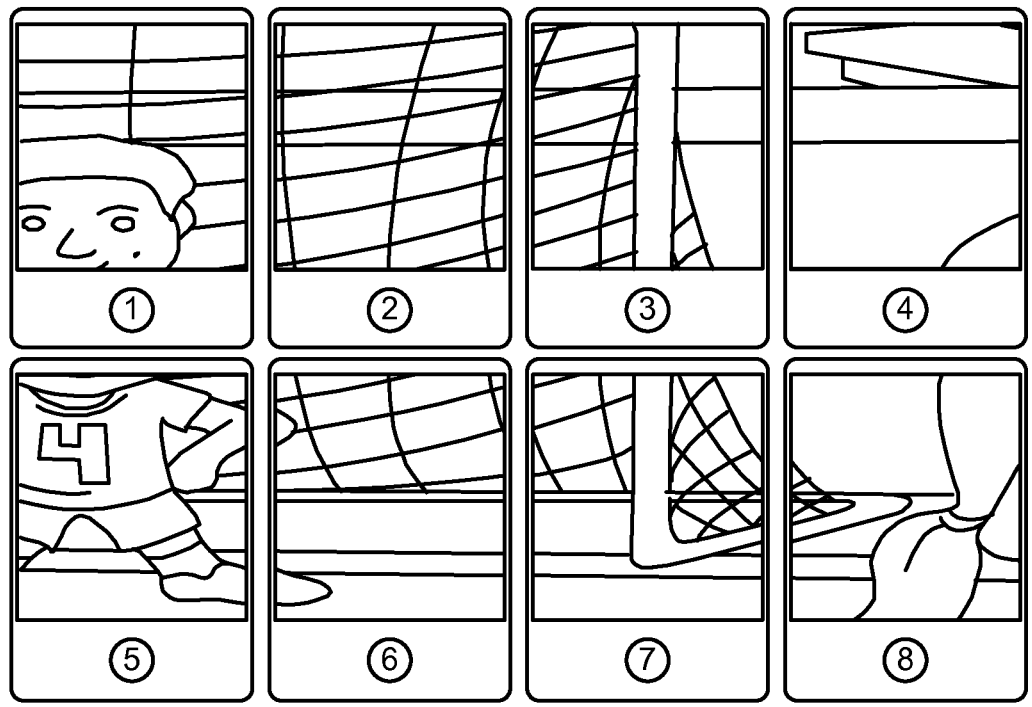
FIG. 21B illustrates a second session state that is a zoomed-in version of the first session state shown in FIG. 20A in accordance with an embodiment of the invention.
Figure 21B:
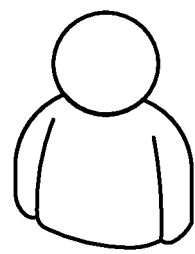

Referring to Example 3A from Table 1, a viewing population with a single viewer ("Viewer 1") being actively eye-tracked (or monitored) by the set of eye tracking devices is detected as looking at Screen 3 (e.g., for more than a nominal threshold period of time, etc.) for a coordinated display session with a session state that is characterized by a single video source (or feed), which may optionally include audio, being collectively output by the coordinated display group by Screens 1 . . . 8. In Example 3A, an example session parameter modification that can be triggered by the eye movement monitoring feedback is to zoom-in (or blow-up) the mapped video portion being output by the screen being watched by the viewer. For example, in FIG. 21A, assume that the single video source (which may optionally include audio) is displaying a scene related to a soccer game, and that Viewer 1 is watching Screen 3 which depicts a goalie guarding one of the soccer goals. As shown in FIG. 21B, the mapped video portion being shown in Screen 3 can be blown-up and spread across the entire coordinated display session via each of Screens 1 . . . 8 based upon the detection Viewer 1 watching (and presumably being particularly interested in) Screen 3. Because the zoom-in feature is a somewhat dramatic visual effect, the above-noted zoom-in video component modification can be conditioned upon Viewer 1 being locked onto the associated screen for more than a threshold period of time $t_1$ (e.g., 5 seconds, 10 seconds, etc.) that will generally be longer than the threshold that is used merely to verify that a particular viewer is actually watching a screen. Although, this condition can be overridden if desired. Also, while not shown explicitly in FIGS. 21A-21B, the single video feed can potentially include audio, in which case it is possible that Screen 3 is associated with some type of unique audio component. If so, the audio component specific to Screen 3 can be blown-up such that each of Screens 1 . . . 8 output the Screen 3-specific audio (or some version of it, such as a surround-sound effect being applied to the audio previously output by Screen 3).

However, this could also potentially be confusing to Viewer 1 so it is also possible that the audio component can remain unchanged while the coordinated display session is zoomed-in on Screen 3. Further, it will be appreciated that when Screen 3 is blown-up across Screens 1 . . . 8, Viewer 1 may look around at the different screens without necessarily triggering a return to the prior non-zoomed state. In fact, the zoom-in feature could be iterative, such that Viewer 1 could lock his/her eyes onto one of the Screen 3 zoom-in screens and cause yet another zoom-in. In a further example, one or more zoom-out triggers could also be implemented (e.g., Viewer 1 looking away from all screens, Viewer 1 leaving the range of the set of eye tracking devices, Viewer 1 making some type of pre-defined motion such as a hand wave or hand gesture, etc.), which undue one or all zoom-in operations. Further, the zoom-in does not necessarily need to be limited to Screen 3. Rather, when Screen 3 is blown-up, Screen 3 can be supplemented some visual data that is adjacent to Screen 3's mapped video portion (e.g., to comply with an aspect ratio of the coordinated display session which can be different than the aspect ratio of Screen 3 by itself, to limit a degree of the zoom to maintain a threshold video resolution during the zoom, etc.).

Figure 22A:
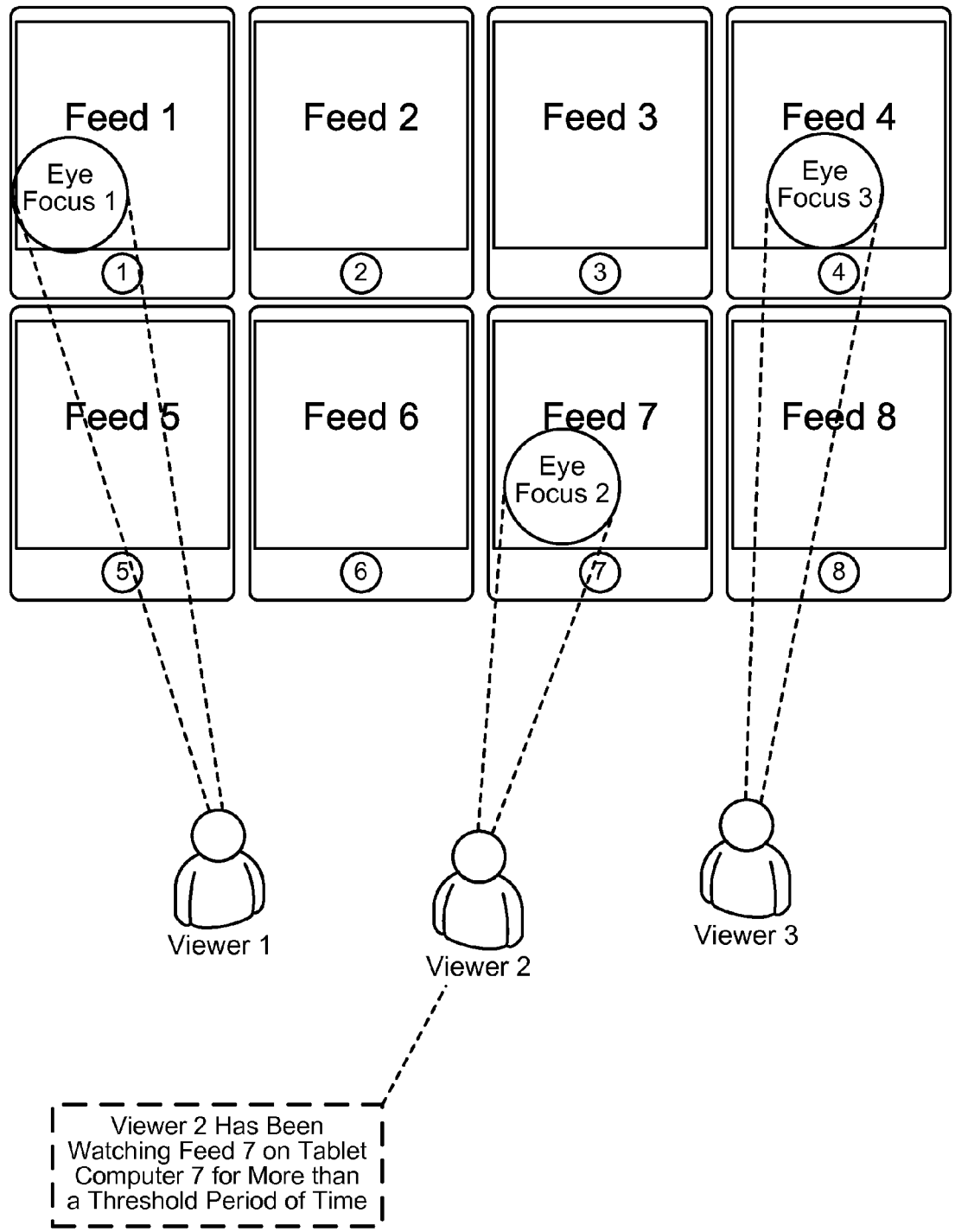
FIG. 22A illustrates a session state whereby a viewing population is detected as looking upon multiple display screens that each show different video feeds during execution of the process of FIG. 18 or 19 in accordance with an embodiment of the invention.

Referring to Example 3B from Table 1, unlike Examples 1A-3A, the coordinated display session has a session state that is characterized by multiple video sources (or feeds), each of which may optionally include audio, being collectively output by the coordinated display group by Screens 1 . . . 8. As shown in FIG. 22A, the mapped video portion being output by Screen 1 corresponds to Feed 1, the mapped video portion being output by Screen 2 corresponds to Feed 2, and so on. In Example 3B, a viewing population with multiple viewers ("Viewers 1 . . . 3") being actively eye-tracked (or monitored) by the set of eye tracking devices is detected with Viewer 1 watching Feed 1 on Screen 1, Viewer 2 watching Feed 7 on Screen 7 and Viewer 3 watching Feed 4 on Screen 4. In particular, while Viewers 1 . . . 3 each watch their respective screens for at least a nominal threshold of time (e.g., 0.5 seconds, 1 second, etc.), assume that Viewer 2 is detected as watching Feed 7 on Screen 7 for a longer threshold of time ($t_2$) (e.g., 20 seconds, 40 seconds, 2 minutes, etc.). For example, Feeds 1 . . . 8 may correspond to different sports games, and Feed 7 may have captured the interest of Viewer 2 by displaying a particularly exciting sports moment, or Feeds 1 . . . 8 may correspond to security camera feeds being watched by Viewers 1 . . . 3 (i.e., security personnel), and Viewer 2 may have detected suspicious activity in Feed 7 that captured his/her interest.

Figure 22B:
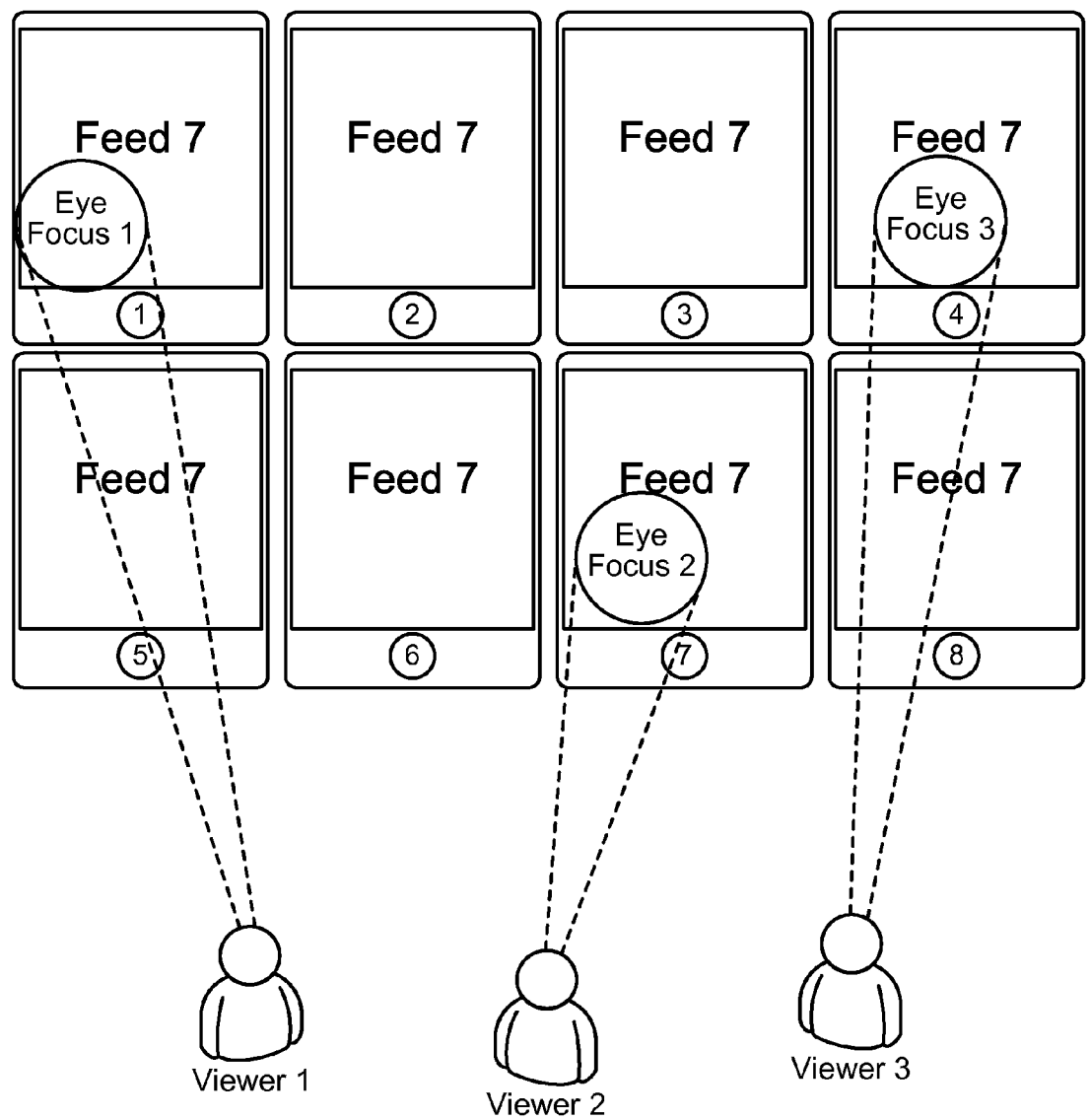
FIG. 22B illustrates a second session state with a feed duplication effect that is transitioned to after the first session state shown in FIG. 22A in accordance with an embodiment of the invention.

In Example 3B, an example session parameter modification that can be triggered by the eye movement monitoring feedback is to duplicate the mapped video portion being output by the screen being watched by any viewer for more than $t_2$ onto one or more other screens, temporarily blocking other feeds that were previously mapped to those screens. For example, based on Viewer 2 staring at Feed 7 on Screen 7 for more than $t_2$ as shown in FIG. 22A, Feed 7 can temporarily be duplicated and displayed in redundant fashion on each of Screens 1 . . . 8 as shown in FIG. 22B. While not shown explicitly in FIGS. 22A-22B, one or more of Feeds 1 . . . 8 can potentially include audio. In an example, to avoid 8 simultaneous audio feeds being output, audio output can be restricted to the feed-duplication scenario, such that Feed 7's audio feed is output when Feed 7 is duplicated across Screens 1 . . . 8, but no audio feeds are output during a non-duplication scenario. Further, one or more duplication-ending triggers could also be implemented (e.g., Viewers 1, 2 or 3 look away from all screens, Viewers 1, 2 or 3 leaving the range of the set of eye tracking devices, Viewers 1, 2 or 3 making some type of pre-defined motion such as a hand wave or hand gesture, etc.), which undue the duplication of Feed 7 across Screens 1 . . . 7. Further, Feed 7 does not necessarily need to take over all of Screens 1 . . . 8. In another example (not shown explicitly), Feed 7 can be duplicated only on other screens that are currently being watched by the other viewers, i.e., Screens 1 and 4. In this case, Viewer 1 looking away from Screen 1 could function to change Feed 7 back to Feed 1 on Screen 1 while Feed 7 is maintained on Screen 4 so long as Viewer 3 is still staring at Screen 4 while Feed 7 is being displayed.

Figure 23A:
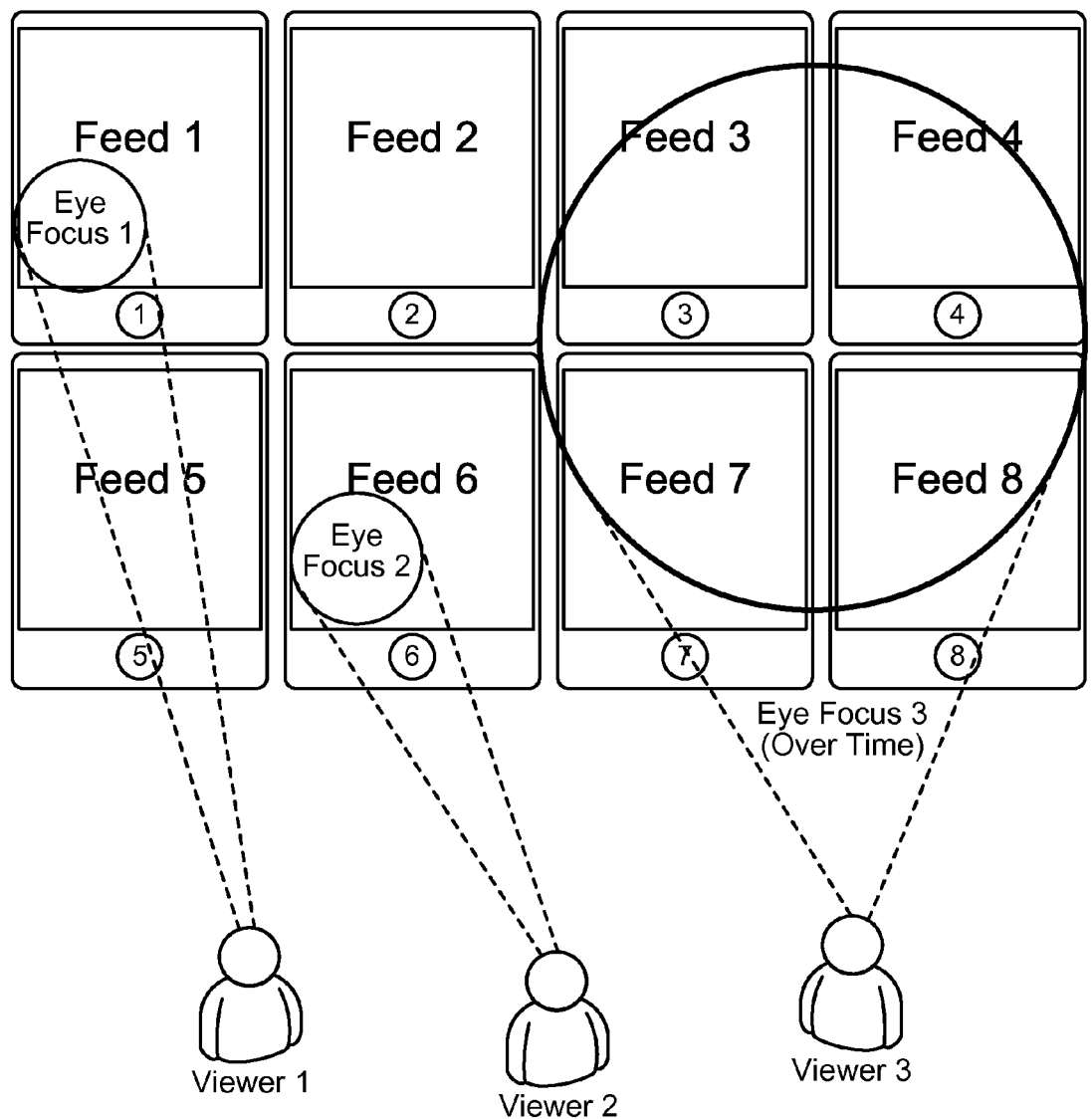
FIG. 23A illustrates a first session state whereby a viewer in a viewing population is detected as looking upon multiple display screens that each show different video feeds over time during execution of the process of FIG. 18 or 19 in accordance with an embodiment of the invention.

Referring to Example 4A from Table 1, similar to Example 3B, the coordinated display session has a session state that is characterized by multiple video sources (or feeds), each of which may optionally include audio, being collectively output by the coordinated display group by Screens 1 . . . 8. As shown in FIG. 23A, the mapped video portion being output by Screen 1 corresponds to Feed 1, the mapped video portion being output by Screen 2 corresponds to Feed 2, and so on. In Example 4A, a viewing population with multiple viewers ("Viewers 1 . . . 3") being actively eye-tracked (or monitored) by the set of eye tracking devices is detected with Viewer 1 watching Feed 1 on Screen 1, Viewer 2 watching Feed 7 on Screen 7 and Viewer 3 having a history of alternating between Feeds 3-4 and 7-8 on Screens 3-4 and 7-8 for more than a time threshold ($t_3$) (e.g., Viewer 3 watches Feed 3 for 10 seconds, then Feed 4 for 19 seconds, then Feed 7 for 18, seconds, then Feed 8 for 20 seconds, then Feed 3 again for 8 seconds, and so on, so it is clear that Viewer 3 keeps returning to these four particular feeds habitually).

Figure 23B:
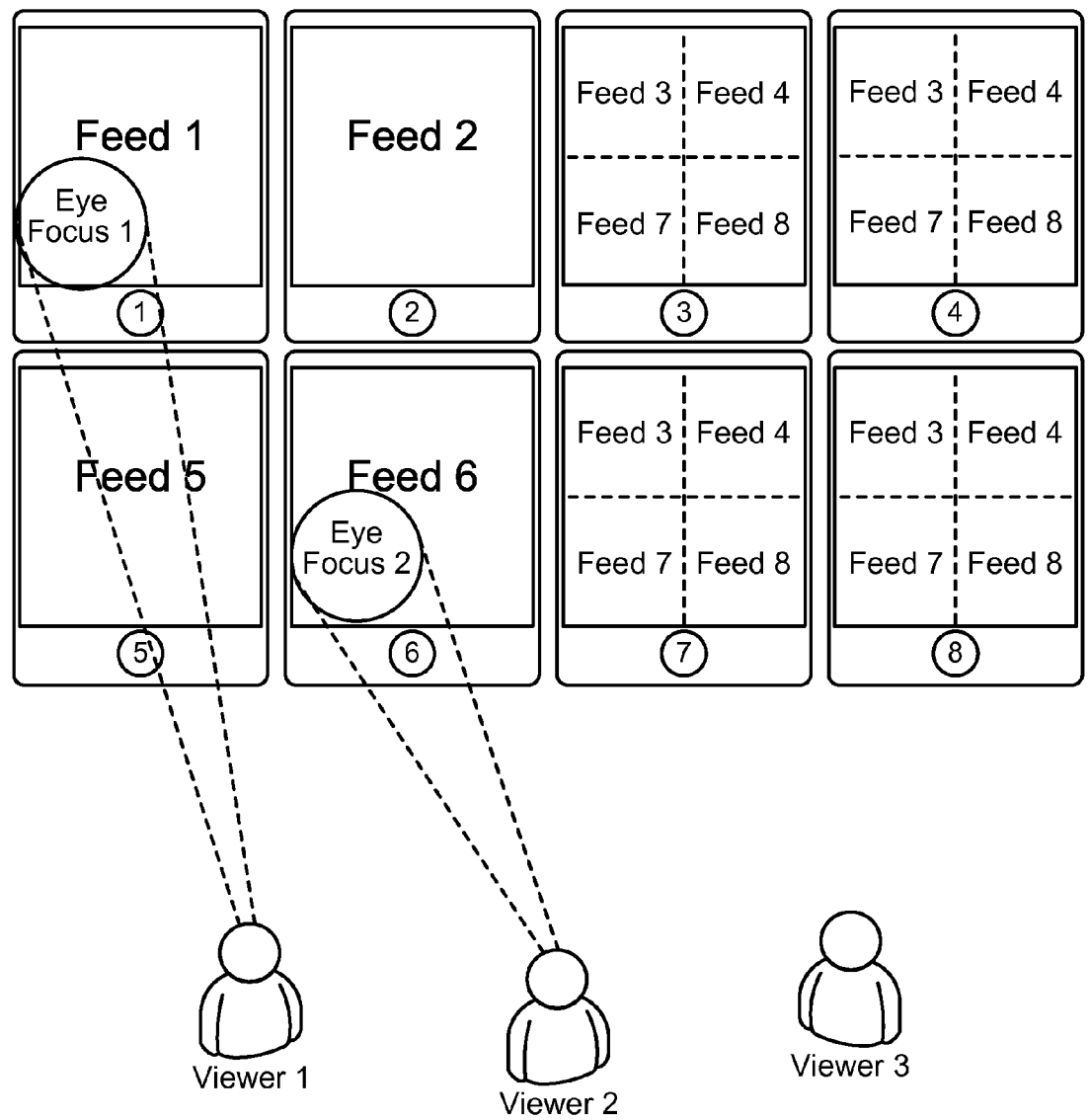
FIG. 23B illustrates a second session state with a feed merger effect that is transitioned to after the first session state shown in FIG. 22A in accordance with an embodiment of the invention.
Figure 23C:
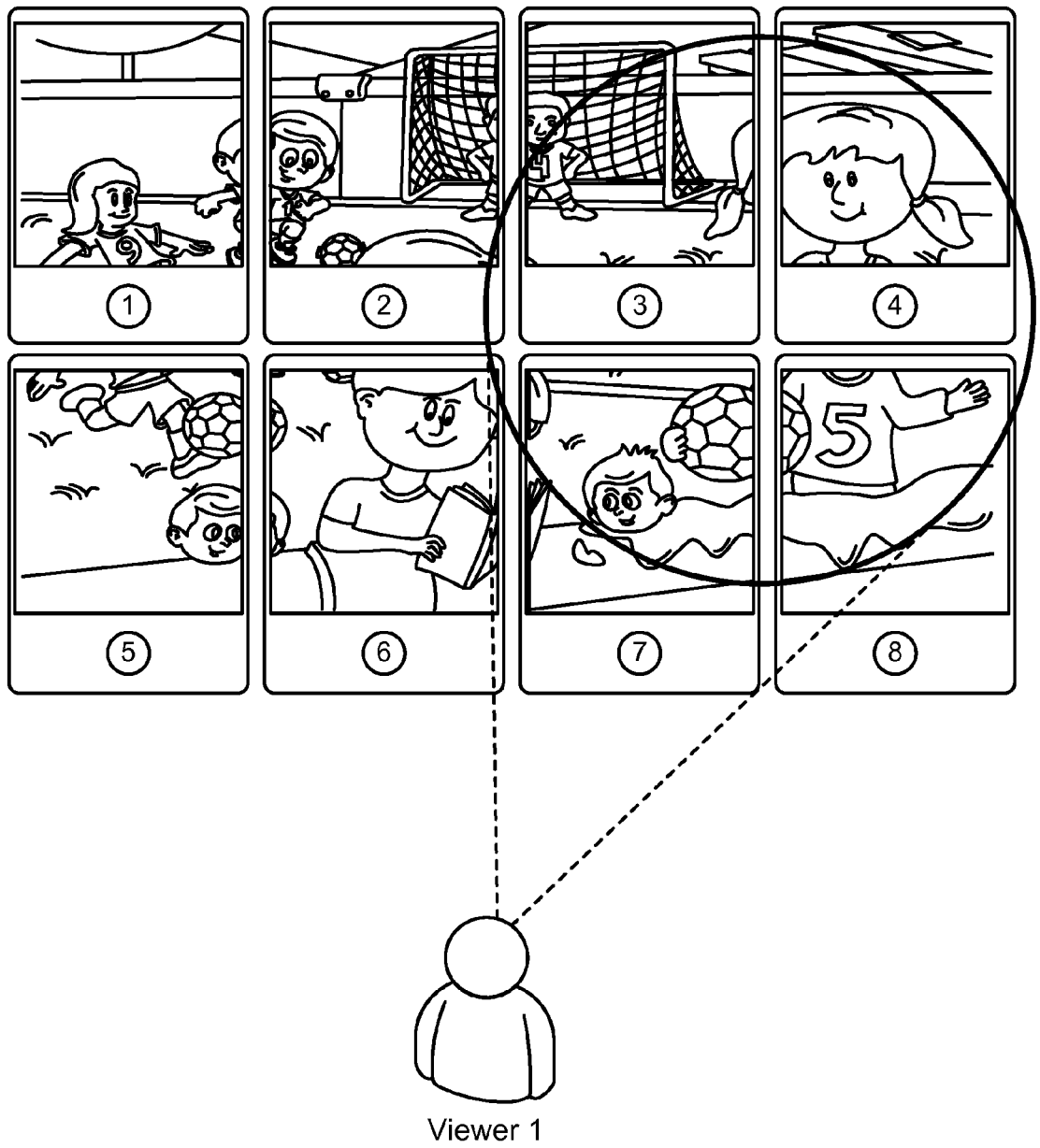
FIG. 23C illustrates a first session state whereby a viewer in a viewing population is detected as looking upon multiple display screens that each a portion of the same video feed over time during execution of the process of FIG. 18 or 19 in accordance with an embodiment of the invention.

In Example 4A, an example session parameter modification that can be triggered by the eye movement monitoring feedback is to zoom-out (or merge) multiple mapped video portions being viewed habitually by a particular viewer over time (i.e., more than $t_3$) so as to produce a merged feed that is output by at least one of the habitually viewed screens. So, it is possible that each feed being viewed habitually by Viewer 3 can be updated to output the merged feed, or alternatively that only a few (or even one) of the habitually viewed screens is affected. FIG. 23B illustrates an example whereby the merged feed which includes Feeds 3-4 and 7-8 is mapped to each of Screens 3-4 and 7-8. Also, it is possible that one or more of Feeds 3-4 and 7-8 has an audio component. If so, the respective audio components can either be merged for output by each screen receiving the merged frame, or alternatively the audio components can simply be muted so as not to confuse Viewer 3.

Referring to Example 4B from Table 1, the coordinated display session has a session state that is characterized by a single video source (or feed), which may optionally include audio, being collectively output by the coordinated display group by Screens 1 . . . 8. In Example 4B, a viewing population with a single viewer ("Viewer 1") being actively eye-tracked (or monitored) by the set of eye tracking devices is detected with Viewer 1 having a history of alternating between Screens 3-4 and 7-8 for more than the time threshold ($t_3$) (e.g., Viewer 3 watches Screen 3 for 10 seconds, then Screen 4 for 19 seconds, then Screen 7 for 18, seconds, then Screen 8 for 20 seconds, then Screen 3 again for 8 seconds, and so on, so it is clear that Viewer 1 keeps returning to these four particular screens habitually).

Figure 23D:
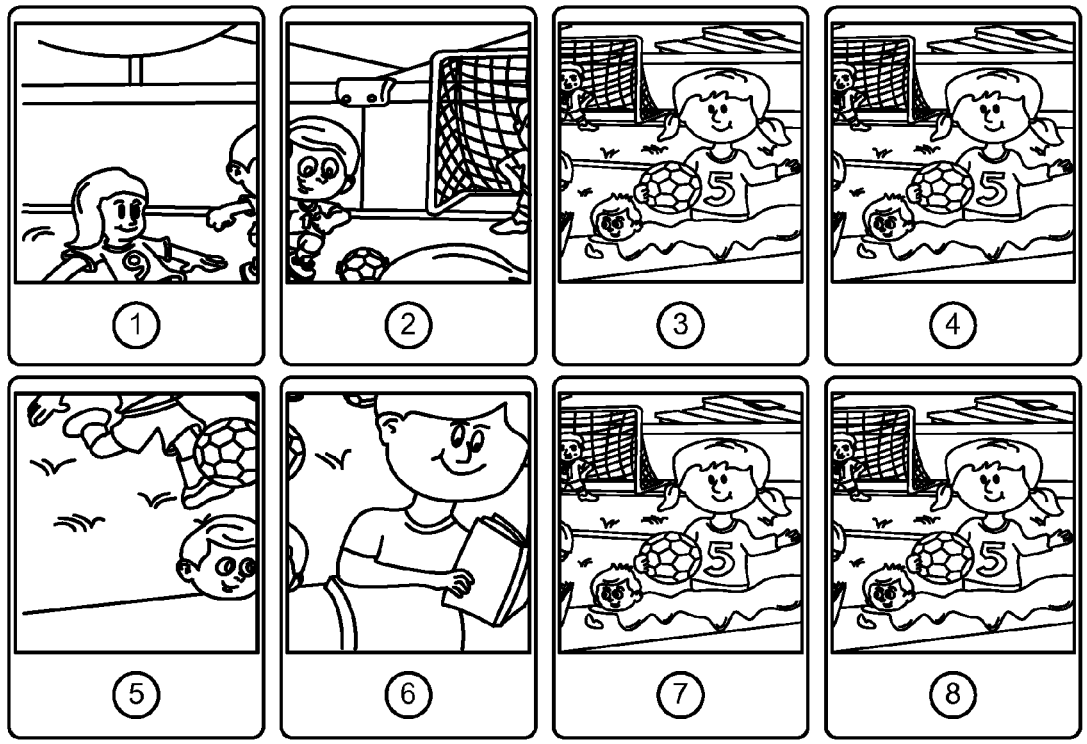
FIG. 23D illustrates a second session state with a zoom-out effect that is transitioned to after the first session state shown in FIG. 22C in accordance with an embodiment of the invention.
Figure 23D:
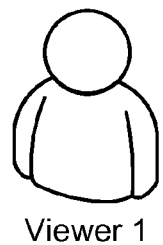

In Example 4B, similar to Example 4A, an example session parameter modification that can be triggered by the eye movement monitoring feedback is to zoom-out (or merge) multiple mapped video portions being viewed habitually by a particular viewer over time (i.e., more than $t_3$) so as to produce a merged feed that is output by at least one of the habitually viewed screens. So, it is possible that each screen being viewed habitually by Viewer 1 can be updated to output the merged feed, or alternatively that only a few (or even one) of the habitually viewed screens is affected. FIG. 23D illustrates an example whereby the merged feed which includes the mapped video portions previously delivered to Screens 3-4 and 7-8 (e.g., a bigger area of the soccer game that is still less than the whole, unpartitioned video feed). Also, it is possible that one or more of the mapped video portions previously delivered to Screens 3-4 and 7-8 has a unique screen-specific audio component. If so, the respective screen-specific audio components can either be merged for output by each screen receiving the merged frame, or alternatively the audio components can remain unchanged during the zoom-out (or merge) function.

In accordance with any of the session parameter modifications discussed above with respect to Table 1 and/or FIGS. 18-23D, the modifications can be undone based on detection of certain triggering events (e.g., a time threshold expiring, a hand gesture, more eye movement monitoring feedback, etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a master application configured for execution on a control device, comprising:
    mapping, for each proximate client device in a set of a plurality of proximate client devices registered as presentation devices for a coordinated display session, a different portion of visual data for the coordinated display session to a respective display screen;
    delivering the mapped portions of the visual data to the set of proximate client devices for presentation by a set of respective display screens during the coordinated display session;
    obtaining eye movement monitoring feedback from a set of eye tracking devices, the eye movement monitoring feedback characterizing eye movements of a viewing population of the coordinated display session; and modifying one or more session parameters associated with the coordinated display session based on the eye movement monitoring feedback, wherein the modifying modifies one or more of (i) an audio focus of the coordinated display session so as to establish a target surround sound characteristic or to emphasize or de-emphasize audio being output in association with a subset of the set of proximate client devices, (ii) a degree to which a particular mapped portion is zoomed-in upon or duplicated across two or more display screens from the set of respective display screens, (iii) a given degree to which the particular mapped portion is merged with one or more other mapped portions on at least one display screen from the set of respective display screens, or (iv) any combination thereof.

2. The method of claim 1, wherein the control device corresponds to one of the plurality of proximate client devices, another proximate client device that does not belong to a coordinated display group associated with the coordinated display session or a remote server device that is separate from the plurality of proximate client devices.

3. The method of claim 1, further comprising:
receiving synchronization information that indicates current relative orientation and position data for each of the plurality of proximate client devices, the received synchronization information including (i) a captured image of the plurality of proximate client devices, (ii) feedback related to how each of the plurality of proximate client devices detects a beacon that is directed towards the plurality of proximate client devices by an external device, (iii) feedback related to how each of the plurality of proximate client devices detects user movement in response to a prompt configured to request that a specified movement pattern be implemented in proximity to each of the plurality of proximate client devices, (iv) one or more captured images of a target object taken by each of the plurality of proximate client devices or (v) any combination thereof, wherein the mapping is based upon the received synchronization information.

4. The method of claim 1, wherein the set of eye tracking devices is designated by the master application.

5. The method of claim 1, wherein the set of eye tracking devices includes a single master eye tracking device that tracks the eye movements of the viewing population.

6. The method of claim 1, wherein the set of eye tracking devices includes a plurality of eye tracking devices that collectively track the eye movements of the viewing population.

7. The method of claim 1, wherein the set of eye tracking devices corresponds to a set of front-facing cameras coupled to one or more of the plurality of proximate client devices.

8. The method of claim 1, wherein the set of eye tracking devices is configured to perform a baselining operation to calibrate eye movement detection for the viewing population.

9. The method of claim 1, wherein the viewing population includes a single viewer.

10. The method of claim 1, wherein the viewing population includes multiple viewers.

11. The method of claim 1, wherein the visual data corresponds to a single video feed such that each mapped portion corresponds to a subset of the single video feed.

12. The method of claim 1, wherein the visual data corresponds to multiple video feeds and each mapped portion contains video content for a different video feed from the multiple video feeds.

13. The method of claim 1, wherein the one or more session parameters include an audio component of the coordinated display session.

14. The method of claim 13, wherein the modifying modifies the audio component by modifying (i) one or more speaker volume levels at which audio is output by one or more audio presentation devices participating in the coordinated display session, (ii) an audio configuration for the audio component of the coordinated display session, (iii) one or more equalizer functions applied to the audio being output by the one or more audio presentation devices, (iv) one or more audio settings for the audio component of the coordinated display session or (v) any combination thereof.

15. The method of claim 14,
wherein the modifying modifies the audio component by modifying the audio configuration, and
wherein the modifying transitions the audio configuration for the audio component of the coordinated display session to 2.1 or 5.1 pseudo-surround sound.

16. The method of claim 14,
wherein the modifying modifies the audio component by modifying the one or more equalizer functions.

17. The method of claim 16,
wherein the modifying applies an enhancing equalizer function to audio configured for output by a first subset of audio presentation devices coupled to a corresponding first subset of display screens identified as being looked upon by at least one viewer in the viewing population, or
wherein the modifying applies a de-emphasizing or inverse equalizer function to audio configured for output by a second subset of audio presentation devices coupled to a corresponding second subset of display screens identified as not being looked upon by the at least one viewer in the viewing population, or
any combination thereof.

18. The method of claim 14, wherein the modifying modifies the audio component by modifying bass, treble, fidelity settings or any combination thereof, for the audio component of the coordinated display session.

19. The method of claim 13,
wherein the eye movement monitoring feedback indicates that a given viewer in the viewing population is looking at a given display screen from the set of respective display screens, and
wherein the modifying modifies the audio component by increasing a volume at which a given audio output device coupled to the given display screen outputs audio associated with the coordinated display session relative to one or more other audio output devices coupled to one or more other display screens from the set of respective display screens.

20. The method of claim 19, wherein a degree to which the volume is increased for the given audio output device relative to the one or more other audio output devices is based on one or more respective proximities between the given display screen and the one or more other display screens.

21. The method of claim 19, further comprising:
receiving supplemental eye movement monitoring feedback that indicates that the given viewer is no longer looking at the given display screen; and
returning the audio component to an audio configuration state prior to the modifying in response to the supplemental eye movement monitoring feedback.

22. The method of claim 13,
wherein the eye movement monitoring feedback indicates that the viewing population includes multiple viewers, and
wherein the modifying includes transitioning the audio component to a default audio configuration state in response to the indication that the viewing population includes the multiple viewers.

23. The method of claim 13,
wherein the eye movement monitoring feedback indicates that the viewing population includes multiple viewers and that different viewers among the multiple viewers are watching different display screens from the set of respective display screens, and
wherein the modifying modifies the audio component by increasing a volume at which respective audio output devices coupled to each of the different display screens outputs audio associated with the coordinated display session relative to one or more other audio output devices coupled to one or more other display screens from the set of respective display screens.

24. The method of claim 23, wherein a degree to which the volume is increased for the respective audio output devices relative to the one or more other audio output devices is based on respective proximities between the different display screens and the one or more other display screens.

25. The method of claim 13,
wherein the eye movement monitoring feedback indicates that the viewing population includes multiple viewers and further indicates screen-specific viewing metrics indicative of how the multiple viewers are watching the set of respective display screens, wherein the modifying includes:
calculating a weighted score for each of the set of respective display screens based on the screen-specific viewing metrics,
configuring a target audio configuration state based on the weighted scores that establishes how respective audio output devices coupled to each of the set of respective display screens is to output audio during the coordinated display session.

26. The method of claim 25, wherein the screen-specific viewing metrics include (i) a number of viewers watching a given display screen, (ii) a proximity of one or more non-watched screens to one or more watched screens, (iii) a number of watched screens to which a non-watched screen is adjacent, (iv) a duration that one or more viewers have been watching a particular display screen or (v) any combination thereof.

27. The method of claim 1, wherein the one or more session parameters include an eye tracking component of the coordinated display session.

28. The method of claim 27,
wherein the eye movement monitoring feedback indicates that the viewing population includes multiple viewers,
wherein the set of eye tracking devices includes a plurality of eye tracking devices, and
wherein the modifying includes configuring each of the plurality of eye tracking devices to independently track each viewer in the viewing population that is in a range of the respective eye tracking device.

29. The method of claim 1, wherein the one or more session parameters include a video component of the coordinated display session.

30. The method of claim 29,
wherein the eye movement monitoring feedback indicates that a given viewer in the viewing population is looking at a given display screen from the set of respective display screens for more than a threshold period of time, and
wherein the modifying modifies the video component by zooming-in on a given mapped portion being presented by the given display screen, wherein the zooming-in includes updating the mapping such that a different portion of the given mapped portion is mapped to the set of proximate client devices for presentation by the set of respective display screens during the coordinated display session.

31. The method of claim 29,
wherein the eye movement monitoring feedback indicates that a given viewer in the viewing population is looking at a given display screen from the set of respective display screens for more than a threshold period of time, and
wherein the modifying modifies the video component by duplicating a given mapped portion being presented by the given display screen for presentation on each of the set of respective display screens, wherein the duplicating includes updating the mapping such that the given mapped portion is redundantly mapped to the set of proximate client devices for presentation by the set of respective display screens during the coordinated display session.

32. The method of claim 29,
wherein the eye movement monitoring feedback indicates that a given viewer in the viewing population has a habit of looking at a group of display screens from the set of respective display screens, and
wherein the modifying modifies the video component by merging the mapped portions being presented by the group of display screens, wherein the merging includes producing a merged mapped portion containing video content from each of the mapped portions being presented by the group of display screens and updating the mapping for at least one display screen in the group of display screens such that the merged mapped portion is delivered for presentation by the at least one display screen during the coordinated display session.

33. A control device configured to execute a master application, comprising:
means for mapping, for each proximate client device in a set of a plurality of proximate client devices registered as presentation devices for a coordinated display session, a different portion of visual data for the coordinated display session to a respective display screen;
means for delivering the mapped portions of the visual data to the set of proximate client devices for presentation by a set of respective display screens during the coordinated display session;
means for obtaining eye movement monitoring feedback from a set of eye tracking devices, the eye movement monitoring feedback characterizing eye movements of a viewing population of the coordinated display session; and
means for modifying one or more session parameters associated with the coordinated display session based on the eye movement monitoring feedback,
wherein the means for modifying modifies one or more of (i) an audio focus of the coordinated display session so as to establish a target surround sound characteristic or to emphasize or de-emphasize audio being output in association with a subset of the set of proximate client devices, (ii) a degree to which a particular mapped portion is zoomed-in upon or duplicated across two or more display screens from the set of respective display screens, (iii) a given degree to which the particular mapped portion is merged with one or more other mapped portions on at least one display screen from the set of respective display screens, or (iv) any combination thereof.

34. The control device of claim 33, wherein the control device corresponds to one of the plurality of proximate client devices, another proximate client device that does not belong to a coordinated display group associated with the coordinated display session or a remote server device that is separate from the plurality of proximate client devices.

35. A control device configured to execute a master application, comprising:
- logic configured to map, for each proximate client device in a set of a plurality of proximate client devices registered as presentation devices for a coordinated display session, a different portion of visual data for the coordinated display session to a respective display screen;
- logic configured to deliver the mapped portions of the visual data to the set of proximate client devices for presentation by a set of respective display screens during the coordinated display session;
- logic configured to obtain eye movement monitoring feedback from a set of eye tracking devices, the eye movement monitoring feedback characterizing eye movements of a viewing population of the coordinated display session; and
- logic configured to modify one or more session parameters associated with the coordinated display session based on the eye movement monitoring feedback,
- wherein the logic configured to modify modifies one or more of (i) an audio focus of the coordinated display session so as to establish a target surround sound characteristic or to emphasize or de-emphasize audio being output in association with a subset of the set of proximate client devices, (ii) a degree to which a particular mapped portion is zoomed-in upon or duplicated across two or more display screens from the set of respective display screens, (iii) a given degree to which the particular mapped portion is merged with one or more other mapped portions on at least one display screen from the set of respective display screens, or (iv) any combination thereof.

36. The control device of claim 35, wherein the control device corresponds to one of the plurality of proximate client devices, another proximate client device that does not belong to a coordinated display group associated with the coordinated display session or a remote server device that is separate from the plurality of proximate client devices.

37. A non-transitory computer-readable medium containing instructions stored thereon, which, when executed by a control device configured to execute a master application, cause the control device to perform operations, the instructions comprising:
- at least one instruction to cause the control device to map, for each proximate client device in a set of a plurality of proximate client devices registered as presentation devices for a coordinated display session, a different portion of visual data for the coordinated display session to a respective display screen;
- at least one instruction to cause the control device to deliver the mapped portions of the visual data to the set of proximate client devices for presentation by a set of respective display screens during the coordinated display session;
- at least one instruction to cause the control device to obtain eye movement monitoring feedback from a set of eye tracking devices, the eye movement monitoring feedback characterizing eye movements of a viewing population of the coordinated display session; and
- at least one instruction to cause the control device to modify one or more session parameters associated with the coordinated display session based on the eye movement monitoring feedback,
- wherein the at least one instruction to cause the control device to modify modifies one or more of (i) an audio focus of the coordinated display session so as to establish a target surround sound characteristic or to emphasize or de-emphasize audio being output in association with a subset of the set of proximate client devices, (ii) a degree to which a particular mapped portion is zoomed-in upon or duplicated across two or more display screens from the set of respective display screens, (iii) a given degree to which the particular mapped portion is merged with one or more other mapped portions on at least one display screen from the set of respective display screens, or (iv) any combination thereof.

38. The non-transitory computer-readable medium of claim 37, wherein the control device corresponds to one of the plurality of proximate client devices, another proximate client device that does not belong to a coordinated display group associated with the coordinated display session or a remote server device that is separate from the plurality of proximate client devices.

* * * * *